United States Patent
Mehra et al.

(10) Patent No.: US 7,089,583 B2
(45) Date of Patent: Aug. 8, 2006

(54) METHOD AND APPARATUS FOR A BUSINESS APPLICATIONS SERVER

(75) Inventors: Gaurav Mehra, Mumbai (IN); Tejas M. Damania, Mumbai (IN); Rich Ellinger, Menlo Park, CA (US); Deepak Jain, Fremont, CA (US); Michael L. Dufner, Campbell, CA (US)

(73) Assignee: Saba Software, Inc., Redwood Shores, CA (US)

( * ) Notice: Subject to any disclaimer, the term of this patent is extended or adjusted under 35 U.S.C. 154(b) by 829 days.

(21) Appl. No.: 09/759,497

(22) Filed: Jan. 12, 2001

(65) Prior Publication Data

US 2002/0049603 A1 Apr. 25, 2002

Related U.S. Application Data

(60) Provisional application No. 60/176,432, filed on Jan. 14, 2000.

(51) Int. Cl.
*G06F 17/00* (2006.01)
(52) U.S. Cl. .................... 726/3; 726/6; 726/8
(58) Field of Classification Search ............ 213/150, 213/155, 182, 202; 713/200–202, 150–152; 726/1–36
See application file for complete search history.

(56) References Cited

U.S. PATENT DOCUMENTS

| | | | |
|---|---|---|---|
| 4,701,130 A | 10/1987 | Whitney et al. | |
| 4,895,518 A | 1/1990 | Arnold et al. | |
| 5,199,068 A | 3/1993 | Cox | |
| 5,259,766 A | 11/1993 | Sack et al. | |
| 5,267,865 A | 12/1993 | Lee et al. | |
| 5,270,920 A | 12/1993 | Pearse et al. | |
| 5,301,270 A | 4/1994 | Steinberg et al. | |
| 5,310,349 A | 5/1994 | Daniels et al. | |
| 5,311,422 A | 5/1994 | Loftin et al. | |
| 5,326,270 A | 7/1994 | Ostby et al. | |
| 5,381,332 A | 1/1995 | Wood | |
| 5,395,243 A | 3/1995 | Lubin et al. | |
| 5,421,730 A | 6/1995 | Lasker, III et al. | |
| 5,499,293 A | 3/1996 | Behram et al. | |
| 5,548,506 A | 8/1996 | Srinivasan | |
| 5,597,312 A | 1/1997 | Bloom et al. | |
| 5,655,118 A | 8/1997 | Heindel et al. | |

(Continued)

FOREIGN PATENT DOCUMENTS

GB     2 253 500 A     9/1992

(Continued)

OTHER PUBLICATIONS

Integrating security in a large distributed system; M. Satyanarayanan; Aug. 1989; ACM Transactions on the Computer Systems (TOCS), vol. 7 Issue 3.*

(Continued)

*Primary Examiner*—David Jung
(74) *Attorney, Agent, or Firm*—Morrison & Foerster LLP

(57) ABSTRACT

The present invention provides a solution to the needs described above through a system and method for a business applications server. The automated system of the present invention uses a persistence framework to provide a process for saving and restoring state of business objects and for performing operations thereon, and metadata driven processes to dynamically define class properties and behavior for each class of business object, in order to control the execution of the required tasks with minimum use of redundant data input to the several applications, thereby minimizing the use of hardware resources and user input and programming effort.

47 Claims, 17 Drawing Sheets

U.S. PATENT DOCUMENTS

| | | | |
|---|---|---|---|
| 5,761,063 | A | 6/1998 | Jannette et al. |
| 5,765,140 | A | 6/1998 | Knudson et al. |
| 5,788,504 | A | 8/1998 | Rice et al. |
| 5,795,155 | A | 8/1998 | Morrel-Samuels |
| 5,826,252 | A | 10/1998 | Wolters, Jr. et al. |
| 5,829,983 | A | 11/1998 | Koyama et al. |
| 5,870,549 | A | 2/1999 | Bobo, II |
| 5,970,490 | A | 10/1999 | Morgenstern |

FOREIGN PATENT DOCUMENTS

| | | |
|---|---|---|
| WO | 97/22096 | 6/1997 |
| WO | WO 97/42573 | 11/1997 |
| WO | 98/05018 | 2/1998 |
| WO | 98/10399 | 3/1998 |
| WO | WO 99/32998 | 7/1999 |

OTHER PUBLICATIONS

Access control by using object properties and categorized methods Matsumoto, K.; Hashimoto, A.;Yoshida, T.; Advanced Information Networking and Applications, 2004. AINA 2004. 18th International Conference on.*

A chat room assignment for teaching network security; W. Garrett Mitchener, Amin Vahdat; Feb. 2001; ACM SIGCSE Bulletin, Proceedings of the thirty-second SIGCSE technical symposium on Computer Science Education, vol. 33 Issue 1.*

B. Meyer, "Object-Oriented Software Construction", Prentiss-Hall, 1988, book overview, 7 pgs.

R. Monson-Haefel, "Enterprise JavaBeans", Dec. 2000. 2 pgs.

T. Valesky, "Enterprise JavaBeans: Developing Component-Based Distributed Applications".

"Developer's Guide to Understanding Enterprise JavaBeans", www.nova-labs.com/downloads, 2 pgs.

H. Dailey, "Piecing it together, New J2EE Patterns Catalog Helps Solve the J2EE Architecture Puzzle", Mar. 2001, 6 pgs.

* cited by examiner

Exemplary Saba Business Object Diagram

METHOD AND APPARATUS FOR A BUSINESS APPLICATIONS SERVER

CROSS-REFERENCE TO RELATED APPLICATIONS

This application claims the benefit of U.S. Provisional Application No. 60/176,432, filed on Jan. 14, 2000. This application is also related to the following applications:

U.S. application Ser. No. 09/760,068, filed on Jan. 12, 2001, titled "Method and Apparatus for a Business Application Management System Platform;"

U.S. application Ser. No. 09/759,856, filed on Jan. 12, 2001, titled "A Method and Apparatus for a Web Content Platform;"

U.S. application Ser. No. 09/759,678, filed on Jan. 12, 2001 (now U.S. Pat. No. 6,643,652), titled "Method and Apparatus for Managing Data Exchange Among Systems in a Network;"

U.S. application Ser. No. 09/760,432, filed on Jan. 12, 2001 (now U.S. Pat. No. 6,721,747), titled "Method and Apparatus for an Information Server;" and U.S. application Ser. No. 09/759,062, filed on Jan. 12, 2001 (now U.S. Pat. No. 6,850,893), titled "A Method and Apparatus for an Improved Security System Mechanism in a Business Applications Management System Platform."

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to the general field of computers, telecommunications, and computer and Internet related systems. More specifically the invention relates to an improved architecture for an enterprise business applications server.

BACKGROUND

Today software systems developers are providing more efficient automated systems for managing the processing of information from multiple, inter-related applications, wherein the applications may be housed on disparate hardware platforms and in diverse locations, and wherein the overall use of computer hardware resources are efficiently managed and the efforts of the users are made more efficient by the reduction of redundant inputs to the multiple disparate but related systems.

Prior art systems of this type typically have an infrastructure which is tightly coupled to application products, specific hardware platforms and specific Operating systems and related services. Such systems are difficult to maintain, difficult to upgrade and difficult to extend to other applications as well as usually requiring redundant data input for their specific applications.

In the past, developers have turned to object-oriented programming (OOP) to improve programming and code maintenance efficiency for such systems and to the use of hardware platform independent languages like Sun Microsystems™ JAVA™ language and system, as tools for developing such platform independent applications support systems. Until recently, the use of Java has been focused on the client side of the client-server system architecture with the development of JavaBeans™ and Java servelet generation. More recently, the technology required to allow distributed objects to communicate with each other across either the client-server or server-server boundary has been provided by the EnterpriseJavaBeans (EJB)™ component architecture. This new architectural system and related tools and systems are well documented and well known to those skilled in these arts. These tools and related systems are described in various whitepapers and tutorials found on the Sun web site at www.java.sun.com as well as in a plethora of books on JAVA and JAVA programming.

However, there remain significant technical problems in crafting a concrete, tangible and useful business applications server which is generally compliant with the EJB architecture specification but which is not bound by vendor specific constraints and which is flexible enough to allow individual business users to add custom data to business objects which are EJB compliant. In addition, business systems are making additional use of the Extended Markup Language (XML) protocol for process communication and data transmission between clients and servers and between servers themselves. Consequently there is a technical need in a business applications server to accommodate XML formatted communications and to accommodate the interchange between Java Business Objects and XML.

Accordingly, there is a need in the art for a business applications server system and methods which can provide hardware platform independence, but also can provide a metadata process for including user specific data in business objects and for an efficient and useful interchange between Java compliant objects and XML.

The current invention provides these facilities in various new and novel ways as more fully described below.

SUMMARY OF THE INVENTION

The present invention provides a solution to the needs described above through a system and method for a business applications server. The automated system of the present invention uses a persistence framework to provide a process for saving and restoring state of business objects and for performing operations thereon, and metadata driven processes to dynamically define class properties and behavior for each class of business object, in order to control the execution of the required tasks with minimum use of redundant data input to the several applications, thereby minimizing the use of hardware resources and user input and programming effort.

A computer implemented method is disclosed for automated processing of applications by a business applications server which uses the acts of receiving a communication from another server or system, translates the content of the communication into a format it can process, uses a set of metadata to define the properties and behavior of the translated content and processes the translated content using a code pate defined by a persistence framework.

An apparatus is disclosed for implementing a business application which includes a business application server adapted to receive an electronic communication from another server, a translator to convert the content of the communication into a format for processing, a mechanism to use a set of metadata to define properties and behavior of the converted content of the communication and a second mechanism to process the converted content of the communication using a code path defined by a persistence framework.

Also a computer program stored on a computer readable medium or carrier wave is disclosed having computer code mechanisms for receiving a communication from another server or system, translating the content of the communication into a format it can process, using a set of metadata to define the properties and behavior of the translated content and for processing the translated content using a code path defined by a persistence framework.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

DESCRIPTION OF THE DRAWINGS

The features and advantages of the system and method of the present invention will be apparent from the following description in which.

DETAILED DESCRIPTION

Figure 1:
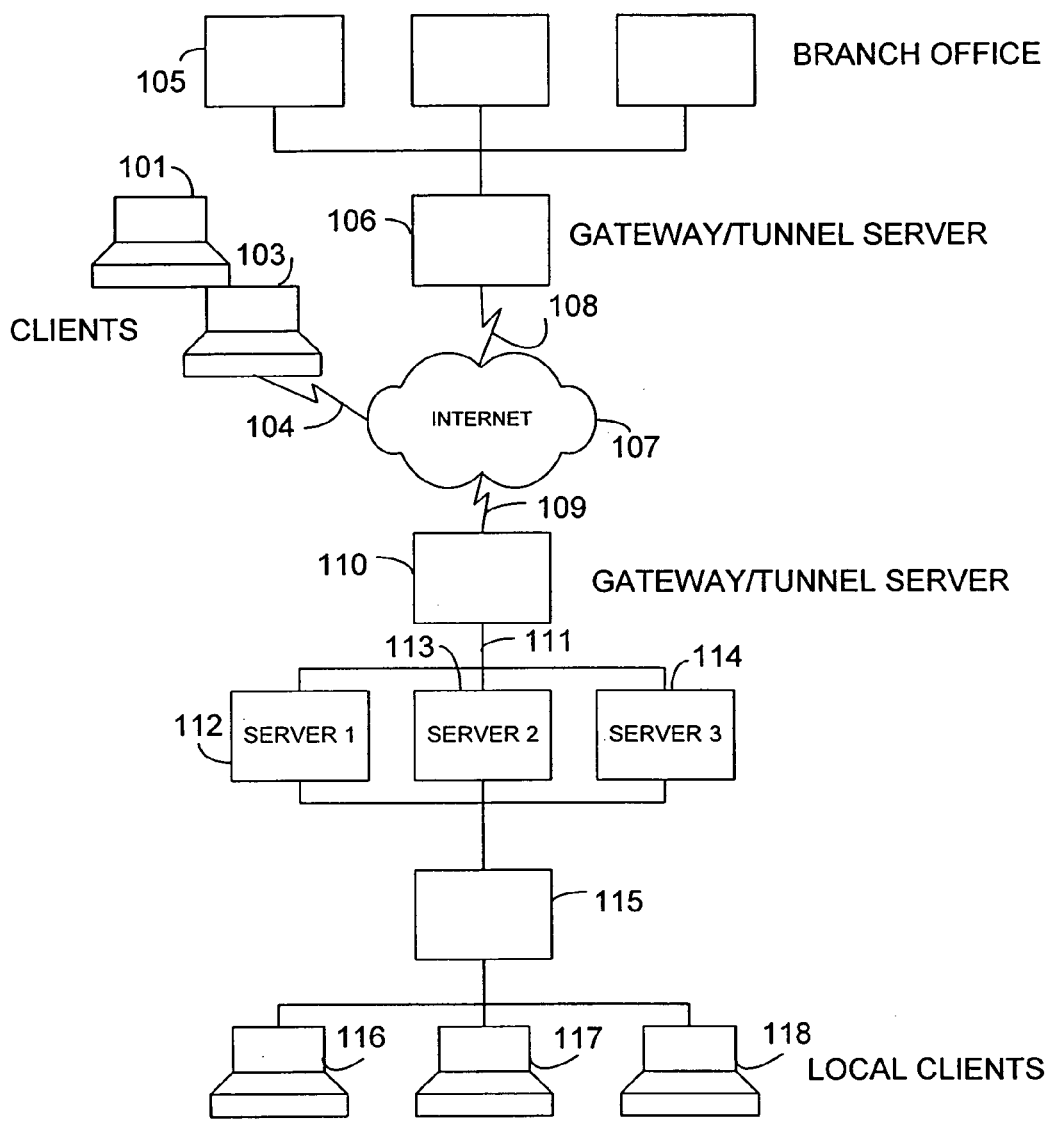
FIG. 1 illustrates a typical configuration of Internet connected systems representative of the preferred embodiment of the present invention.

The present invention provides a solution to the needs described above through a system and method for integrating the disparate applications, and managing the applications processes in a hardware resource and user effort efficient manner. The automated system of the present invention uses a business systems platform architecture comprised of several unique servers in a base platform (the "Platform") to efficiently manage multiple applications which may themselves generally be distributed across a network. The platform makes use of a collection of Core Services which provide additional security, internationalization services, and reporting services which are applicable to all applications. The Core Services are made available to a multitude of common business objects, which themselves are made available to various applications.

The present invention is a Business Applications Management System Platform Architecture (the "Platform" or alternatively the "SABA architecture") which is designed to maintain and use a set of unique servers and common objects to generate the set of tasks required to be performed to complete a designated business transaction in a concrete, and useful way. In the preferred embodiment, the platform permits application developers to work on the business aspects of the application without having to focus on transaction management, security, persistence of data or life cycle management of the object itself. The servers and other aspects of the Platform are described in more detail below. However, a general overview of a preferred embodiment of the invention is first described.

(1) General Overview

The technology used as part of the system currently is, and will be, able to interface with many other industry standard software programs to make the exchange and flow of data easy and accurate.

The system is predominantly web-enabled, which extends its use to all industry professionals connected to the Internet. The Platform provides a unified set of interfaces, an application Framework, that encompass Business Object development, Web-application development, external connectivity development, and information distribution development.

The system is predominantly based on object-oriented programming principles as described in "Object-Oriented Software Construction" by Bertrand Meyer, Prentiss-Hall, 1988, ISBN 0-13-629049-3 and the Sun Microsystems™ developed JAVA™ systems described in the following publications:

Enterprise JavaBeans Specification, v1.1(can be found at //java.sun.com/products/ejb/docs.html)

Enterprise JavaBeans, Richard Monson-Haefel, O'Reilly.

Enterprise JavaBeans: Developing Component-Based Distributed Applications, Tom Valesky, Addison-Wesley.

Enterprise JavaBeans Developer's Guide (Beta Version) at //developer.java.sun.com/developer/earlyAccess/j2sdkee/doc-beta/guides/ejb/html/TOC.html J2EE Application Programming Model (Beta Release), at //developer.java.sun.com/developer/earlyAccess/j2sdkee/download-docs.html all of which are incorporated fully herein by reference. The system makes use of some third party modules which are described in more detail below also. The terminology as used and described in these references for object, class, inheritance, component, container, bean, JavaBean, EJB, etc., are well known in these arts and are used herein generally without definition except where a specific meaning is assigned to a term herein.

Overview of the Platform Architecture

The following describes an overview of the preferred embodiment of the SABA architecture, and includes:

- A discussion of the system-level architecture and the modules that comprise the SABA system. This includes a high-level overview of each module, and lists the principle interfaces and functionality defined by each module.
- A discussion of the application-level architecture, covering both the application-level architecture as exposed to different categories of users and some of the core business objects and their relationships.

Figure 5:
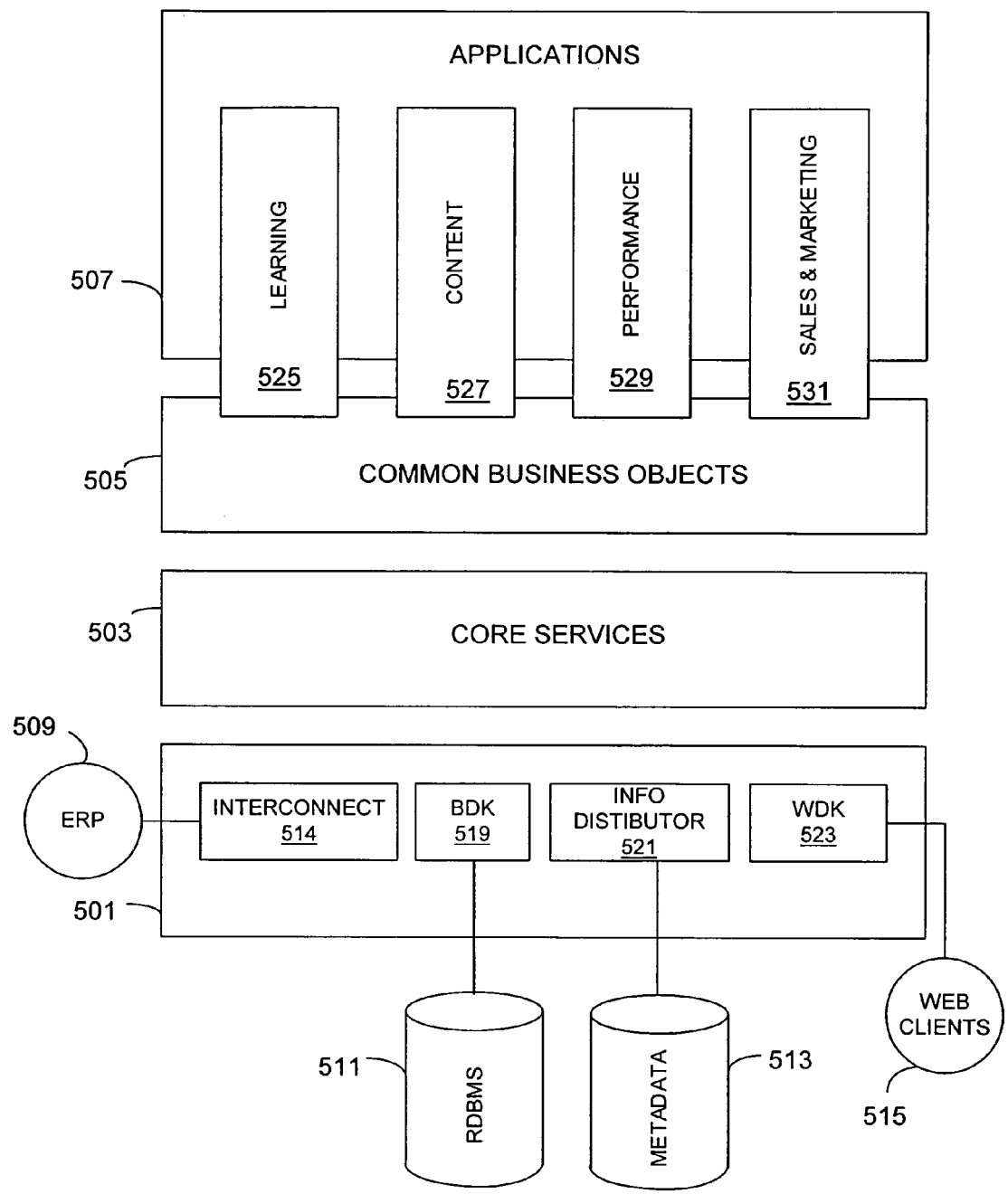
FIG. 5 illustrates an alternative configuration of the system which contains the invention.

Referring now to FIG. 5, in the preferred embodiment, Saba's architecture consists of four layers of APIs:

1. The Platform layer 501 provides underlying infrastructure for enterprise applications, including standards-based functionality for persistence and distributed logic, application integration, content generation, and metadata queries.
2. The Core Services layer 503 is a module that provides a set of common functionality for enterprise application. It includes services such as security, internationalization, and reporting.
3. The Common Business Objects layer 505 is a module that defines a set of business objects shared across all SABA applications. It includes objects such as Party and Plan. Vertical applications may each also contribute a set of common business objects.
4. The Applications layer 507 provides objects and services particular to a given application. There are multiple modules contained within the Applications layer, including modules for Learning 525, Content 527, Performance 529, and Sales & Marketing 531. The specific applications modules indicated are shown by way of example.

In the preferred embodiment, applicants have standardized their APIs around Session Bean Managers, interfaces that expose a common set of functionality. Each module therefore consists of several Session Bean interfaces. Thus, while SABA implements its managers using Entity Beans corresponding to persistent database objects, the interface as exposed to clients is solely that of the Managers.

This architecture also helps avoid circular dependencies by requiring that all dependencies be directed downwards. That is, a vertical application 507 may have dependencies on one or more sets of common business objects 505, but not on other applications. Similarly, common business objects 505 may depend on core services 503, and on other common business objects 505, but not on applications 507.

Platform

The Platform model 501 defines applicants' application platform, on top of which all additional business logic and functionality are implemented. Platform 501 provides the full set of standards-based services required for building modern enterprise applications.

Platform 501 consists of the following services:

BDK (Business Development Kit) Business applications server 519 is Saba's EJB compatibility layer. It extends the standard Java business component model with SABA-specific enhancements, such as improved security and caching, as well as providing an abstraction layer to improve portability between EJB servers. The BDK 519 defines the following base interfaces:

ISabaEntityBean—The abstraction of a persistent object

ISabaSessionBean—The abstraction of a transactional service

WDK (Web Development Kit) server 523 is Saba's web content generation engine. Using web standards for XML and XSL, it provides a customizable framework for decoupling data from presentation, and generating web content in a variety of formats, from standard HTML to WML. The WDK 523 provides the following base interfaces:

IWDKObject—An object capable of serializing itself as XML

Interconnect is Saba's application integration platform. Using XML and open standards for ERP integration, it provides a scalable and reliable solution for batch and period import, export, and monitoring. Interconnect defines the following base interfaces:

IAccessor—Service for exporting objects from SABA

IImporter—Service for importing objects into SABA

IMonitor—Service for monitoring object changes

Information Distributor Server 521 is applicants' query and delivery mechanism. Based on XML and RDF metadata standards, it defines a high-level query language and a set of agents for implementing information services. Interconnect provides the following services:

MetadataRepository—A datastore for querying metadata

ImportAgent—An agent for generating metadata

MatchAgent—An agent for locating metadata-based matches

DeliveryAgent—An agent for delivering match results

Core Services 503

The Core Services module 503 provides the common business services needed by applicants' system. These services are not specific to any industry, such as learning; instead, they provide the support and functionality required by applicants to meet generic enterprise requirements.

Core Services consist of the following Session Managers:

AuditManager—Tracks changes to objects in the system. Can return a complete history of changes, including date, username, and reason.

BusinessRuleManager—Manage system business rules, that is, company policies defining the system's behavior in given situations.

ComponentManager—Manage installed business objects for naming and instantiation.

CurrencyManager—Manage currencies and exchange rates.

DataDictionaryManager—Manage metadata about business objects. This metadata is used to generate user interfaces, specify constraints, and define object behavior.

DomainManager—Manage domains. Domains are hierarchical groupings of business objects that can be used for a variety of purposes.

FinderManager—Create and invoke Finders. Finders provide a flexible mechanism for defining and executing database queries.

HandleManager—Centralize access to managers available to all business objects.

i18nManager—Manage internationalization. Track information about locales, languages, timezones, and display formats associated with business objects.

LicenseManager—Manage software licensing. Track installed modules, license keys, and version numbers.

LOVManager—Define lists of values.

NLevelHierarchyManager—Support for nested folders.
   FolderManager
   FolderElementManager NoteManager—Define notes (long text attachments).

PreferenceManager—Set user preferences.

SecurityManager—Manage user privileges. Assign permitted operations on objects to users and groups.

ServiceHolderManager—Enable and disable common services (discussion, chat, etc.)

ReportManager—Create and execute reports. Reporting engines currently supported include Brio and Crystal Reports 7.
   LetterManager—Generate form letters.

TaxManager—Calculate sales taxes.

NotificationManager—Manage notifications. Associate actions, such as sending an email or executing a Java method, with predefined system and periodic events.
   ActionManager
      AttachmentManager
      EventManager
      ParamManager
      RecepientManager
      TextBlockManager UserManager—Manage user preferences and allow users to switch between roles.

Common Business Objects

The Common Business Objects module 505 defines the set of business abstractions that are shared across more than one vertical application. These objects may be either generic business concepts, such as a Party, or shared concepts specific to Saba's application domain, such as Calendar.

Common Business Objects 505 comprise the following Session Managers:

AccountabilityManager—Used to manage a variety of relationships, such as reporting and organization membership, between entities in the system CalendarManager—Manage calendars and schedules.
   CorporateCalendarManager
   PersonalCalendarManager
   SfaCalendarManager
   SfaCalendarOwnerManager
   CheckListItemManager PartyManager—Manage entities within a business. Includes employees, clients, companies, departments, and business units.

LocationManager—Manage locations, including addresses and contact information.

RoleManager—Manage a function/job type within the value chain.

PlanManager—Manage plans, that is, proposed course of actions.

ProfileManager—Manage profiles, that is, comprehensive histories, goals, and plans for entities within a business.

ValueChainManager—Manage value chain relationships between entities in an extended organization.

Learning

The exemplary Learning module 525 within the Applications layer 507 defines the services used to build learning management systems. It provides APIs for defining learning offerings, which include classes, courses, on-line learning, and physical inventory, registering for and consuming learning, and tracking transcripts, certifications, and other results of learning.

The following Learning Session Managers are delivered as part of Common Business Objects 505:

CatalogManager—Browse a learning catalog.

OfferingTemplateManager—The core abstraction of a learning intervention.

The following Learning Session Managers are only available with the Learning application:

CertificationManager—Track certifications.
   CertificationActionManager
   CertificationCompetencyManager
   HeldCertificationManager LearningManager—Manage learning offerings. Extends the concept of offering templates to include managing delivery types and delivery modes, offering instances, audience types, and offering modes.
   AudienceTypeManager
   DeliveryManager
   DeliveryModeManager
   EquivalentManager—Defines equivalent offering templates.
   OfferingActionManager
   OfferingManager
   OfferingPolicyManager
   OfferingTemplateDeliveryManager
   ProductGroupManager
   RosterManager
   PrerequisiteManager LearningResourceManager—Manage resources used by classes, such as classrooms, faculty, and equipment.
   InventoryManager
   QualifiedInstructorManager RegistrarManager—Request and order a learning resource. Includes shipping and registration information.
   CourseRequestManager
   PackageOrderManager
   PricingManager RegistrationManager—Track completion and grading of learning offerings Content The Content module 527 within the Applications layer 507 defines the services used for all forms on on-line learning. It includes creating and launching WBT and VOD courseware, virtual classrooms, testing and assessment, community services, and analysis and tracking.

The following Content Session Manager is delivered as part of Common Business Objects:

ContentHolderManager—Allows any business object to be a content holder

CourseContentManager—Associate content such as attachments and exams with learning offerings.

The following Content Session Managers are only available with the Content application:

ContentManager—Manage learning content.
   TestManager

AnalysisManager—Analyze test results.

CommunityManager—Create and manage learning communities.

Performance

The Performance module 529 within the Applications layer 507 defines the services available for managing human performance. It includes competencies and goals.

The following Performance Session Managers are delivered as part of Common Business Objects:

CompetencyManager—Assign competencies to roles, entities, and learning resources. Includes
CompetencyHolderManager
CompetencyProviderManager
OfferingCompetencyManager—Associate competencies with offering templates and find learning interventions that provide competencies.

The following Performance Session Managers are only available with the Performance application:

Advanced competency definition, manipulation, and analysis, including:
CompetencyAnalysisManager
CompetencyGroupManager
CompetencyMethodManager
CompetencyModelManager
GoalManager—Manage and track goals. Includes assigning goals and observations on goals.
GoalLibraryManager
GoalObservationManager
GoalStateManager Sales and Marketing The Sales and Marketing module 531 within the Applications layer 507 defines the services available for the running the finances and logistics of a learning content provider. It includes the purchase of learning resources and tools for managing sales and marketing campaigns.

The following Sales and Marketing Session Managers are delivered as part of Common Business Objects:

OrderManager—Generate orders. Includes invoicing and shipping options.
PurchaseManager—Track the pricing of learning resources. Includes getting and setting prices and managing price lists.

The following Sales and Marketing Session Managers are only available with the Sales and Marketing application:

AccountManager—Manage client accounts.
Advanced order management, including:
TrainingUnitManager
PurchaseOrderManager
MarketingManager—Manage marketing campaigns.
RoyaltyInfoManager
ShipperManager
SalesMktManager—Order a learning resource. Similar functionality to RegistrarManager, but designed for use in a call center to fulfill external orders.
TargetMarketManager—Manage target markets and associate them with offering templates.
TerritoryManager—Manage territories.

Applications Architecture

An exemplary version of an application architecture which can make use of applicants' invention could consist of four distinct applications that interoperate to provide a complete Human Capital Development and Management solution. Each of these applications is based around a core set of metadata; the applicants' architecture's value lies in the effective management of this metadata. The diagram in FIG. 6 describes this core metadata and how it is employed by different types of users in this exemplary implementation of this architecture. Those skilled in the art will recognize that this architecture can be used with various other kinds of applications systems, such as: financial product sales & marketing systems; retail store management systems; various kinds of maintenance & repair management & dispatch systems; etc.

Figure 6:
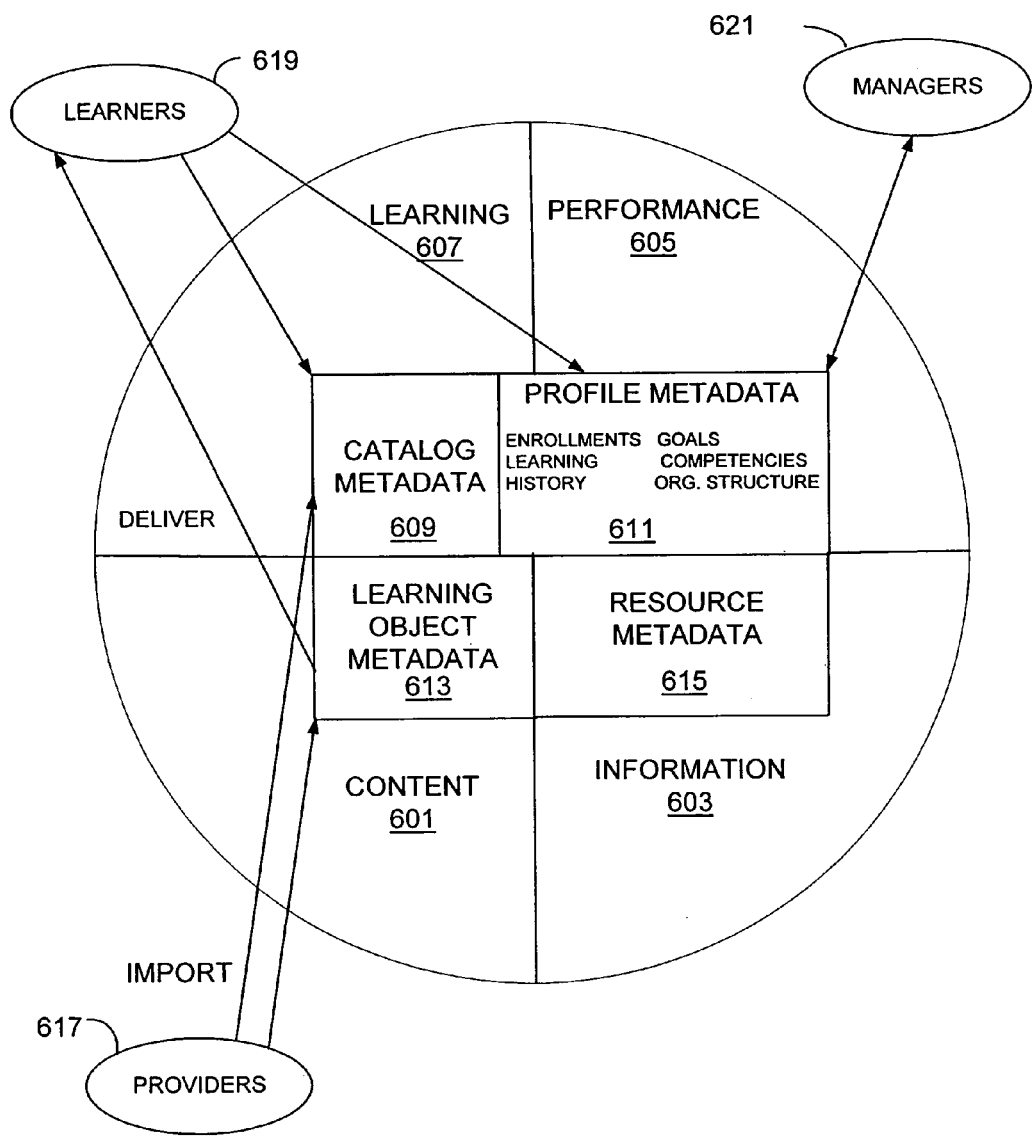
FIG. 6 is an alternative depiction of the platform of the present invention.

Referring now to FIG. 6, SABA Learning manages Catalog Metadata 609 that describes a set of available learning interventions and Profile Metadata 611 that describes a learner in the system, including learning history and enrollments.

SABA Performance manages Profile Metadata 611 that describes individual and group goals, competencies, and development plans. Together, the Profile Metadata 611 in Learning 607 and Performance 605 provide a complete description of the human capital in an extended organization.

SABA Information 603 and SABA Content 601 manage metadata about a variety of on-line resources. SABA Information 603 uses this metadata to construct information services targeted to individual's information needs, whereas SABA Content 601 uses this metadata to manage learning content throughout its lifecycle and construct intelligent, reusable Learning Objects.

Users work with this metadata as follows:

Individual learners 619 query Learning Metadata (that is, the learning catalog) 609 to locate appropriate learning interventions. The system uses Learning Object Metadata 613 to deliver and track learning interventions and updates the Profile Metadata 611 as appropriate.
Team managers 621 work with Profile Metadata 611 to define, update, and track progress towards goals. They can analyze the metadata to identify problem areas and generate plans for meeting their goals.
Learning providers 617 use import and administration tools to create and update Catalog 609 and Learning Object Metadata 613.

Figure 7:
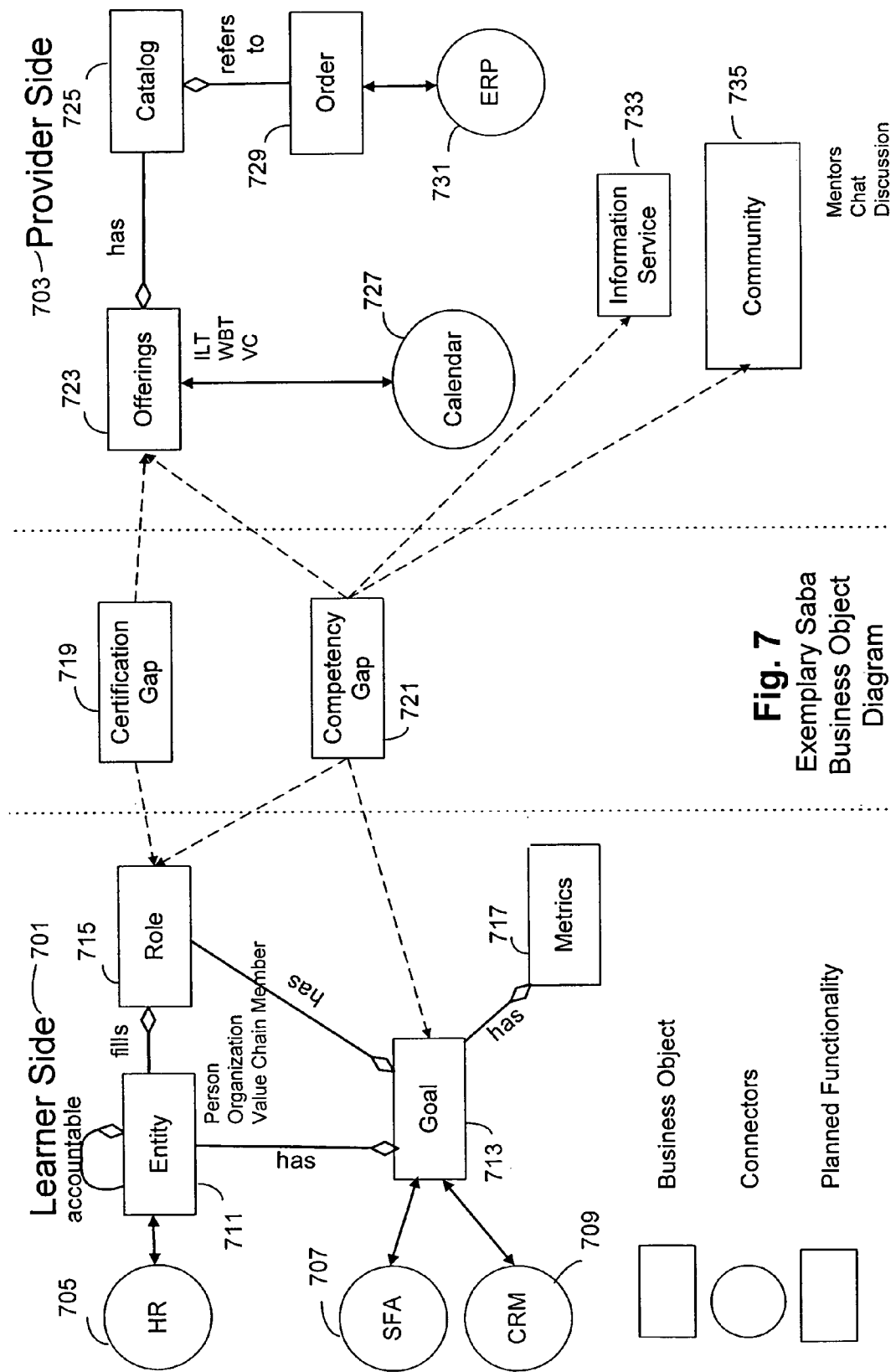
FIG. 7 illustrates a more detailed configuration of an exemplary business server portion of the current invention.

One of the principal tasks users perform in such a system is finding performance interventions—resources and services that can be applied to improve human capital performance. The diagram in FIG. 7 details the business objects that support this process and their relationships.

There are multiple, complementary mechanisms for identifying interventions.

Competency gap analysis can be applied to either an individual's goals 713 or roles 715. The analysis compares the required competencies for reaching a goal 713 or filling a role 715 (either held or targeted) to actual held competencies and generates a competency gap 721. Learning interventions (offerings 723) that fill the competency gap 721 are the identified. A variety of other intervention types are planned, including information 733 and community services 735.

Certification gap 719 analysis compares a role's certification requirements associated to the actual learning profile of the individual in the role. It then identifies the quickest certification track to completion and recommends appropriate learning offerings 723 from the catalog.

Having described an exemplary application we now describe the invention in additional context.

Figure 3:
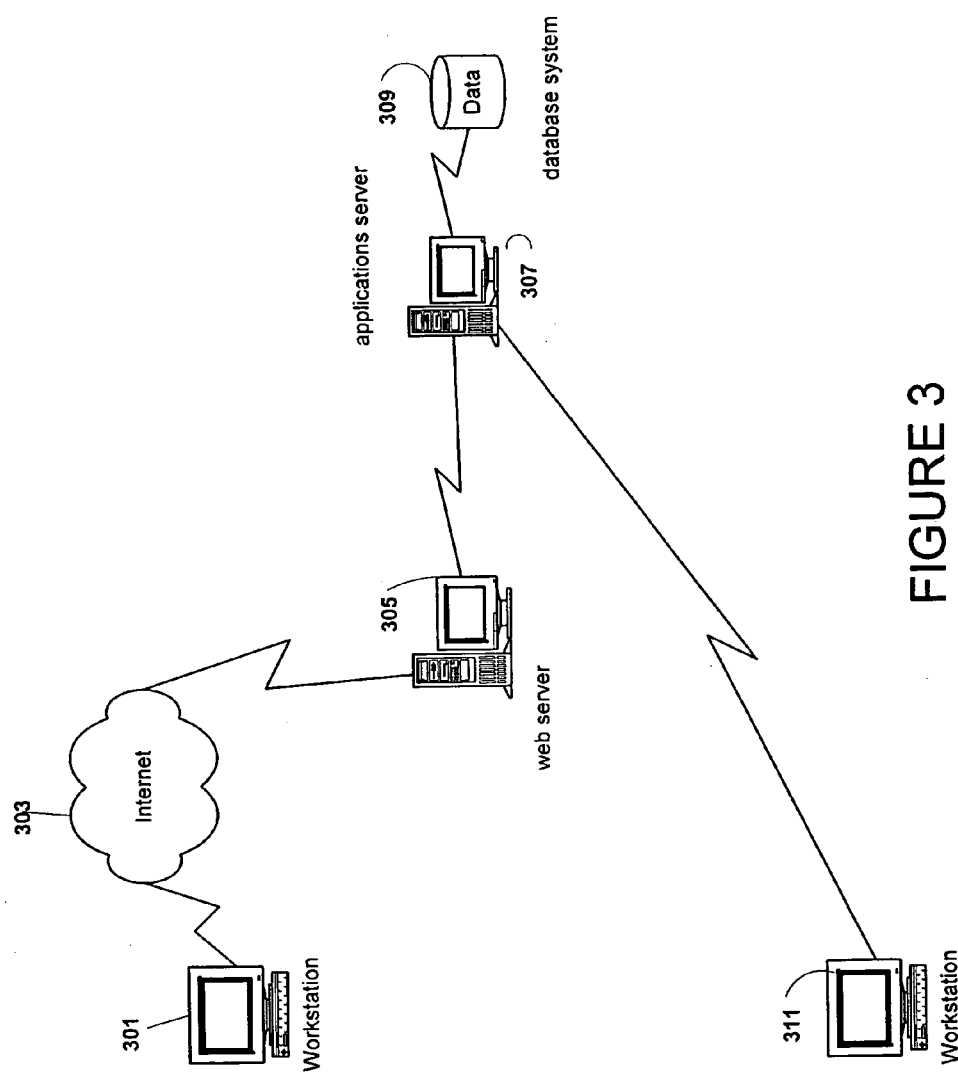
FIG. 3 illustrates the general three tier relationship between user, web-servers and their related applications-server, and the database management system.

In a preferred embodiment, the Platform can support both Application and Business component development, as well as integration with development tools, connectivity to external systems (import/export/exchange), and information delivery. The architecture of the present invention adopts a three-tier model and is shown in the diagram in FIG. 3. In FIG. 3 a tier 1 web user 301 is connected electronically to a tier 2 web server 305 which is connected to a tier 3 applications server 307. Also in Tier 1 a dedicated user 311 may be directly connected to a tier 3 applications server 307. And the tier 3 applications server 307 may be connected to a database management system 309.

Figure 4:
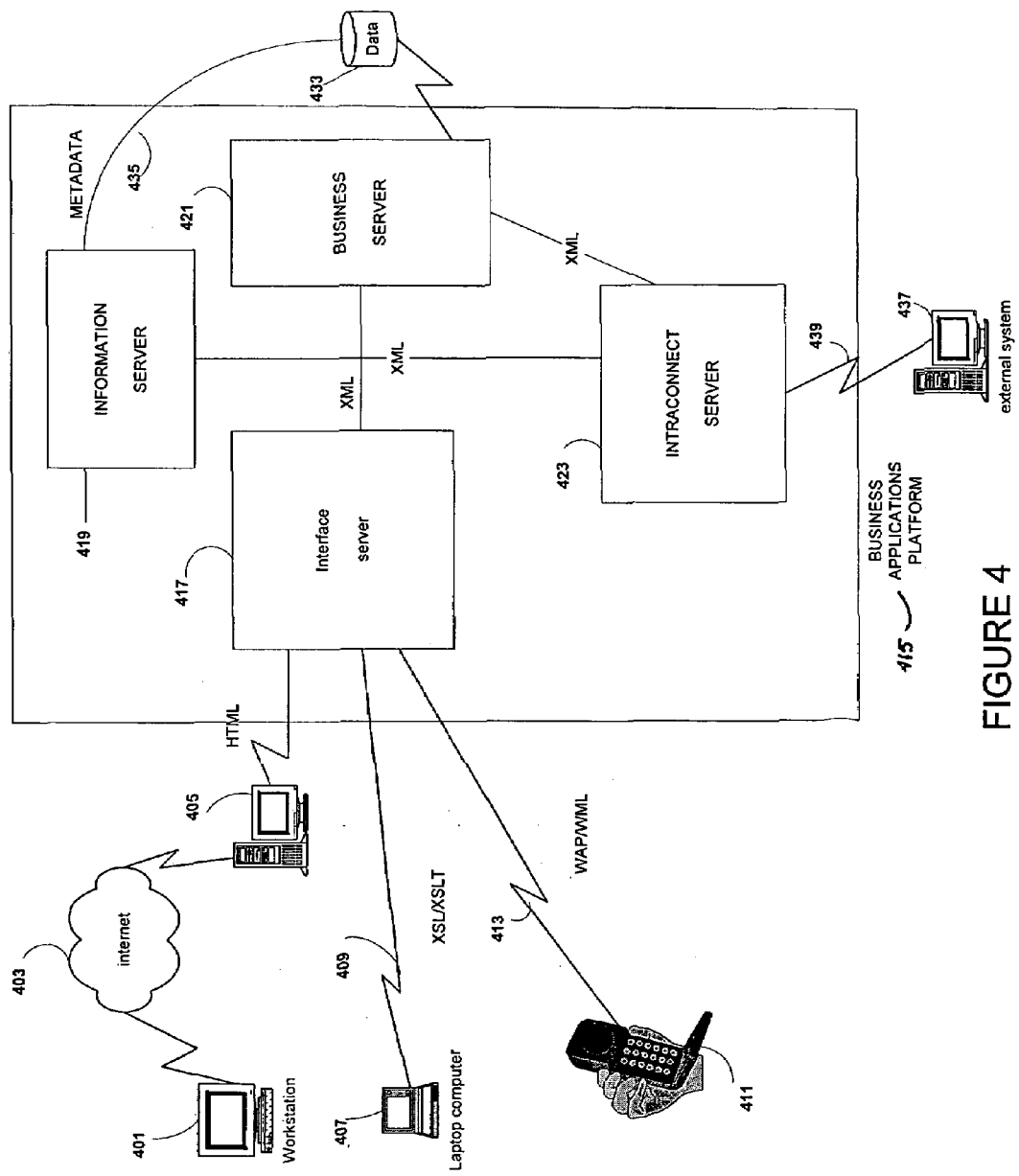
FIG. 4 illustrates a more detailed depiction of the applications-server portion of such a system as shown in FIG. 3 illustrating the business applications platform system of the present invention.

Referring now to FIG. 4, the tier 3 applications server 307 is expanded in FIG. 4 to illustrate the Business Applications Platform 415 of the present invention. In FIG. 4, the Platform contains an Interface Server 417, an Information Server 419, an Interconnect Server 423 and a Business Server 421. All of these Servers 417, 419, 421 and 423 may physically reside on the same hardware platform (such as a UNIX box or a Microsoft™ NT™ platform), or each server may reside on a separate hardware box, or any combination of servers and hardware boxes. Each of the servers may have included a JAVA Virtual Machine™ and the related runtime support. The electronic communications between these servers may use the XML protocol (409, 425, 427) with each server having services for translating XML into the particular Applications Programming Interface (API) language required by the server and for translating its internal language into XML prior to transmission to another server. In a preferred embodiment, all of these servers are contained in a single tier 3 platform, and may communicate with each other directly without the necessity of changing the interfacing protocol format. The Interface Server 417 (also alternatively designated herein as the WDK), communicates through a web server 405 via the internet 403 to web clients 401 via the HTML protocol. The Interface Server 417, also may communicate to a directly connected client 407 via other protocols such as XSL/XSLT etc., and may communicate to Personal Data Assistants 411 such as cell phones or Palm Pilots™ or other such wireless devices using wireless protocols such as WAP/WML, etc. The Interface Server 417, contains mechanisms to manipulate various kinds of display style sheets, to generate and execute web links, to manage dynamic content generation and dynamic generation of Javascript, all of which is described in more detail below in the section on the Interface Server/WDK 417.

These servers and related facilities and others are described in more detail below.

Operating Environment

The environment in which the present invention is used encompasses the use of general purpose computers as client or input machines for use by business users of various kinds, including clerks, managers, teachers, and/or systems administrators. Such client or input machines may be coupled to the Internet (sometimes referred to as the "Web") through telecommunications channels which may include wireless devices and systems as well.

Some of the elements of a typical Internet network configuration are shown in FIG. 1, wherein a number of client machines 105 possibly in a branch office of a large enterprise, a manufacturer, a financial enterprise, etc., are shown connected to a Gateway/hub/tunnel-server/etc. 106 which is itself connected to the internet 107 via some internet service provider (ISP) connection 108. Also shown are other possible clients 101, 103 possibly used by other application systems users, or interested parties, similarly connected to the internet 107 via an ISP connection 104, with these units communicating to possibly a home office via an ISP connection 109 to a gateway/tunnel-server 110 which is connected 111 to various enterprise application servers 112, 113, 114 which could be connected through another hub/router 115 to various local clients 116, 117, 118. Any of these servers 112, 113, 114 could function as a server of the present invention, as more fully described below. Any user situated at any of these client machines would normally have to be an authorized user of the system as described more fully below.

Figure 2:
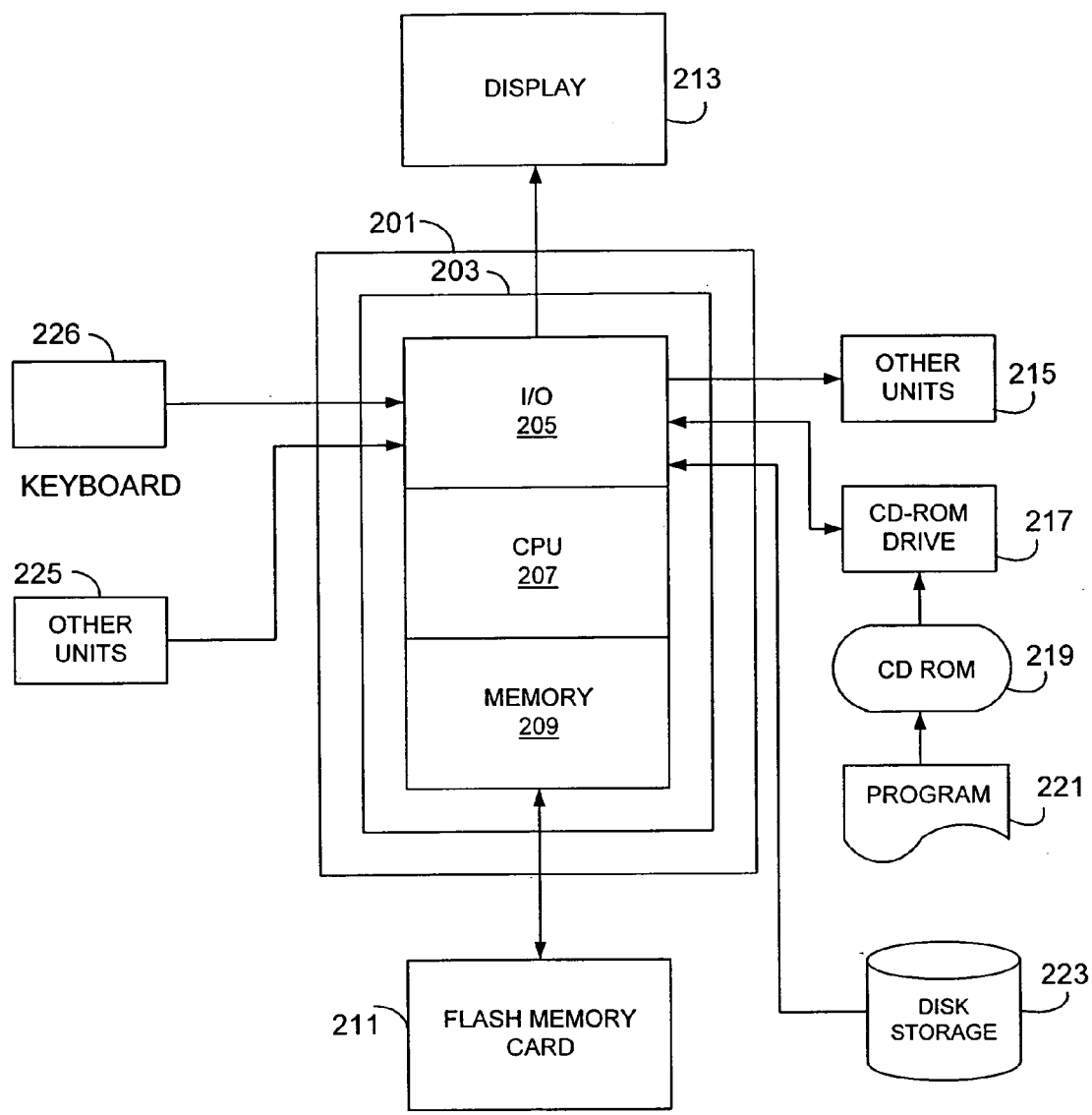
FIG. 2 illustrates a typical general purpose computer system of the type representative of the preferred embodiment.

An embodiment of the Business Applications Platform System of the present invention can operate on a general purpose computer unit which typically includes generally the elements shown in FIG. 2. The general purpose system 201 includes a motherboard 203 having thereon an input/output ("I/O") section 205, one or more central processing units ("CPU") 207, and a memory section 209 which may or may not have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Such programmed computers may also be connected electronically to database systems such as those available from Oracle™, Sybase™, Informix™, SQLServer from Microsoft™ and the like. Logic circuits or other components of these programmed computers will perform series of specifically identified operations dictated by computer programs as described more fully below.

Detailed System Description

The Platform system of the present invention is now described in more detail. In general a preferred embodiment with a presently known best mode for making and using the system is described. Alternative embodiments are similarly described for various parts of the Platform system.

Business Applications Server/BDK

PREFERRED EMBODIMENT

The following description of the BDK Business application server covers the presently preferred embodiment and the presently known best mode for making and using it. This section is followed by a further description of an alternative embodiment which may include features in addition to or in place of those in the preferred embodiment.

1. Overview

The Business Development Kit applications server (BDK) component of the Platform provides a supporting framework for business objects. A business object is a Java object with persistent state that represents some entity in a business application, such as an employee or company.

Specifically, the BDK provides a persistence framework for saving and restoring object state and a set of core services for performing a variety of useful operations on business objects.

2. Persistence Framework

The persistence framework defines a common code path used to create new objects, restore and update existing objects, delete objects, and find objects. The code path consists of a set of Java code and database stored procedures to construct and verify object data and SQL commands to save and restore information using a relational database.

The persistence framework is highly flexible because it is metadata-driven. For each class of object, the system provides a set of metadata—data about data—that defines the class' properties and behavior. This means that the data used to determine the behavior and characteristics of specific classes and instances of business objects is stored as distinct, editable information, rather than being hard-coded into the logic of the system. The persistence code itself is part of the metadata, that is, the SQL commands for save, restore, etc. are stored as metadata, not in source code. As an example benefit, it makes applications much easier to port between databases because only the metadata for the SQL needs to be changed; no source code needs to be changed and recompiled.

Use of metadata allows the system to be configured and otherwise modified by different clients for different deployments, resulting in unique runtime behavior of the system.

Object properties that can be customized range from the labels used to display object information, to the type of data validation performed, to the amount of custom information associated with each object.

A unique feature of the persistence framework is its support for an arbitrary amount of custom information, stored in what is known as "custom fields." Experience has shown that predefined business objects typically do not express the full set of data a given customer may wish to track, and that this data varies from customer to customer. Custom fields provide a way for different customers to uniquely extend the data stored with a class of business objects. In the current implementation, customers are provided with a set of five "custom fields" that can be searched, and an unlimited number of "extended custom fields" that cannot be searched, but provide additional data validation for date and numeric values. Again, the code to save and restore custom fields is all driven off metadata.

As an example of the persistence framework's operation, a user of the system may attempt to create a new employee by specifying the employee's first and last name, social security number, starting salary, and date of birth. The persistence framework performs the following operations to save this data as a new "SabaPerson" business object:

- Uses metadata settings about the "first name", "last name", "ssn", and "birth date" properties of a "SabaPerson" to determine the data validation to perform. In this case, the metadata settings may instruct the framework to verify that values are provided for first name, last name, and ssn, that starting salary is greater than a fixed numeric minimum wage value, and that birth date is a valid date.
- Uses metadata to obtain and execute a database stored procedure named "tpp_person_ins" that takes values for first name, last name, ssn, salary, and birth date as parameters and inserts these values into a database table named "tpt_person."

2a. The Meta-Data Store

In the preferred embodiment the meta-data store contains the definition of each type of object in the system, its attributes, and some basic properties of those attributes. Further, for each type of object, it contains a reference to the methods to invoke, to insert, update, delete or fetch a given instance of that object from the persistent store.

The Metadata store consists of the following tables:
1. fgt_dd_class

Every business object in the system is registered in this table. This table also describes basic properties of objects.

fgt_dd_class has the following columns:

| Column Name | Type | Rq? | Description |
|---|---|---|---|
| Id | Char (20) | | The identifier of the object. |
| Ui_name | Varchar2 (255) | | This is the display name of the object and generally used to paint UI as well. |
| Description | Varchar2 (255) | | Meaningful description of the object and its function. |
| Enumber | int | | Unique number for each object. |
| Insert_spid | Int | | Method call for inserting a new instance of the object. Foreign key to mesg_id column of fgt_mesg_table. |
| Update_spid | Int | | Method call for updating an existing instance of the object. Foreign key to mesg_id column of fgt_mesg_table. |
| Delete_spid | Int | | Method call for deleting an instance of the object. Foreign key to mesg_id column of fgt_mesg_table. |
| Sel_det_spid | Int | | Method call for retrieving an instance of the object based on its id. Foreign key to mesg_id column of fgt_mesg_table. |
| Finder_id | Int | | Finder Id for invoking a default finder associated with the object. |
| Fixed_attr_ct | Int | | Total count of the fixed attributes for the object. |
| Attr_ct | Int | | Total count of the attributes for the object. This number is sum of all fixed and all custom attributes. |
| Flags | Char (10) | | Ten bit string describes the behavior of the object. 1st bit = Object can be displayed in the security screen for granting privs. 2nd bit = This 2 bit mask is set to see if reports or letters or both can be attached. 3$^{rd}$ bit = Obsolete. 4$^{th}$ bit = Obsolete. 5$^{th}$ bit = If the object is owned in nature and cannot exist without its owner. 6$^{th}$ bit = Obsolete 7$^{th}$ bit = If object can be customized bu end user. 8$^{th}$ bit = If Object can have Extensible attributes of its own. |
| next_attr_enum | Int | | Enumber to use for the next custom attribute that will be added to the object. The install time value for this attribute is 10,000. |
| Prefix | char (5) | | This 5 letter long string is used in generating Ids for the object. This string is prepended to the number generated by the sequence. |
| Table_name | Varchar2 (25) | | This is the name where the object is stored. The sequence, methods are also named based on this. |
| Domain_enum | Int | | This is denormalized data and shows the enumber of the Domain attribute. |
| Java_class_name | Varchar2 (255) | | The java class name of the object. |
| Hlevel | Int | | The level of the object in the object hierarchy. |
| Parent_id | Char (20) | | In case of hierarchical object's it stores the parent object's id |

As an example, the following are the values for a class of business object representing domains:

| id | ui_name | description | enumber | insert_spid |
|---|---|---|---|---|
| ddcls000000000001095 | Domain | Hierarchal Domain | 195 | 10560 |

-continued

| update_spid | delete_spid | sel_det_spid | finder_id | fixed_attr_ct |
|---|---|---|---|---|
| 10562 | 10561 | 10563 | 15710 | 14 |

| attr_ct | flags | next_attr_enum | prefix | table_name |
|---|---|---|---|---|
| 14 | 1100001100 | 100000 | domin | fgt_domain |

| domain_enum | java_class_name | hlevel | parent_id |
|---|---|---|---|
|  | com.saba.busobj.SabaDomain | 1 |  |

2. fgt_dd_attr

The attributes of each class of business object is stored in this table. This table also describes basic properties of each attribute.

fgt_dd_attr has the following columns:

| Column Name | Type | Rq? | Description |
|---|---|---|---|
| Id | Char (20) | Y | Unique identifier for an attribute. |
| Cid | OBJECTID | Y | The object id, this attribute belongs to |
| Enumber | Int | Y | Required to be unique within a class. The code should use these numbers to refer to attributes rather than using the ID. Fixed enumbers are assigned in the range 1000-9999. Extensible attributes are allocated from 10,000 onwards. The next_attr_enum in the corresponding object record stores the next enumber available for this class. |
| Col_name | Varchar (255) | Y | The column name in which the value of this attribute is stored. |
| Ui_name | Varchar (255) | Y | The name of the attribute, which is used for painting the UI. |
| description | Varchar (255) | N | Description of the attribute. |
| Attr_type | Int | Y | The number corresponds to the data type of the attribute. |
| list_of_vals | OBJECTID | N | If the attribute val. is selected from a list of values, then the id of the list is stored here. |
| min_val | Int | N | If its a numeric column, then the min allowable value if any. |
| max_val | Int | N | If its a numeric column, then the max allowable value if any. |
| default_val | STR | N | Default value to use for the attribute when an instance of the object is created. |
| str_1 | STR | N | This generation formula for those attributes whose values have to be generated on the creation of the object. The generation is driven by the generation bit in the flag. |
| Flags | varchar (15) | Y | 1$^{st}$ bit => The required bit.<br>2$^{nd}$ bit => Reference bit is set if attribute points to another object.<br>3$^{rd}$ bit => LOV bit is set if its values must come from fixed list of values.<br>4th bit => This two bit mask describes the type of the attribute.<br>5th bit => Id bit is set if its an Id column.<br>6th bit => Generation bit is set if the value need to be generated during the creation of an object.<br>7th bit => Customization bit. This 4 bit mask says if label, required or generation can be customized by end user.<br>8th bit => Audit bit.<br>9th bit => Obsolete<br>10th bit => Obsolete<br>11$^{th}$ bit => This bit describes the type of the custom attribute.<br>12$^{th}$ bit => Domain bit is set if the attribute is domain id.<br>13$^{th}$ bit => set if Default value can be changed by user.<br>14$^{th}$ bit => set if Minimum value can be changed by user.<br>15$^{th}$ bit => set if Maximum value can be changed by user. |

As an example, the following are some of the attributes defined for the domain business object:

| id | cid | enumber | col_name | ui_name | attr_type | flags |
|---|---|---|---|---|---|---|
| ddatr00000000002991 | ddcls000000000001095 | 1000 | id | ID | 8 | 100011000000000 |
| ddatr00000000002992 | ddcls000000000001095 | 1001 | time_stamp | Time Stamp | 4 | 100000000000000 |
| ddatr00000000002993 | ddcls000000000001095 | 1002 | name | Domain Name | 4 | 100000100000100 |
| ddatr00000000002994 | ddcls000000000001095 | 1003 | description | Description | 7 | 000000300000100 |
| ddatr00000000002995 | ddcls000000000001095 | 1004 | custom0 | custom0 | 7 | 000100300010100 |

3. fgt_mesg_table

This table stores the actual SQL code used for object persistence. In the case of insert, update, and delete methods, typically these are calls to stored procedures containing additional business logic in addition to database calls. Long SQL statements are stored in multiple rows, which are then reconstructed on-the-fly by the persistence layer.

fgt_mesg_table has the following columns:

| Column Name | Type | Rq? | Description |
|---|---|---|---|
| Mesg_id | Int | Y | This is the message id for the SQL statement group. |
| Mesg_seq | Int | Y | Since the SQL statements can be greater than 255 chars which is the length of the mesg_text columns. This column tells the sequence of this SQL statement in the group. |
| Mesg_text | Varchar (255) | Y | The text of message. |

As an example, the following are persistence calls for the domain business object. Note from the sample data above that 10563 is the code for retrieving an object, 10560 for inserting an object, and 10562 for updating an object.

| mesg_id | mesg_seq | mesg_text |
|---|---|---|
| 10563 | 1 | select d.id id, d.time_stamp ts, d.name dname, d.description descr, d.custom0 c0, d.custom1 c1, d.custom2 c2, d.custom3 c3, d.custom4 c4, d.created_on cron, d.created_by crby, d.updated_on upon, d.upd |
| 10563 | 2 | ated_by upby, d.parent_id pid, parent.name parent from fgt_domain d, fgt_domain parent where d.id = @001 and d.parent_id = parent.id(+) |
| 10560 | 1 | begin fgp_domain_ins (@001, @002, @003, @004, @005, @006, @007, @008, @009, @010, @011, @012, @013, @014, @015) ; end; |
| 10562 | 1 | begin fgp_domain_upd (@001, @002, @003, @004, @005, @006, @007, @008, @009, @010, @011, @012, @013, @014, @015) ; end; |

Notice that the SQL references the actual table used to store domain data, fgt_domain (described in detail in the section on security).

The fgp_domain_ins stored procedure is PL/SQL code defined as:

```
create or replace procedure fgp_domain_ins
(
    xid             char,
    xtime_stamp     varchar2,
    xname           varchar2,
    xdescription    varchar2,
    xcustom0        varchar2,
    xcustom1        varchar2,
    xcustom2        varchar2,
    xcustom3        varchar2,
    xcustom4        varchar2,
    xcreated_on     date,
    xcreated_by     varchar2,
    xupdated_on     date,
    xupdated_by     varchar2,
    xparent_id      char,
    xnewts          varchar2
)
as
begin
    /* validating that the parent of a node is not itself */
    if (xid = xparent_id) then
            raise_application_error(-20698, ' ') ;
            return;
    end if;
```

-continued

```
    /* parent_id cannot be null except for the root */
    if (xid <> 'domin000000000000001' and xparent_id is null) then
            raise_application_error(-20699, ' ') ;
            return;
    end if;
    insert into fgt_domain (
            id, time_stamp, name, ci_name, description,
custom0, custom1,
            custom2, custom3, custom4, created_on,
created_by, updated_on,
            updated_by, parent_id)
        values (
            xid, xnewts, xname, lower(xname),
xdescription, xcustom0, xcustom1,
            xcustom2, xcustom3, xcustom4, sysdate,
xcreated_by, sysdate,
            xupdated_by, xparent_id);
    /* update the denormalized flat tree table */
    tpp_flat_tree_relation(195, xid, null, null, 0) ;
    /* inherit a snapshot of the custom fields for all objects */
    insert into fgt_dd_domain_to_attr
            (ID, TIME_STAMP, DOMAIN_ID, ATTR_ID,
            FLAGS,
LOCAL_FLAGS, UI_NAME, MIN_VAL,
            MAX_VAL, DEFAULT_VAL, LIST_OF_VALS,
GEN_MASK)
        select 'ddoat' ||
lpad(ltrim(rtrim(to_char(fgt_dd_domain_to_attr_seq.nextval))), 15,
'0'),
            xnewts, xid, ATTR_ID, FLAGS, LOCAL_FLAGS,
UI_NAME, MIN_VAL,
            MAX_VAL, DEFAULT_VAL, LIST_OF_VALS,
            GEN_MASK
        from    fgt_dd_domain_to_attr
        where   domain_id = xparent_id;
end;
```

2b. Persistence Algorithms

In a preferred embodiment all business objects that Saba's Application server manipulates are derived from a single base class called SabaObject. The SabaObject class provides save, restore, and delete capabilities by implementing the persistence layer architecture. All subclasses of SabaObject then inherit this behavior and rarely if ever override it.

Every SabaObject is expected to know which class it belongs to, and how that class is registered in the meta-data store. Thus each subclass of SabaObject stores a class identifier so that it can tell the system which entry in the meta-data store it corresponds to.

Every SabaObject also stores a state flag that determines whether this is a new object, or it is an object that already exists in the data store. This state then determines whether the object invokes an insert method or an update method during a save( ) invocation.

Every SabaObject has an unchangeable, unique identifier that identifies that particular object in the persistence store. The uniqueness of this identifier is guaranteed across the entire persistence store regardless of the type of object.

The algorithm for save is then as follows:

Look up the entry for the class of the object in the meta-data store.

If the class is not found, raise an error "Unknown Class".

If (State=new)

M=look up the method to call for inserting the object.

Else /* State=update */

M=look up the method to call for updating the object

Marshall all the attributes of the SabaObject into the appropriate data structure.

Check each of the attributes against the rules set for its nullity, constraints. If any of the constraints are violated, throw an error.

Lead the default values wherever necessary.

Invoke M with that data structure. (1)

For deletion, the basic process is identical, except that the invocation of the delete method only requires the unique identifier of the SabaObject to be passed in as its only argument.

For restore, the algorithm is just slightly different and is as follows:

Look up the entry for the class of the object in the meta-data store.

If the class is not found, raise an error "Unknown Class".

M=look up the method to call for fetching the object.

Invoke M(unique ID of SabaObject)

Unmarshall all the attributes returned by M. (2)

In the presently preferred embodiment, the method invocation currently only supports invocation of database stored procedures although in alternative embodiments this will be extended to other types of persistence mechanisms.

These stored procedures provide the actual intelligence of taking the marshaled arguments that come in, and storing them in specific fields in the database, and vice versa. Thus a combination of the meta-data store and the stored procedures create an abstraction layer that allows the base SabaObject to store all objects through a simple, uniform algorithm.

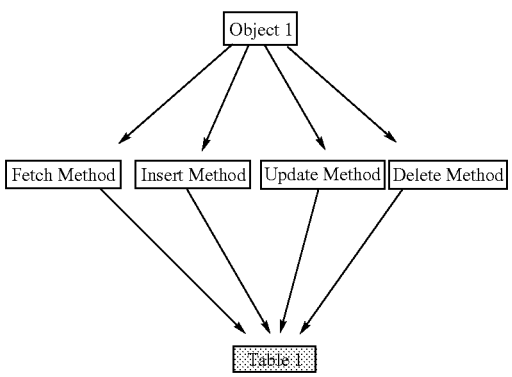

The persistence mechanism thus created allows the transfer of various kinds of objects to database storage as shown below.

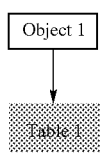

FIG. 1. Single object to a single table

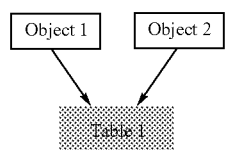

FIG. 2. Two objects to a single table

-continued

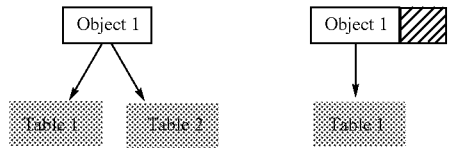

FIG. 3: Single object to two tables

FIG. 4: Object with calculated fields that do not physically exist in the table

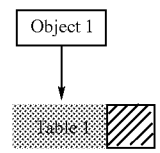

FIG. 5: Object does not have denormalized fields that exist in the table

Individual messages are retrieved using a SQL command of the form:

select mesg_id, mesg_seq, mesg_text from fgt_mesg_table where mesg_id=? order by mesg_id, mesg_seq Query results are transformed into actual SQL code using the following method:

```
private static String processMessage(ResultSet rSet)
    throws Exception, SabaException
{
  StringBuffer buf;
  String str;
  buf = new StringBuffer (rSet.getString (kMsgTextCol)) ;
  while (rSet.next( ) != false)
  {
    String temp = rSet.getString(kMsgTextCol);
    buf.append(temp);
  }
  str = buf.toString( ) ;
  return str;
      }
}
```

Retrieved messages are also stored in a local cache for improved performance.

2c. Configurable Custom Fields

In the preferred embodiment, the Saba persistence mechanism provides built-in support for configurable, runtime definable, custom fields for any object.

The basic mechanism is extremely simple. An administrative user interface is provided by which the meta-data definition of a given class can be extended by adding (or removing) custom attributes as needed. For each custom attribute, the user only needs to provide some very basic information about the type of the field, whether or not it is required, constraining minimum and maximum values for numeric fields, and a constraining list if the field is to be validated against a list of possible values.

The SabaObject implementation then simply picks up these fields during its normal marshalling and unmarshalling of arguments. Further, the SabaObject also performs the basic checks for nullity as it would normally do.

To save and restore the custom fields, the actual algorithms are extended from the ones shown earlier. In the case of insert or update the following additional lines are called after the line marked (1) in the algorithm shown earlier:

After invoking the basic method M
Marshall all custom field data into the appropriate data structure
Invoke the insert/update method for storing the custom data structure.

In the case of restore, the following lines are added to the original algorithm after the line marked (2):

Invoke the custom field fetch
Unmarshall all custom field data and update the relevant fields in the SabaObject.

The actual storage where the custom field data for any given instance is stored, consists of a single table as defined below. All the custom field data is stored as tag-value pairs in typed columns.

Fgt_dd_custom

This common table provides the storage area for all data stored in the extended custom fields for a given object.

| Column Name | Type | Rq? | Description |
| --- | --- | --- | --- |
| Id | OBJECTID | Y | |
| owner_id | OBJECTID | Y | Which object this custom field is for. |
| attr_id | OBJECTID | Y | Refer to the attribute for which value is stored. |
| attr_type | INT | Y | Type of the custom field. This matches the attr_type in the fgt_dd_attr table and is a denormalization of the same. |
| Num_value | Number | N | Value is stored here if it is Numeric type |
| Str_value | Varchar(255) | N | Value is stored here if it is String type |
| Date_value | Date | N | Value is stored here if it is Date type |

3 Core Services

BDK also provides a set of core services to perform useful operations on business objects. Some of these services include:

Security. BDK provides extremely fine-grained security control to control whether specific users have privileges to perform operations such as creating or viewing a particular class of business object. The system is unique in that it provides a flexible model of security roles and security lists to assign a set of privileges to distinct groups of users, and it employs a scalable notion of domains to differentiate among sets of business objects. The security model is explained in detail in a separate section below.

Auditing. BDK provides the ability to track the history of all changes to an object, including the date of a change, the identity of the user making the change, and a justification for the change.

Internationalization (i18n). BDK provides utilities for allowing business objects to be internationalized. Internationalization is a standardized process wherein message content, money amounts, dates and various other culture specific data are kept in separate files in order to permit an easy change from one countries language and cultural rules to another. This comprises both storing values of business objects in multiple languages and supporting multiple formats for date, currency, and other data types that vary among countries.

Concurrency. BDK provides concurrency services for controlling overlapping write operations on multiple instances of an object, while permitting multiple reads at the same time. This is achieved via comparison of an instance-specific timestamp when committing of an object's state to the persistent store is requested. The timestamp is updated whenever the state of an object is altered and the object is successfully committed to persistent storage.

Transaction Management. BDK provides two types of transactional services: procedural and declarative. In the former case, a developer explicitly marks the beginning and end of a unit-of-work using BDK's API. In the latter case, a developer can associate a transactional attribute with a method, and the BDK's Transaction Monitor keeps track of initiating and terminating transactions, as well as executing a method within the scope of an on-going transaction, based on run-time context.

Logging. BDK provides logging functionality that can be used for capturing system state and operations in one or more logs.

Notification. BDK provides the ability to send notifications, such as emails or faxes, to predefined categories of users when the state of identified business objects changes. For example, everyone subscribed to a class may receive a page if the class is cancelled.

Business Rules. In a preferred embodiment, for example, Saba's learning application provides a set of predefined business rules that affect the workflow and behavior of various business objects in the system. The BDK provides a mechanism to enable and disable these business rules. For example, a customer can configure whether a manager's approval is required to register for a class. Similar business rules can be handled for other types of applications.

Notes. BDK provides the ability to associate arbitrary, free-form text, or "notes," with any business object in the system.

4 Application Programming Interfaces

In the preferred embodiment, the BDK exposes Application Programming Interfaces (APIs) for use in programming the system. A variety of APIs with equivalent functionality are supported on top of the persistence framework. The system supports both propriety and industry-standard forms of Java API, as well as XML-based APIs.

a. SabaObject API

One Java API is a proprietary "SabaObject" interface to a business object. A SabaObject is a Java class defining a set of operations common to all business objects, including the ability to get and set properties using a variety of data types and the ability to save and restore an object's state. Specific business object classes can subclass SabaObject to add functionality and business logic appropriate to that class.

The Java interface for SabaObject is the following:

```
public class SabaObject {
    /**
     * SabaObject Constructor
     * Creates a new empty Saba object in the context of the
given session.
     */
    public SabaObject (String sessionKey) ;
    /* methods to set attribute values as different datatypes
*/
    public void setAttrVal (String attrName, Boolean attrVal) ;
    public void setAttrVal (String attrName, Timestamp
```

-continued

```
attrVal);
        public void setAttrVal (String attrName, Integer attrVal);
        public void setAttrVal (String attrName, BigDecimal
attrVal);
        public void setAttrVal (String attrName, String attrVal);
        public void setAttrVal (String attrName, Object attrVal);
        /* methods to restore attribute values as different
datatypes */
        public String getAttrVal (String attrName);
        public String getStringAttrVal (String attrName);
        public Integer getIntegerAttrVal (String attrName);
        public Timestamp getTimestampAttrVal (String attrName);
        public BigDecimal getBigDecimalAttrVal (String attrName);
        public Boolean getBooleanAttrVal (String attrName);
        /**
         * Gets a hashtable of the attribute values.
         */
        public Hashtable getAttributeValues ( );
        /**
         * Returns the display label for the named attribute
         */
        public String getAttributeLabel ( String attrName);
        /* save, restore, and delete methods */
        public void save ( );
        public void save (SabaTransaction tr);
        public void restore ( );
        public void restore (SabaTransaction tr);
        public void delete ( );
}
```

In the preferred embodiment, as part of a business object's creation, the business object author provides four SQL statements corresponding to selection, deletion, insertion, and updating of the object. Pointers to these statements are provided as part of the metadata for the object as stored in fgt_dd_class. The first two (selection and deletion) types of statements take a single bind variable, namely, the id of the object. The other two take the id as well as all other attribute values in the order declared in the metadata for that object's attributes in the table fgt_dd_attr. The order of retrieval of attributes in the selection statement must also match such order.

Upon receiving a request to create an in-memory representation of an object through the "restore( )" method, BDK retrieves the selection statement for that class of objects, binds the variable to the id of the object that is desired to be restored, executes the statement, and fills in an instance-specific hashtable of attribute-value pairs with the values so retrieved. In addition, a standard SQL statement is executed to retrieve the value of extended custom attributes, and the results are again inserted in the aforementioned hashtable. For the "restore(SabaTransaction tr)" variant of this operation, the execution of these SQL statements is done using the database connection contained in tr, the transaction argument. When executing the "delete( )" method, the object is marked for deletion. Upon a subsequent call to "save( )" or "save(SabaTransaction tr)," BDK checks for the state of the object. If it is an object that has been marked for deletion, the deletion SQL statement as supplied by the business object author is executed after binding the id, using the database connection in the transaction argument for the "save(SabaTransaction tr)" case. Other possibilities upon execution of the save operation are that the object instance is new, or it is an altered state of an existing object. In these cases, the statements corresponding to insertion and updating are executed, respectively, after the replacing the bind variables with attribute values from the hashtable in the order specified in metadata. In the case of insertion, BDK automatically generates a unique id for the object that is reflected both in the persistent storage and the in-memory representation.

Implementation of the setAttrVal( ) and get<type>AttrVal( ) involve setting and accessing values in the hashtable, respectively, using the provided attribute name as the key. getAttributeValues( ) returns a copy of the object's hashtable whereas getAttributeLabel( ) looks up the attributes' metadata and returns the label corresponding to the chosen attribute.

4b. SabaEntityBean API

Another Java API is based on the industry-standard Enterprise JavaBean (EJB) model. This model has a notion of "entity beans" that provide the interface to specific business objects. Accordingly, the persistence framework provides a EJB-based abstract class, "SabaEntityBean" that implements the javax.ejb.EntityBean interface. The SabaEntityBean class provides default implementations of the following methods: ejbActivate( ), ejbPassivate( ), ejbRemove( ), setEntityContext( ), ejbCreate( ), ejbLoad( ), ejbStore( ), and unsetEntityContext( ). Implementations of the ejbLoad( ), ejbstore( ), ejbCreate, and ejbRemove( ) methods rely on the selection, update, insertion, and deletion statements declared as part of metadata (please refer to the discussion of the implementation of SabaObject's API). Other methods are implemented as empty stubs that can be overridden by a developer if desired.

In addition to defining the bean class, to implement an EJB one also needs to define a corresponding remote interface, a home interface, and, for entity beans, a primary key class. The remote interface is the external world's view of the bean and is comprised of the business methods that the bean wishes to expose. The getters and setters for the bean's attributes are also exposed through the remote interface. The home interface declares the life-cycle methods, such as those for creating, removing, or finding beans.

In the preferred embodiment, the BDK provides two interfaces, ISabaRemote and ISabaHome, which a bean can extend for defining remote and home interfaces, respectively. The ISabaRemote interface extends the standard EJB interface EJBObject and provides the following sets of methods:

void setCustomAttrVal(String attr, <type> value), and
  <type> getCustomAttrVal(String attr)

for Boolean, Timestamp, String, Integer, Float, and Double data types. The ISabaHome interface provides a layer of abstraction over the standard EJB interface EJBHome. The BDK also defines a class SabaPrimaryKey (a thin wrapper around the String class) which can be used by entity beans for defining primary keys.

4c. Session Manager APIs

The EJB model also has a notion of "session beans," higher-level interfaces that represent business processes. In the preferred embodiment, the BDK has standardized on the use of session bean-based interfaces as its public API; these interfaces are known as "session bean managers," and are implemented using the lower-level entity bean APIs provided by the persistence layer. The BDK provides a SabaSessionBean base class that defines common session bean manager functionality, and a framework for several categories of "helper classes"—additional interfaces used in conjunction with specific session bean managers:

Detail—represent immutable detail information about a specific business object
  Handle—represent opaque references to a business object
  Primitive—represent commonly used data structures, such as addresses and full names 4d. XML Interfaces In the preferred embodiment, the BDK also provides XML-based interfaces for saving and retrieving business objects; these interfaces provide the communication layer with the other Platform servers and components.

One XML format is known as "Saba Canonical Format" (SCF). It is an XML serialization of the data in a SabaObject. The Interconnect server system reads and writes SCF to implement the AccessorReader and ImporterWriter for the native Saba system; refer to the Interconnect server section for more details.

An example fragment of an SCF document, representing a business object defining a specific currency, is:

```
<SabaObject type="com.saba.busobj.SabaCurrency"
    id="crncy000000000000001" status="existing">
    <name dt:type="string">US Dollars</name>
    <time_stamp
dt:type="string">199812161647032900</time_stamp>
    <short_name dt:type="string">USD</short_name>
    <flags dt:type="string">1100000000</flags>
</SabaObject>
```

In the preferred embodiment, another XML interface is the "IXMLObject" interface. An IXMLObject is a Java object capable of serializing itself into an XML representation. The detail, handle, and primitive helper objects used by session bean managers all implement this interface. The WDK server system uses these objects to generate dynamic web content by invoking the session bean manager APIs, then serializing the resulting objects into XML; refer to the WDK section for more details.

The IXMLObject interface conforms to the "Visitor" design pattern, and is defined as follows:

```
public interface IXMLObject {
    /**
    * Accept a visitor. An implementation should ask the
Visitor to visit each of its public elements (i.e., fields or
properties).
    *
    * @param visitor The XML Visitor object
    */
    public void acceptXMLVisitor(IXMLVisitor visitor) throws
XMLVisitorException;
    /**
    * Get the preferred tag name for this object.
    * @return the tag name to identify
    */
    public String getTagName( );
}
```

Note: a "visitor" object is one which has processes which represent an operation to be performed on the elements of an object structure. A visitor lets one define a new operation without changing the classes of the elements on which it operates. Visitor objects and their operation and use are described in more detail at pages 331–344 of *Design Patterns*, by Gamma, Helm, Johnson, & Vlissides, Addison-Wesley 1995, ISBN 0-201-63361-2 which are hereby fully incorporated herein by reference. Those skilled in these arts will recognize that various other implementations of these algorithms and concepts may be developed without departing from the spirit and functionality of this invention. Additional background information can be found in *Enterprise JavaBeans Specification*, v1.1 (can be found at url=java.sun.com/products/ejb/docs.html), and in other sections of the book titled *Design Patterns*, by Gamma, Helm, Johnson, & Vlissides, Addison-Wesley 1995, ISBN 0-201-63361-2 which are hereby fully incorporated herein by reference.

ALTERNATIVE EMBODIMENT

An alternative embodiment of the BDK business applications server may be described as follows, using the context of how a developer and user would use this portion of the system. In an alternative embodiment, the developer's use is outlined in the context of a BDK development kit which would be provided by Applicants for use in developing applications which can run on the Platform and by way of indicating some details unique to the Platform through a description of a use of the Business Development Kit.

In the alternative embodiment, the Business Server embodies a development kit framework which provides a set of interfaces and classes in the form of Java packages, identifies certain services that developers can rely on, and defines an application development model. The framework relies extensively on the server-side component model espoused by Java, namely Enterprise JavaBeans (EJB) components. Selection of EJBs as the server-side component model is driven in part by the requirements of reliance on open standards and backward compatibility. Using EJBs also enables integration with other Java 2 Enterprise Edition (J2EE) technologies such as Java ServerPages (JSP) and servlets that one would intend to use for web applications development. Furthermore, a number of EJB-enabled application servers available in the marketplace could be used to deploy the components so developed.

In the alternative embodiment, the development kit classes and interfaces, the services, and the application development model are discussed in greater detail in the next three subsections.

Classes and Interfaces

The BDK interfaces and classes address the following needs.

1. Provide an additional layer of abstraction (by writing wrappers around base Java classes) to provide a richer level of functionality needed by SABA applications and to allow future modifications with minimal impact on the client application code.
2. Expedite component development by providing default implementations (that can be overridden) of certain required interfaces in EJB.
3. Define certain interfaces that must be implemented by classes used for specific purposes (an example is that a class must implement a certain interface if its instances are used in a JSP page).
4. Define certain classes that are necessary to provide basic services, such as data partitioning and logging, as well as utility classes for expedited application development.
5. To the extent possible, eliminate application server dependencies in areas where the EJB Specification is currently not vendor independent.

In the alternative embodiment, the following discussion of is background for a discussion of the usage and types of EJBs within the context of the development kit described in more detail below.

Metadata Support

In the alternative embodiment, one of the facilities provided by the development framework is that characteristics of business objects can be varied across deployment. For example, for an attribute, one can optionally specify whether it has a required attribute, the list of values (LOVs) that the attribute can assume, its default value, and its minimum and maximum values. The values can be different across installations, as different customers have different requirements. To achieve this flexibility, metadata about the business objects and their attributes is captured in the system.

In the alternative embodiment, some of the metadata that is currently captured about a class or an attribute could be dynamically determined using the Java reflection API. Examples include the parent ID and attribute count for business objects and attribute type for an attribute. The Java reflection API provides classes Class and Field that can be used to retrieve such information. Furthermore, instead of building a hashtable-based infrastructure for storing and retrieving attribute values, one can use methods like set and get in the Field class to operate directly on the attributes, which are declared as member variables of the class.

The classes Class and Field by themselves, however, may not provide the rich functionality needed by certain applications. For instance, there is no way to indicate minimum and maximum values of an attribute in the Field class. Thus, what is needed is to create new classes that provide wrappers around Class and Field and capture the additional information. In the interest of consistency with previously used names while avoiding conflicts at the same time, two new classes maybe used: SabaPlatformClass (inherits from Class) and SabaPlatformAttribute (inherits from Field). In addition to the functionality provided by Class (e.g., for getting parent class), SabaPlatformClass provides for such additional functionality as domain-based attributes and getting fixed vs. extended custom attribute counts. Similarly, SabaPlatformAttribute provides functionality for LOVs, default value, and minimum and maximum values. (As we will discuss later, the classes SabaPlatformClass and SabaPlatformAttribute themselves are beans—or, entity beans to be more specific—in this alternative embodiment system.)

The classes SabaPlatformClass and SabaPlatformAttribute will not be used directly by users of business components (though developers of such components will use them). Typically, the user of these classes will be a class SabaPlatformObject. In some instances, SabaPlatformObject will make use of the functionality provided by these classes as part of an operation (e.g., when setting the value of an attribute, SabaPlatformObject will use SabaPlatformAttribute to determine the minimum and maximum value constraints). In other cases, SabaPlatformObject will delegate an operation directly to one of these classes (an example would be retrieving the superclass of an object). SabaPlatformObject implements a set of methods for getting and setting attribute values that provide a centralized point for capturing the logic for such things as auditing and constraint checking, and are used by subclasses of SabaPlatformObject.

In this alternative embodiment, a component user will not interact directly with even SabaPlatformObject. Instead, the component user will deal with a specialization of either a SabaEntityBean or a SabaSessionBean, which are discussed in the next subsection.

Beans

In the alternative embodiment, components based on Enterprise JavaBeans (EJBs) will be a basic building block for developing applications using the BDK. Below we provide a brief overview of EJBs. Those skilled in these arts will understand that various books and documents on the "java.sun.com" web site provide additional details on this subject. There are two types of EJBs:

1. Entity Beans, and
2. Session Beans.

Entity beans are used for modeling business data and behavior whereas session beans are used for modeling business processes. Examples of entity beans could be SabaClass (a training class, not a Java class), SabaPerson, and SabaRegistration. Entity beans typically would map to objects (tables) in the persistent data store. Behaviors associated with an entity bean typically would relate to changing the data in the bean.

An example of a session bean could be SabaRegistrar, which uses the entity beans mentioned above and encapsulates the business logic associated with certain tasks, such as registering for a class. Session beans are not persistent, though changes in data of certain entity beans or their creation or removal could result from the actions of a session bean. A session bean can be stateful or stateless. A stateful session bean maintains state information specific to the client using it, such that results of invocation of a method may depend upon the methods invoked earlier on the bean. (An example of a stateful session bean would be SabaShoppingCart, which would keep track of items in an order as they are being added, to be followed by either placement of the order or clearing of the cart.) This is typically done by storing client-specific data in instance variables of a bean, which are then used by the methods to accomplish their task. A stateless session bean does not maintain any state specific to a client. An example of a stateless session bean would be SabaTaxCalculator, which provides methods for computation of sales and other taxes.

In the alternative embodiment the development kit would provide two abstract base classes: SabaEntityBean and SabaSessionBean. (Whether a session bean is stateful or stateless is indicated in something called a deployment descriptor.) These classes implement the javax.ejb.EntityBean and javax.ejb.SessionBean interfaces, respectively. The intent is to provide a default implementation of certain required methods to enable rapid development of components, yet allow a component to override the default implementation of the methods it chooses. The SabaEntityBean class provides default implementations of the following methods: ejbActivate ( ), ejbPassivate ( ), ejbRemove ( ), setEntityContext ( ), ejbCreate ( ), ejbLoad ( ), ejbStore ( ), and unsetEntityContext ( ). Implementation of the ejbRemove ( ) and ejbCreate ( ) are discussed in the next subsection. The other methods in the list by default have an empty implementation. The SabaSessionBean class provides default (empty) implementations of the first four methods in the preceding list.SabaEntityBean inherits from SabaPlatformObject and provides attributes common to all the entity beans, (such as namespace) and has a method toXML ( ) that ensures that all entity beans will provide an implementation for serializing their data to an XML representation. In other words, SabaEntityBean implements an interface ISabaXMLRenderable (explained later) and provides two convenience methods: findUsingRQL (String rql) and findUsingRQLURI (String URI) to locate specific entity beans using RQL.

In addition to defining the bean class, to implement an EJB one also needs to define a corresponding remote interface, a home interface, and, for entity beans, a primary key class. The remote interface is the external world's view of the bean and is comprised of the business methods that the bean wishes to expose. The getters and setters for the bean's attributes are also exposed through the remote interface. A developer must implement these methods by calling the getAttrVal ( ) and setAttrVal ( ) methods available in SabaPlatformObject to take advantage of services like constraint checking and auditing. The home interface declares the life-cycle methods, such as those for creating, removing, or finding beans.

The development kit provides two interfaces ISabaRemote and ISabaHome, which a bean can extend for defining remote and home interfaces, respectively. The ISabaRemote interface extends the standard EJB interface EJBObject and provides the following sets of methods:

void setCustomAttrVal (String attr, <type> value), and
<type> getCustomAttrVal (String attr)

for Boolean, Timestamp, String, Integer, Float, and Double data types. The ISabaHome interface provides a layer of abstraction over the standard EJB interface EJBHome. The BDK also defines a class SabaPrimaryKey (a thin wrapper around the String class) which can be used by entity beans for defining primary keys.

One final interface defined in the BDK for EJBs is ISabaXMLRenderable. This interface extends the java.io.Serializable interface and defines a single method, toXML ( ). Only classes that implement this interface are eligible to act as return types of methods that are going to be invoked from a Java ServerPage.

In the alternative embodiment the BDK would come with a few prepackaged beans. One is a stateless session bean named SabaPlatformLogin that can be used to authenticate a user. Another is an entity bean named SabaNameSpace, which encapsulates characteristics of a namespace, including its place in the hierarchy and the list of users who have access to entity beans in that namespace. The namespace is used for data partitioning and security purposes.

Relationships

Another area in which the BDK provides support is relationships amongst entity beans. In an object model, relationships between different classes are arranged in four categories: inheritance, association, composition, and aggregation. During implementation, the inheritance relationship is captured by extending a subclass from a superclass. The other three types of relationships entail constraints between the classes being related. For instance, a composition relationship implies commonality of life span (i.e., destroying the "whole" should result in destruction of the "components") and an association relationship implies referential integrity constraints (i.e., creating an instance of a class which refers to a non-existent interface of another class is not permitted). In an alternative embodiment, such relationships can be captured through constraints in the database.

In the alternative embodiment, the BDK will provide a SabaRelationship class, that has attributes for the name of relationship, the type of relationship, the source class and attribute, and the destination class and attribute. The SabaRelationship class will encapsulate lifetime management constraints implicit in each of the different types of relationships. Thus, if an object is being removed and it is declared to have compositional relationship with some other objects, the SabaRelationship class will ensure the removal of the related objects. Similarly, when creating an object, the SabaRelationship class will ensure that referential integrity constraints are being satisfied. The SabaEntityBean class will delegate calls to the SabaRelationship class with in its ejbRemove ( ) and ejbCreate ( ) methods. Any implementation that a component developer provides for these methods for a specific bean would have to call super.ejbRemove ( ) or super.ejbCreate ( ) as appropriate.

In the alternative embodiment, an attribute capturing the list of relationships (where each item in the list is of type SabaRelationship) will be defined in the SabaEntityBean class. By default (i.e., at SabaEntityBean level), the list will be defined to be empty. When component developers create an entity bean by extending SabaEntityBean, they will be able to declaratively specify relationships between the bean being created and the other beans in the system. Additional relationships may be added to existing beans too when a new bean is created.

In the alternative embodiment, besides lifetime management, the declared relationships could also be used for navigational purposes within the object model. As an example, consider a situation where the SabaRegistration bean is related to the SabaClass bean, which in turn is related to the SabaLocation bean. One would like to be able to retrieve attributes of the location (say, the map) of the class, given a registration. A new class, SabaCompositeRelationship will allow one to compose navigational paths in terms of basic SabaRelationship objects. Then, given a source object and the name (or id) of a composite relationship, the SabaCompositeRelationship class will be able to fetch the destination object(s).

Vendor-Specific Wrappers

In the alternative embodiment, when some areas within the J2EE specifications are still not standardized and are left up to individual vendors for implementation, additional facilities will be needed. To prevent vendor-specific implementation details from migrating into SABA code, the BDK would provide a class SabaJ2EEVendor that provides a wrapper around vendor-specific implementations. SabaJ2EEVendor provides static methods that can be used to perform activities in a vendor-neutral fashion in SABA code. An example method in SabaJ2EEVendor is getInitialContext ( ), which encapsulates the logic for getting an initial context (at present, the mechanism for this is vendor-dependent). To use a particular vendor's implementation of J2EE specifications, one will have to provide implementations of the methods in this class. By default, the BDK will provide implementations of this class for a few selected J2EE servers.

Miscellaneous Classes

In an alternative embodiment, in addition to the foregoing, the BDK also provides the following utility classes that can be useful for developing components: SabaProperties, DateUtil, FormatUtil, LocaleUtil, SystemUtil, and Timer. Also, the following exception classes are supported: SabaException, SabaSecurityException, SabaFatalException, AttributeNotFoundException, and SabaRelationshipViolationException. For logging purposes, the BDK provides a SabaLog class and for debugging purposes, the BDK provides a SabaDebug class. The functionality provided by the foregoing classes is similar to that available currently.

The use of the various classes and interfaces discussed in this section is described in the "Application Development Model" section.

Services

A number of services are required by application developers to develop robust, flexible, and scalable systems. A number of these services are provided by the commercially available application servers that host the EJB components. In the following paragraphs we discuss the various services that an application developer can rely on and how these services might be used.

Distributed Components

One of the key ingredients for building scalable systems is the ability to distribute components. In the EJB model, different beans can be deployed on different computers transparently. Separation of interfaces from the implementation enables automated generation of stubs and skeletons that hide the details of network communications. A client application (or a bean that relies on another bean) (Subsequent references to a client application should be interpreted to be inclusive of beans that rely on other beans) uses a naming service to first locate the bean and then interact with it, thus making no assumptions about location of any given component.

Naming

As alluded to in the previous paragraph, before using a bean, it must first be located. All EJB application servers are required to provide Java Naming and Directory Service (JNDI) access for bean users. To use JNDI, a client application would typically first get an "initial context" (driven by properties such as where to find the EJB server, somewhat analogous to the JDBC connect string for locating a database), and then using the context, look up the home interface of the bean by its name. Using the home interface, the client can find a specific instance of a bean, create a new instance, or remove an instance. The naming service would be used and the interaction would be the same even if the bean instance is present locally (i.e., exists in the same Java Virtual Machine) instead of being deployed on a remote machine.

The JNDI naming mechanism also obviates the need for the SabaClassRegistry mechanism that is used at present. The client application looks for a bean by a name (say, Authentication). Any bean class that provides the implementation of the remote and home interfaces can be deployed against that name in the application server. Thus, at one installation, the default bean class SabaPlatformLogin can be deployed with a name of Authentication, whereas at some other installation, the bean class SabaLDAPLogin can be deployed with the same external name to use a different authentication logic.

Persistence

One of the benefits of using EJBs is that component developers do not have to worry about persistence of data, as the container hosting the (entity) beans can manage such persistence. Automatic persistence service provided by the application server enhances the productivity of bean developers, is more efficient at runtime, and allows the bean's definition to be independent of the type of data store used for persistence (e.g., a relational database or an object-oriented database). A component developer will be responsible for declaring part or all of the attributes of an entity bean as persistent in its deployment descriptor, and then mapping them to fields in a database at deployment time. The interface and mechanism of such mapping would depend upon the application server being used.

The bean is automatically saved to the persistent store when it is created by a client application using the create ( ) method, and when the container decides to synchronize the bean's state with the database if the bean's data has been changed by the client application. The container's decision is based on such factors as transactions, concurrency, and resource management. The container will remove the data from persistent store when the remove ( ) method is called by a client on an entity bean.

Concurrency

A component developer does not have to worry about concurrent access to an entity bean from multiple transactions (such as from several client applications). It is the responsibility of the container hosting the bean to ensure synchronization for entity objects. Indeed, use of the keyword synchronized is prohibited by the EJB Specification. Concurrent access for session beans is not meaningful, since by definition an instance of a stateful session bean can be used by only one client and stateless session beans do not maintain any data that needs to be shared.

Transactions

For transactions, an application developer has two options: 1) to explicitly demarcate the boundaries of a transaction, or 2) to use declarative transactional management available with EJBs. Use of declarative transactional management is cleaner and is strongly recommended. In this case, the level of granularity for managing transactions corresponds to methods in a bean. Instead of interleaving transaction boundaries within business logic, transactional attributes are separately declared in the bean's deployment descriptor (for a specific method, or as the bean's default) as one of the following six options:
TX_NOT_SUPPORTED, TX_SUPPORTS, TX_REQUIRED, TX_REQUIRES_NEW, TX_MANDATORY, TX_BEAN_MANAGED. Details of these can be found in books on EJB.

Security

As discussed earlier, application developers can use a stateless session bean, SabaPlatformLogin, to authenticate a user. In the deployment descriptor for every bean, access control entries are defined which list the identities (users or roles) that are allowed to invoke a specific method (alternatively, an access control list can act as the default for all the methods in a bean). According to EJB Specification, each client application accessing an EJB object must have an associated java.security.Identity object (generally associated at login time). The general Security system used in the present invention was discussed in more detail above.

Read/Write/Arbitrary Privileges

Search

To locate an instance of an entity bean, each entity bean provides a method findByPrimaryKey ( ) in its home interface. In addition, other finder methods (which must be named in accordance with the pattern find<criterion>) can also be provided. With container-managed persistence, the container generates the implementations of such methods automatically at deployment time. The mapping of finder methods to the database is vendor-dependent at present, though a standardized syntax for the same is a goal of EJB 2.0 Specification effort. In the meantime, a developer can implement the finder methods in terms of findUsingRQL ( ) and findUsingRQLURI ( ) methods available in SabaEntityBean.

Logging & Debugging

A component may be used by multiple applications in an interleaving fashion.

An application could have components distributed over multiple computers—how to assemble a unified log—use a "log server" bean—heavy performance price, impacts debugging class too.

Turning on and off debugging on a component basis. Mechanics of how to do it without having runtime checks every time a method in Debug is called. What if one app wants a component to turn debugging on whereas another wants to turn it off.

Application Development Model

In the alternative embodiment, to develop an application using the BDK, an object model of the application domain should be first developed, retaining a separation between objects that represent business processes and those that represent business data. The two types of objects, obviously, map to session beans and entity beans in EJB parlance. A controller object, for instance, would indicate a session bean whereas an object that persists its data would indicate an entity bean. An application would typically also include UI components (such as JSP pages or servlets) which would use such business components. Thus, there are two primary roles from an application development standpoint:

1. component developer, and
2. component user.

It is possible that an individual may play both the roles. Indeed, a component developer may need to rely on another component, and thus be a user as well as a developer. We will first look at the role of a component developer in the next subsection, and then look at the responsibilities of the component user. Finally, we will look at how an application can be packaged in this alternative embodiment.

Component Developer

To create a component, a developer needs to perform the following steps.

1. Define the remote interface of the component.
2. Define the home interface of the component.
3. Define the bean class.
4. Create the deployment descriptor of the component.

As an example, one will build a simple SabaPerson component. SabaPerson is a container-managed entity bean useful for explaining some basic concepts in EJBs and the BDK framework. One then illustrates issues surrounding business logic coding, transactions, and persistence in a question-answer format. Note that for simplicity's sake, package, import, try/catch/finally, etc., statements are not included in the following code segments.

The Remote Interface

```
public interface SabaPerson extends ISabaRemote {
    public String getFullName( ) throws RMIException;
    public String getFirstName( ) throws RMIException;
    public String getLastName( ) throws RMIException;
    public void setFirstName(String name) throws
RMIException;
    public void setLastName(String name) throws RMIException;
}
```

The remote interface provides the business methods or the world's view of the component. In our case, we have a single method that a client can use to get the person's full name. Also recall that ISabaRemote already declares setAttrVal ( ) and getAttrVal ( ) methods for manipulating the attribute values (such as fName and lName declared in the bean class), so they don't need to be declared again.

The Home Interface

```
public interface SabaPersonHome extends ISabaHome {
    public SabaPersonEJB findByPrimaryKey(SabaPrimaryKey id)
        throws FinderException, RMIException;
    public Collection findByName(String fName, String lName)
        throws FinderException, RMIException;
    public SabaPersonEJB create(String fName, String lName)
        throws CreateException, RMIException;
}
```

For container-managed beans, the container automatically provides an implementation of the findByPrimaryKey ( ) method and generates the code for other finders (such as findByName ( )) from an external description, which pending EJB 2.0 Specification, is vendor-specific.

The Bean Class

```
public class SabaPersonEJB extends SabaEntityBean {
    public String id;
    public String fName;
    public String lName;
    public String getFullName( ) throws RMIException
    {
        return (fName + lName);
    }
    public String getFirstName( ) throws RMIException
    {
        return (String) getAttrVal("fName");
    }
    public void setFirstName(String name) throws RMIException
    {
        setAttrVal("fName", name);
    }
    ...
    public void ejbCreate(String fName, String lName)
    {
        this.id = IDGenerator.getNewID( );
        this.fName = fName;
        this.lName = lName;
    }
    public void ejbPostCreate(String fName, String lName)
    {
        // No action needs to be taken.
    }
}
```

The bean class provides implementations for the business methods declared in the remote interface. Note that the fields in the bean class are declared to be public. The EJB Specification require this for container-managed persistent fields. Furthermore, this is also required by the setAttrVal ( ) and getAttrVal ( ) methods for fields that should be accessible via this methods (the methods use reflection to locate the fields). The consequences of such visibility are limited, however, because the user of a bean only interact with the bean through the home and remote interfaces. It is not possible for a client to directly assign values to or retrieve values from such public fields without going through the accessor and mutator methods defined in the remote interface.

For each different signature of create ( ) method in the home interface, corresponding ejbCreate ( ) and ejbPostCreate ( ) methods need to be defined in the bean class. The code for the bean class is consistent with this requirement.

The Deployment Descriptor

In EJB Specification v1.1 (which can be found at the java.sun.com web site), the deployment descriptor is an XML file that declares such things as container-managed persistent fields and security and transactional characteristics of the bean and its methods. The following example shows part of a deployment descriptor.

```
<entity>
    <description>
        This is part of the deployment descriptor of the SabaPerson entity
bean.
    </description>
    <ejb-name>SabaPerson</ejb-name>
    <home>com.saba.examples.SabaPersonHome</home>
    <remote> . . . </remote>
    <ejb-class> . . . </ ejb-class >
    <prim-key-class> . . . </ prim-key-class >
    <persistence-type>Container</persistence-type>
```

-continued

```
        <cmp-field>id</cmp-field>
        <cmp-field>fName</cmp-field>
        <cmp-field>lName</cmp-field>
        .
        .
        .
        <container-transaction>
            <method>
                <ejb-name>SabaPerson</ejb-name>
                <method-name>*</method-name>
            </method>
            <trans-attribute>Supported</trans-attribute>
        </container-transaction>
    </entity>
```

In EJB Specification 1.0, the deployment descriptor is a text file with a somewhat different format. The deployment descriptor is generally created using a GUI tool, generally supplied by EJB Server vendors. Additional information on deployment descriptors can be obtained from EJB literature and tool manuals.

Depending upon the kind of business logic, there are different ways of encoding business logic in EJBs. Of course, implementation of the methods declared in the remote interface of a session bean or an entity bean encodes business logic. In addition, EJB provides "hooks" or callback methods for implementing additional types of business logic. We have already seen the ejbCreate ( ) and ejbPost-Create ( ) methods that one can use in a manner analogous to insert triggers in a relational database. Similarly, the method ejbRemove ( ) (implemented with an empty body in SabaEntityBean and SabaSessionBean) can be overridden to encode logic related to deletion of a bean. For example, if we wish to encode the logic that if a person is removed, all the class registrations for that person should also be removed, we can override the ejbRemove ( ) method within SabaPerson in the following manner. The ejbRemove ( ) method is called just prior to actual removal of the data from the persistent store.

```
public void ejbRemove( )
{
    /* Locate the home interface (regnHome) for the
    ** SabaRegistration bean (code not shown)
    */
    Collection regns = (Collection)
regnHome.findByPersonID(this.id);
        Iterator iter = regns.iterator( );
    while (iter.hasNext( )) {
        SabaRegistrationEJB registrn =
            (SabaRegistrationEJB)
            iter.next( );
        registrn.remove( );
    }
}
    Other callback methods are ejbLoad( ), ejbStore( ),
ejbActivate( ), and ejbPassivate( ).
```

In the alternative embodiment, transactional integrity can be maintained as follows. Consider a session bean which, as part of its remote interface, has declared a method cancelClass ( ) that encapsulates the business process of canceling a class. As part of class cancellation, we also wish to, say, remove the registration records of the persons registered for the class. The registration information is maintained by SabaRegistration entity beans. Hence, within the implementation of cancelClass ( ), besides updating some attribute of the SabaClass entity bean to indicate cancellation, we would also encode logic for finding the SabaRegistration entity beans corresponding to that class and then removing them. However, either all these activities must succeed atomically, or no change to persistent store should be made (i.e., the activities constitute a transaction). This would be accomplished by declaring a transactional attribute of TX_REQUIRED for the method cancelClass ( ) in the bean's deployment descriptor. If the calling client or bean already has a transaction started, the method will then be executed within the scope of that transaction; otherwise, a new transaction will automatically be started for this method.

How Can

In an alternative embodiment, complex data types can be persisted for container-managed entity beans as follows. Suppose there is an entity bean with an attribute that has an array of strings as a data type. Since relational databases do not support such a data type, one cannot directly map the attribute to some column in a database. However, at save time, one can potentially convert the array into a single String by concatenating the elements within the array and using a marker character to delineate various entries. Then, at retrieval time, one can look for the marker character and reconstitute the array. Entity beans provide two callback methods, ejbStore ( ) and ejbLoad ( ) that can be used for such a purpose. SabaEntityBean by default provides empty implementations of such methods. An application developer can override these methods within the definition of a bean and thus persist complex data types.

In the alternative embodiment, every class in an application does not have to be a bean. Indeed, with the overhead of locating a bean through a naming service and going through the home and remote interfaces of a bean to perform useful work would negatively impact performance (though some servers will optimize the process for beans located within the same virtual machine). The application developers can implement selected classes as helper classes and not as beans. Sun Microsystems' J2EE Application Programming Model identifies certain instances where helper classes are applicable. One such example is dependent classes that can only be accessed indirectly through other classes (beans). Sun's J2EE APM offers CreditCard and Address classes as examples of a dependent classes.

EJBs are packaged as EJB jar files that are comprised of the class files for the bean class, the home interface, the remote interface, the primary key class (if applicable), in addition to the deployment descriptor and a manifest. The jar file can be created using the jar application supplied with JDK, or by using some GUI front-end utility provided by the J2EE server being used. The deployment mechanism varies with the servers. For Weblogic server, an entry can be made in the weblogic.properties file; for Sun's reference implementation, the deploytool utility can be used to achieve this in an interactive manner.

At present, the EJB Specification does not provide a mechanism for declaring such constraints, and this would have to be achieved programmatically in the create ( ) and mutator method(s) of the entity beans.

Component User

As described above, in the alternative embodiment, a partial example of usage of a component was described in the context of business logic encoding. This section provides a fuller picture of how a component is used in an alternative embodiment, by either another bean or a client application. The primary steps in both the cases are the same:

1. locate the home interface of the bean;
2. using the home interface, create a new instance or find one or more existing instances of the bean; and
3. invoke the bean's methods to accomplish tasks.

To locate the bean, JNDI is used. There are some variations in how JNDI calls are used with different EJB servers. Here we use the getInitialContext ( ) method in the SabaJ2EEVendor class for locating the SabaRegistration bean.

```
InitialContext ctxt =
SabaJ2EEVendor.getInitialContext( );
    Object objref = ctxt.lookup("SabaRegistration");
    SabaRegistrationHome regnHome = (SabaRegistrationHome)
        PortableRemoteObject.narrow(objref,
            SabaRegistrationHome.class);
```

Once the home interface of the bean is so located, we can use it to create new instances of the bean or find existing ones. In an earlier example, we had used the home interface for finding instances of a bean. Another example, this time for creating an instance, is presented below.

```
    SabaRegistration regstrn = regnHome.create (personID,
classID);
```

Subsequently, we can invoke business methods of the bean simply as follows.

```
regstrn.setAttrVal (feePaid, true);
```

In addition to the foregoing, additional methods (implemented by the bean container) are available for getting a bean's metadata (from which its primary key class, remote interface class, etc. can be obtained), comparing two beans for identity, etc. Many of these methods are used in building tools, such as those for deployment purposes. If additional information about these methods is needed, please consult the available EJB literature.

Those skilled in these arts will understand that various other alternative embodiments of a business application server system and related development kit for developers, may be designed around these basic concepts without deviating from the unique features provided by applicants in this invention.

Security System

In a preferred embodiment of the present invention, the Platform's BDK 519 provides an extremely powerful model for assigning security; that is, defining the sets of allowed operations that groups of users can perform. It supports both extremely sophisticated definitions of an allowed operation and a scalable model for assigning and partitioning security. Specifically, the following features are provided:

Security operations can be specified according to either the general class of business object or to specific, individual business objects.

Support for both shared security operations (view, update, delete, etc) and business-object specific security operations.

Security operations can be assigned based on a customizable partitioning of business objects into domains.

Security operations can be assigned based on either universal or domain-specific user groupings.1652

Definitions

The following concepts are central to the Platform's Security Model. A Security List Member is any entity that can be assigned privileges in the system. Members can be can be individual users of the system (employees or customers); they can also be associated with generic roles, such as a system administrator, or even an automated process, such as an Interconnect ChangeManager.

A Privilege is a set of one or more possible security operations. There are several types of privileges as shown below in Table 1:

TABLE 1

| Category | Description | Example |
| --- | --- | --- |
| Atomic Privilege | The most fine-grained form of privilege. Defines a single type of security operation. | Create, Delete |
| Component Privilege | An Atomic Privilege applies to a specific category of business object | Create Class, View Registrations, Confirm Internal Order |
| Instance Privilege | An Atomic Privilege applied to a specific business object | View the "Monthly Cancellations" Report |
| Complex Privilege | A grouping of one or more privileges | Create, modify, and delete classes |

The Platform 501 supports several pre-defined atomic privileges that apply to all business objects. The pre-defined atomic privileges are shown below in Table 2.

TABLE 2

| Privilege | Description |
| --- | --- |
| New | Create a new instance of this business object |
| View | View summary or detail information about an existing business object |
| Edit | Change information about an existing business object |
| Delete | Delete an existing business object |
| Change Domain | Set the domain of an existing business object |

Specific categories of business objects can also define additional privileges specific to that category. For example, the following component privileges only apply to the "Purchase Order" business object:

Change Expiry Date

Change Initial Credit

Change Status

Change Terms

Domains are the Platform's 501 partitioning mechanism for business objects. Domains allow users to define a hierarchical structure that models their organization or business, for example, based on geography or division. For example, the following simple example shows a three-domain organization, with a root "World" domain and two child "US" and "Europe" domains.

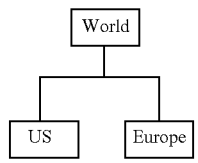

All business objects are assigned a specific domain and belong to that domain. In turn, security privileges are assigned on specific domains. The domain hierarchy is automatically enforced during security checks. This means that users who have access to a domain can access objects in that domain, and that users who have access to ancestors of a given domain also have access to objects in that domain.

Extensions to the basic domain model may include the ability to define multiple, independent domain axes. For example, one domain hierarchy might be based on geography, another on business function.

Security Lists are the mechanism by which members are matched with privileges. A Security List defines a set of domain-specific privileges and a set of list members. Security Lists are created in a two-step process as follows:

First, a set of privileges are added to a security list, where each privilege is applied to a specific domain. A privilege within a security list—that is, a privilege applied to a specific domain—is known as a "granted privilege."

Second, a set of members are added to a security list.

Privileges are calculated at runtime based on all the security lists a user belongs to. At least one of the lists must contain a required privilege in the appropriate domain. This combined use of privileges and security lists supports two paradigms for administering security across domains:

1. A centralized approach wherein global administrators define security lists that contain a set of (privilege, object, domain) triples, that is, one security list can apply across different domains. The same global administrators assign members to security lists.
2. A decentralized approach wherein global administrators define complex privileges that contain a set of (privilege, object) pairs with no domain information. These serve as "security roles", effectively, global security lists that are domains-independent. Administrators for individual domains then define domain-specific security lists containing these privileges. The domain administrators assign members in their domain to security lists.

The following example shows how privileges work in practice. Two security lists are shown below in Table 3 and Table 4 containing the following granted privileges:

TABLE 3

"Customer" Security List

| Privilege | Business Object Category | Domain |
|---|---|---|
| View | Class | World |
| Create | Order | US |

TABLE 4

"US Instructor" Security List

| Privilege | Business Object Category | Domain |
|---|---|---|
| View | Class | World |
| Create | Class | US |
| Delete | Class | US |
| Create | Conference Room | US |
| View | Conference Room | World |
| Schedule | Projector | US |

For purposes of this example, also assume that the instances of business objects shown below in Table 5 exist:

TABLE 5

| Business Object Category | Business Object | Domain |
|---|---|---|
| Class | English 101 | US |
| Class | Spanish 101 | Europe |
| Conference Room | Purple Room | World |
| Conference Room | Lavender Room | US |
| Projector | Projector 1520 | Europe |
| Projector | Projector 1120 | US |

If User1 only belongs to "Customer" security list, User1 can perform the following operations:

View Class "English 101"

View Class "Spanish 101"

Create a new Order for Class "English 101"

However, User 1 is not permitted to perform the following operations:

Order the class "Spanish 101" to be taken in Europe [because this would require a Order with a domain of "Europe"]

View the Purple Room

View the Lavender Room

If User2 belongs to both the "Customer" and "US Instructor" security lists, then User2 can peform the following operations:

View Class "English 101"

Create a class "English 101" in the "US" domain

View the Lavender Room

View the Purple Room

Schedule Projector 1120

However, User2 is not permitted to perform the following operations:

Create a new Order for Class "Spanish 101" to be taken in Europe

Create a class "French 101" in the "Europe" domain

Schedule Projector 1520

The Persistence Layer of the BDK 519 automatically takes account of the predefined atomic privileges (new, view, etc) in its behavior. Thus, search results using standard finders will only return objects for which a user has view privileges, and update operations for which a user does not have privileges will automatically throw a Security exception. In addition, the BDK 519 provides the ability to explicitly query the security model using the API described below.

Security System API

The BDK 519 provides a Java-based API for managing security. As described in the BDK section, this API uses an EJB-style session manager named "SabaSessionManager" and a set of helper classes.

The API includes:

1. A set of interfaces representing the basic concepts in the security model.

```
// IPrivilege - The base class of privilege. A Privilege is
anything that can be added to a Security List.
public interface IPrivilege;
// IAtomicPrivilege - A single allowable operation
public interface IAtomicPrivilege extends IPrivilege;
// IComponentPrivilege - A single allowable operation on a specific
object class.
public interface IComponentPrivilege extends IAtomicPrivilege;
// IInstancePrivilege - A single allowable operation on a specific
object instance.
public interface IInstancePrivilege extends IComponentPrivilege;
// IComplexPrivilege - A structured privilege, capable of grouping
other atomic or complex privileges.
public interface IComplexPrivilege extends IPrivilege, IHandle;
// Domain - A business object representing an entry in the Domain
hierarchy
public interface Domain extends IHandle;
// ISecurityListMember is any interface that can be a member of a
security list, including IRole, IParty (IPerson or IOrganization),
or IGroup
public interface ISecurityListMember extends IHandle;
// ISecurityList matches granted privileges to a set of members
public interface ISecurityList extends IHandle;
```

2. A set of concrete classes capturing the available privileges in the system. These classes are application-dependent; i.e. there are one set of classes associated with the Learning application built on Platform, another set associated with the Performance application, etc.

For example:

```
public class InstancePrivileges implements
IInstancePrivilege {
    /* Define the set of common atomic privileges that
    apply to all objects in the system. */
    public static final int kEdit = 2;
    public static final int kDelete = 3;
    public static final int kView = 6;
}
public class ComponentPrivileges implements
IComponentPrivilege {
    /* Define the set of common atomic privileges that
    apply to all components in the system. Notice that
    this class includes all atomic privileges that apply
    to instances */
    public static final int kNew = 1;
    public static final int kEdit = 2;
    public static final int kDelete = 3;
    public static final int kView = 6;
}
public class PurchaseOrderPrivileges extends ComponentPrivileges
{
    // Privileges specific to the Purchase Order business
    object
    public static final int kChangeDomain = 7;
    public static final int kChangeStatus = 11;
    public static final int kChangeTerms = 12;
    public static final int kChangeInitialCredit = 13;
    public static final int kChangeExpiryDate = 14;
    public static final int kChangeCurrency = 15;
}
```

2. The interface of the manager used to create and manage security lists.

```
public interface SabaSecurityManager extends ISabaRemote {
    /* methods for creating and updating security lists */
    public ISecurityList createSecurityList(SecurityDetail detail);
    public SecurityDetail getDetail(ISecurityList theSecurityList);
    public void update(ISecurityList theSecurityList,
  SecurityDetail detail);
    public void remove(ISecurityList theSecurityList);
    /* methods for adding & removing privileges to security lists
*/
    public void addPrivilege(ISecurityList theList, IPrivilege
thePrivilege, Domain theDomain);
    public void removePrivilege(ISecurityList theList, IPrivilege
thePrivilege, Domain theDomain);
    /* methods for adding & removing members from security lists */
    public void addMember(ISecurityList theList,
ISecurityListMember theMember);
    public void removeMember(ISecurityList theList,
ISecurityListMember theMember);
    /* methods to check privileges */
    public boolean isMember(ISecurityList theList,
ISecurityListMember theMember);
    public boolean hasPrivilege(ISecurityListMember theMember,
IAtomicPrivilege thePrivilege, Domain theDomain);
    public Collection getPrivileges(ISecurityListMember theMember,
IComponent theComponent, Domain theDomain);
    /* standard finder */
    public ISecurityList findSecurityListByKey(String id);
    public Collection findSecurityListByName(String name);
    public Collection findAllSecurityLists( );
} /* SabaSecurityManager */
```

The following code fragment demonstrates how the Security API can be used to create a new security list, assign users to that security list, and check privileges for that user. Note that this code example uses several other session bean managers, such as a DomainManager and PartyManager, provided as part of Platform.

```
    /* Step 1: create a security list */
    String privName = "Guest";
    String privDescription = "Guest login and access";
    Domain domain =
        theDomainManager.findDomainByKey("domin000000000001000
");
    String domainID = domain.getId( );
    SecurityDetail theDetail =
        new SecurityDetail(privName, privDescription,
domainID);
    ISecurityList securityList =
        theSecurityManager.createSecurityList(theDetail);
    /* Step 2: grant privileges by adding them to the list */
    IComponent classesComponent =
        theComponentManager.getComponent("Classes");
    /* create atomic privileges and add them */
    IPrivilege viewClasses = (IPrivilege)
        new ComponentPrivileges(ComponentPrivileges.kView,
    classesComponent);
    theSecurityManager.addPrivilege(securityList,
viewClasses, domain);
    IComponent groupComponent =
        theComponentManager.getComponent("Product Group");
    IPrivilege viewGroups = (IPrivilege)
        new ComponentPrivileges(ComponentPrivileges.kView,
    classesComponent);
    theSecurityManager.addPrivilege(securityList, viewGroups,
domain);
    /* Step 3: assign a member to the security list */
    ISecurityListMember member = (ISecurityListMember)
        thePartyManager.findEmployeeByKey("emplo00000000000100
0");
    theSecurityManager.addMember(securityList, member);
```

-continued

```
/* Step 4: check a user's privileges */
    IPrivilege editClassPriv = (IPrivilege) new
        ComponentPrivileges(ComponentPrivileges.kEdit,
classesComponent);
    boolean canEditClasses =
theSecurityManager.hasPrivilege(member,
    editClassPriv, domain);
```

Best Mode

In a preferred embodiment, the Platform's BDK security API focuses on the database structures and SQL used to store and query security information. It also touches on the algorithms used in implementing the Java API.

Information related to security is stored database tables as shown below. The Platform's BDK Security System uses Java code to read and write values to these database tables.

fgt_domain stores all domains as shown below in Table 6.

TABLE 6

| Column Name | type | Required? | Description |
|---|---|---|---|
| id | OBJECTID | y | |
| description | varchar(255) | n | Long descriptive string for the domain. |
| name | varchar(25) | y | Name of the domain |
| Parent_id | OBJECTID | N | ID of the parent domain | fgt_ss_privs stores all atomic privileges as shown below in Table 7a.

TABLE 7a

| Column Name | Type | Required? | Description |
|---|---|---|---|
| id | OBJECTID | y | |
| object_type | OBJECTID | Y | object id (data dictionary class id) to which the privilege applies. |
| priv_name | varchar(80) | Y | a description string for the privilege. |
| priv_seq | INT | y | a number which identifies the type of privilege.<br>1 => New<br>2 => Edit<br>3 => Delete<br>4 => Save<br>etc.<br>Note: 1–5 common to all classes 11 onwards -- class specific. |

For example, in Table 7b below, the following data captures the available privileges for the Purchase Order business object. Notice that the values in the priv_seq column directly correspond to the constants defined by PurchaseOrderPrivileges class defined in the Java API.

TABLE 7b

| id | object_type | priv_name | priv_seq |
|---|---|---|---|
| ssprv000000000001008 | pycat000000000001036 | New | 1 |
| ssprv000000000002008 | pycat000000000001036 | Edit | 2 |
| ssprv000000000003009 | pycat000000000001036 | Delete | 3 |
| ssprv000000000010175 | pycat000000000001036 | View | 6 |

TABLE 7b-continued

| id | object_type | priv_name | priv_seq |
|---|---|---|---|
| ssprv000000000010224 | pycat000000000001036 | Change Domain | 7 |
| ssprv000000000007120 | pycat000000000001036 | Change Status | 11 |
| ssprv000000000007121 | pycat000000000001036 | Change Terms | 12 |
| ssprv000000000007122 | pycat000000000001036 | Change Initial Credit | 13 |
| ssprv000000000007123 | pycat00000000000 1036 | Change Expiry Date | 14 | fgt_list stores all security lists as shown below in Table 8a.

TABLE 8a

| Column Name | Type | Rq? | Description |
|---|---|---|---|
| id | OBJECTID | Y | |
| description | varchar(255) | N | Description of this list |
| name | varchar(25) | Y | Name of the list |
| owner_id | OBJECTID | N | The owning object of this list if any. |
| security | BOOLEAN | Y | 0 = Not a security list,<br>1 = Security List. |

For example, in Table 8b below, the following data defines a security list to capture generic user privilges:

TABLE 8b

| id | name | description | security |
|---|---|---|---|
| lista000000000002003 | User | A generic low-privileged user | 1 | fgt_list_entry stores all members of a security list as shown below in Table 9.

TABLE 9

| Column Name | Type | Rq? | Description |
|---|---|---|---|
| id | OBJECTID | Y | |
| list_id | OBJECTID | Y | Foreign key to a security list |
| person_id | OBJECTID | Y | Foreign key to a list member. The object ID may be a person, role, or group. | fgt_ss_grants stores all granted privileges as shown below in Table 10.

| Column Name | Type | Rq? | Description |
|---|---|---|---|
| id | OBJECTID | y | |
| granted_on_id | OBJECTID | y | Foreign key to the business object class or instance on which this privilege is granted. |
| granted_to_id | OBJECTID | y | Foreign key to the security list on which this privilege is granted. |
| privs | varchar(50) | y | 50 character bitmap containing the granted privileges. |

-continued

| Column Name | Type | Rq? | Description |
|---|---|---|---|
| domain_id | OBJECTID | N | Foreign key to the domain on which this privilege is granted. |

Notice that this schema shown in Table 10 stores all atomic privileges on a (object, domain, list) triple in a single row by appending the integer keys of the atomic privilges into a single string. Notice also that the schema shown in Table 10 can capture both:

1) privileges on business object classes, by storing the data dictionary primary key of the class in the granted_on_id column.

2) privileges on business object instances, by storing the object id of the instance in the granted_on_id column.

For example, the following row from Table 10 describes a grant that allows members of the "Users" security list to create and view orders, but not edit or delete them. The "ddcls" prefix (for "data dictionary class") on the granted_on_id value indicates that this OBJECTID refers to a business object class. The $1^{st}$ and $6^{th}$ bits of the privs flag are on, providing create and view privileges only.

| id | granted_on_id | granted_to_id |
|---|---|---|
| ssgrn000000000001264 | ddcls000000000001055 | lista000000000002003 |
| privs | | domain_id |
| 1000010000000000000000000000000000000000000000 | | domin000000000000001 |

The following row from Table 10 describes a grant that allows the same list to execute a specific report. The "reprt" (for "report") prefix on the granted_on_id value indicates that this OBJECTID refers to a specific instance of the Report business object. The $11^{th}$ bit of the privs flag is on, meaning the grant gives Execute privileges only.

| id | granted_on_id | granted_to_id |
|---|---|---|
| ssgrn000000000202056 | reprt000000000001000 | lista000000000002003 |
| privs | | domain_id |
| 0000000000100000000000000000000000000000000000 | | domin000000000000001 |

The Platform's BDK Security System also utilizes an addPrivilege ( ) method. The addPrivilege( ) method has different logic depending on whether a row already exists in fgt_ss_grants for the combination of security list, business object, and domain. If a row exists, it retrieves the existing row, sets the additional bits defined by the IPrivilege parameter, then updates the row. If no row exists, it creates a empty privilege bitmap, sets the bits defined by the IPrivilege parameter, then inserts a row.

The Platform's BDK Security System also utilizes an hasPrivilege( ) method. The addPrivilege ( ) method executes a SQL query to return all privilege bitmaps for each security list the user belongs to that match the target object and domain parameters. It iterates through each bitmap and returns true if the privilege has been set in any one. The SQL query that is executed is:

```
/* select all of a user's grants on an class in a given domain.
   parameter 1 = person id
   parameter 2 = class id
   parameter 3 = domain id */
select g.id, g.privs from fgt_ss_grants g, fgt_list l,
   fgt_list_entry e where e.person_id = @@001 and e.list_id = l.id
   and l.security = 1 and
   g.granted_to_id = l.id and g.granted_on_id = @@002 and
   g.domain_id = @@003
```

The BDK Persistence layer also contains code that directly accesses these database tables to check security privileges. A utility class, SabaPrivileges, contains a hasPrivs( ) method that is called at predefined points by the SabaObject and SabaEntityBean implementations, including whenever objects are saved and restored. This method has the following signature:

public boolean hasPrivs (String objectID, String classID, String domainID, int privToCheck, boolean anyDomain)

SabaPrivileges contains a Java hashtable that caches privilege for each business object in the system. The hasPrivs( ) method iterates through these privileges to look for a match, using logic similar to the SabaSecurityManager.hasPrivilege( ) method.

If the cache is empty, SabaPrivileges queries the database to load the appropriate privileges. The SQL used is the following:

```
select s.granted_on_id granted_on, substr(
    to_char(decode(sum(to_number(substr(s.privs, 1, 1))),0,0,1))
    || to_char(decode(sum(to_number(substr(s.privs, 2, 1))),0,0,1))
    || to_char(decode(sum(to_number(substr(s.privs, 3, 1))),0,0,1))
    || to_char(decode(sum(to_number(substr(s.privs, 4, 1))),0,0,1))
    || to_char(decode(sum(to_number(substr(s.privs, 5, 1))),0,0,1))
    || to_char(decode(sum(to_number(substr(s.privs, 6, 1))),0,0,1))
    || to_char(decode(sum(to_number(substr(s.privs, 7, 1))),0,0,1))
```

-continued

```
|| to_char(decode(sum(to_number(substr(s.privs, 8, 1))),0,0,1))
|| to_char(decode(sum(to_number(substr(s.privs, 9, 1))),0,0,1))
|| to_char(decode(sum(to_number(substr(s.privs,10, 1))),0,0,1))
|| to_char(decode(sum(to_number(substr(s.privs,11, 1))),0,0,1))
|| to_char(decode(sum(to_number(substr(s.privs,12, 1))),0,0,1))
|| to_char(decode(sum(to_number(substr(s.privs,13, 1))),0,0,1))
|| to_char(decode(sum(to_number(substr(s.privs,14, 1))),0,0,1))
|| to_char(decode(sum(to_number(substr(s.privs,15, 1))),0,0,1))
|| to_char(decode(sum(to_number(substr(s.privs,16, 1))),0,0,1))
|| to_char(decode(sum(to_number(substr(s.privs,17, 1))),0,0,1))
|| to_char(decode(sum(to_number(substr(s.privs,18, 1))),0,0,1))
|| to_char(decode(sum(to_number(substr(s.privs,19, 1))),0,0,1))
|| to_char(decode(sum(to_number(substr(s.privs,20, 1))),0,0,1))
|| to_char(decode(sum(to_number(substr(s.privs,21, 1))),0,0,1))
|| to_char(decode(sum(to_number(substr(s.privs,22, 1))),0,0,1))
|| to_char(decode(sum(to_number(substr(s.privs,23, 1))),0,0,1))
|| to_char(decode(sum(to_number(substr(s.privs,24, 1))),0,0,1))
|| to_char(decode(sum(to_number(substr(s.privs,25, 1))),0,0,1))
|| to_char(decode(sum(to_number(substr(s.privs,26, 1))),0,0,1))
|| to_char(decode(sum(to_number(substr(s.privs,27, 1))),0,0,1))
|| to_char(decode(sum(to_number(substr(s.privs,28, 1))),0,0,1))
|| to_char(decode(sum(to_number(substr(s.privs,29, 1))),0,0,1))
|| to_char(decode(sum(to_number(substr(s.privs,30, 1))),0,0,1))
|| to_char(decode(sum(to_number(substr(s.privs,31, 1))),0,0,1))
|| to_char(decode(sum(to_number(substr(s.privs,32, 1))),0,0,1))
|| to_char(decode(sum(to_number(substr(s.privs,33, 1))),0,0,1))
|| to_char(decode(sum(to_number(substr(s.privs,34, 1))),0,0,1))
|| to_char(decode(sum(to_number(substr(s.privs,35, 1))),0,0,1))
|| to_char(decode(sum(to_number(substr(s.privs,36, 1))),0,0,1))
|| to_char(decode(sum(to_number(substr(s.privs,37, 1))),0,0,1))
|| to_char(decode(sum(to_number(substr(s.privs,38, 1))),0,0,1))
|| to_char(decode(sum(to_number(substr(s.privs,39, 1))),0,0,1))
|| to_char(decode(sum(to_number(substr(s.privs,40, 1))),0,0,1))
|| to_char(decode(sum(to_number(substr(s.privs,41, 1))),0,0,1))
|| to_char(decode(sum(to_number(substr(s.privs,42, 1))),0,0,1))
|| to_char(decode(sum(to_number(substr(s.privs.43, 1))),0,0,1))
|| to_char(decode(sum(to_number(substr(s.privs,44, 1))),0,0,1))
|| to_char(decode(sum(to_number(substr(s.privs,45, 1))),0,0,1))
|| to_char(decode(sum(to_number(substr(s.privs,46, 1))),0,0,1))
|| to_char(decode(sum(to_number(substr(s.privs,47, 1))),0,0,1))
|| to_char(decode(sum(to_number(substr(s.privs,48, 1))),0,0,1))
|| to_char(decode(sum(to_number(substr(s.privs,49, 1))),0,0,1))
|| to_char(decode(sum(to_number(substr(s.privs,50, 1))),0,0,1))
,1,50) privs, t.node_id domain_id from fgt_ss_grants s, fgt_list_entry
l, tpt_dummy_flat_tree t where l.person_id = @001 and
s.granted_on_id = @003 and l.list_id = s.granted to_id and
s.domain_id = t.related_to and (l.group_label is null or
l.group_label = @002) group by s.granted_on_id, t.node_id
```

The SQL used in the query has two unique features:

- It uses a table called tpt_dummy_flat_tree that stores the parent/child relationships for all domains in the system. This allows it to include a join that obtains privileges for both the specified domain and all its parents.
- It checks the value of the privs field bit by bit, and concatenates the results together to form a new bitmap that is the union of the bitmap fields for the specified domain and all its ancestors.

The following example data in tpt_dummy_flat_tree shown in Table 11 defines the relationships between three domains, where domin000000000000001 is the top-level parent, domin000000000001000 is its child, and domin000000000001001 is its grandchild.

TABLE 11

| NODE_ID | RELATED_TO | R | REL_LEVEL |
|---|---|---|---|
| domin000000000000001 | domin000000000000001 | I | 1 |
| domin000000000001000 | domin000000000000001 | A | 2 |
| domin000000000001000 | domin000000000001000 | I | 1 |
| domin000000000001001 | domin000000000000001 | A | 3 |

TABLE 11-continued

| NODE_ID | RELATED_TO | R | REL_LEVEL |
|---|---|---|---|
| domin000000000001001 | domin000000000001000 | A | 2 |
| domin000000000001001 | domin000000000001001 | I | 1 |

WDK Server

The Web Content Server 800 enables the present invention to interact with users regardless of the users hardware platforms, locations, and software systems. The Web Content Server 800 allows the present invention to overcome the difficulties of prior art systems associated with having an infrastructure which is tightly coupled to application products, specific hardware platforms and specific Operating systems and related services.

The Web Content Server 800 can allow the present invention to interface with many other industry standard software programs to make the exchange and flow of data easy and accurate, and enables interconnection with external systems, special networks, like SabaNet, and the Internet.

The Web Content Server 800 is web-enabled and provides a unified set of interfaces for interacting with web based users as well as other users.

The Web Content Server 800 can also allow vendors/developers to develop applications on the Platform, make use of core technology for information matching and distribution, and provide standardized access to connectivity with other systems and platforms in a users network.

Figure 8A:
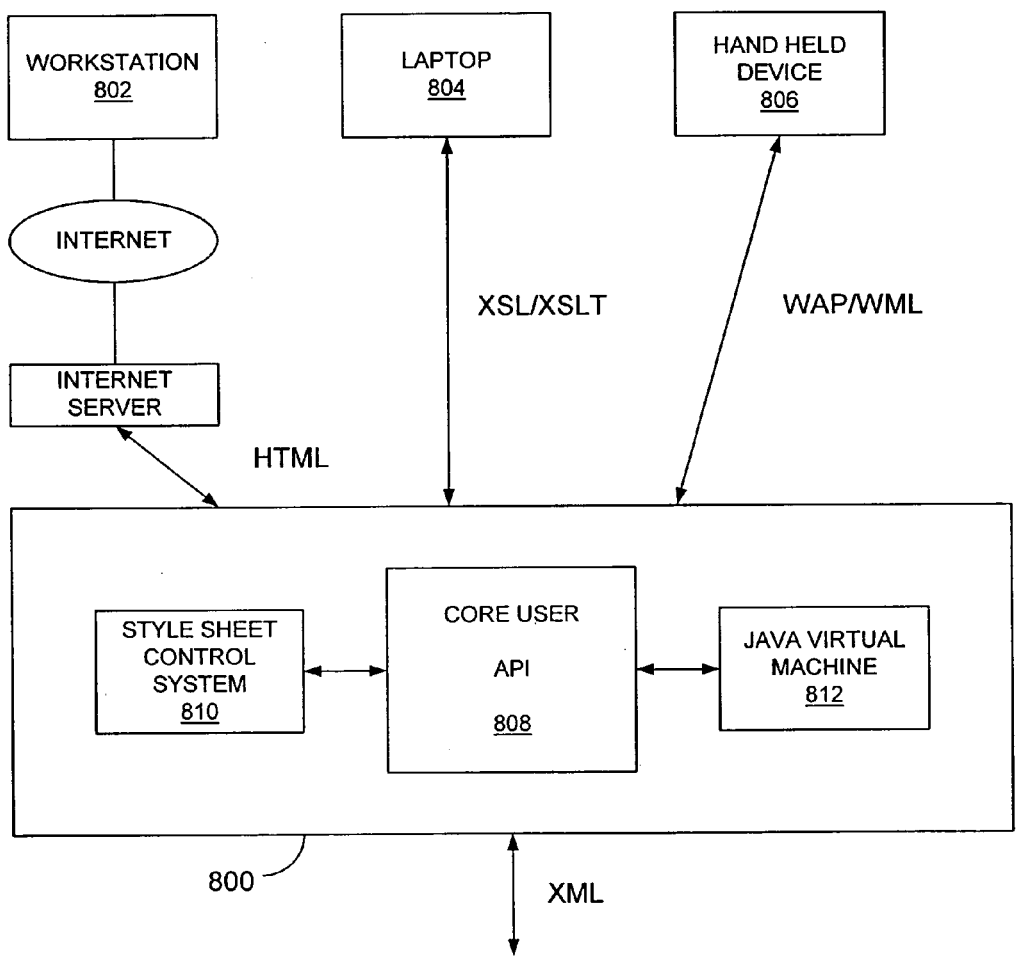
FIG. 8A illustrates a more detailed configuration of an exemplary Web Content Server portion of the current invention.

As shown in FIG. 8A, one embodiment of an Web Content Server 800 provides an interface between users 802, 804, and 806 and the Platform. The Web Content Server 800 preferably includes an engine 808, style sheet control system 810 for various user display protocols, a JAVA Virtual Machine 812 and the related runtime support.

The Style Sheet Control System 810 contains mechanisms to manipulate various kinds of display style sheets, to generate and execute web links, to manage dynamic content generation and dynamic generation of Javascript. The Style Sheet Control System 810 also can allow vendors/developers to modify, add, or delete the mechanisms in the Style Sheet Control System 810. Thus, vendors/developers can customize the presentation of data to the users.

User Generation of Web Content

Web Content Server 800 can also provide the platform's web content generation engine for use by users to create, render, and present web content while improving the dynamic acquisition of data from a variety of sources followed by its reformatting and display via style sheets. Using web standards for XML and XSL, Web Content Server 800 provides a user with a customizable framework for decoupling data from presentation, and generating web content in a variety of formats, from standard HTML to WML.

The Web Content Server 800 provides a "page engine" 808 which allows users (such as developers, consultants and customers) to build web content using a separation between Model, Widget, and View instructions.. The engine 808 separates data production, interaction elements and display information, and maintains these aspect of page production in different files.

The engine 808 supports three components: (a) Widgets, which are reusable interactive components such as buttons and data entry fields; (b) Models, which encompass the data and user operations used by the application (Data can be simple Strings or complex objects); and (c) Views, which use style sheets to define and control the presentation of output to the user.

Using the system 808 provides, among other things, the following advantages for a user:

Improve maintainability of web content.

Partition web content development between users (such as component developers, Java developers, and UI developers).

Provide easy and extensive customizability by users.

Improve productivity of building web content.

Provide improved authoring and debugging support.

Provide the infrastructure for targeting alternate deployment platforms (ie palmtops).

In one embodiment, the engine 808 uses XML, XSLT (eXtensible Stylesheet Language Transformations), and RDF (Resource Description Framework), built round a publishing framework called Cocoon to enable the functionality of Web Content Server 800.

The engine 808, in conjunction with a set of tools, utilities, APIs, and predefined widgets and views, acts as a platform and provides the user with a set of tools, tag and widget libraries, Java classes, and XSL style sheets. Tools included with the platform 808 help users perform the following activities: (a) Authoring—users need to create and maintain control files, model files, widget files, and view files; (b) Debugging—the process starting with obtaining data and ending with viewing is involved so having tools or methods for debugging problems is essential; and (c) Customization—customizing the final product can certainly be accomplished with the tools used for authoring and debugging, but additional tools can radically simplify tasks like product upgrades or performing simple customizations.

The platform 808 allows content, logic and style to be separated out into different XML files, and uses XSL transformation capabilities to merge them resulting in the automatic creation of HTML through the processing of statically or dynamically generated XML files. The platform 808 can also generate other, non-HTML based forms of XML content, such as XSL:FO rendering to PDF files, client-dependent transformations such as WML-formatting for WAP-enabled devices, or direct XML serving to XML and XSL aware clients.

The platform 808 divides the development of web content into three separate levels: (a) XML creation—The XML file is created by the content owners. They do not require specific knowledge on how the XML content is further processed—they only need to know about the particular chosen "DTD" or tagset for their stage in the process. This layer can be performed by users directly, through normal teeditors or XML-aware tools/editors; (b) XML processing—The requested XML file is processed and the logic contained in its logicsheet is applied. Unlike other dynamic content generators, the logic is separated from the content file; and (c) XSL rendering—The created document is then rendered by applying an XSL stylesheet to it and formatting it to the specified resource type (HTML, PDF, XML, WML, XHTML, etc.).

Dynamic Web Content development using Web Content Server 800

The Web Content Server 800 can be based on XML, XSLT and Java technologies. Using these technologies, the Web Content Server 800 allows for easier user interface customization, more flexibility in page functionality, easier page maintenance and the creation of more easily reusable code. It encourages the separation of data production, interaction elements and display information by separating different aspect of page production in different files.

Using platform 808, developing a web page (web content) requires the development of the following components: (a) a control file; (b) a model file; (c) a view file; and (d) Command Managers and Commands.

The Model contains all the data and interactivity for a given page. Users are responsible for generating an XML page containing the raw data they wish to display, independent of the appearance of that data or any additional presentation information.

The Model can be implemented using a dynamic page engine (JSPs or XSPs). In addition, API 808 provides a variety of helper tagsets to automate common scripting operations, minimizing the amount of custom scripting required by a user.

Model Developers are typically Java programmers, since the bulk of development effort is implementing a companion Java Bean that invokes the appropriate SABA Manager API. They then use the dynamic features of the engine (tag libraries and Java scripts) to place data from the bean onto the page.

The View contains all style and presentation for a given page. Users are responsible for implementing an XSLT stylesheet that transforms the model into a specific presentation environment. View developers are typically UI designers, since the bulk of authoring effort is crafting the HTML for a static page, then adding in the set of XSLT tags to create a stylesheet for the associated model page.

Widgets are a set of predefined UI components and presentation elements common to web applications. Widgets can have user interactivity (fields, links) or be presentation only (images). Widgets can be implemented as XSLT stylesheets. The platform 808 includes a predefined set of common widgets that can be used by both model and view developers. Note also that developers have the option of overriding the default widgets to provide enhanced or custom functionality if required.

The important distinction between tag libraries and widgets is that tag libraries are used in the model and are an aid to dynamic content generation, whereas widgets are used in the transform step and are an aid to end-content generation. Tag libraries can be implemented in Java, whereas widgets are preferably implemented as stylesheets.

Figure 8B:
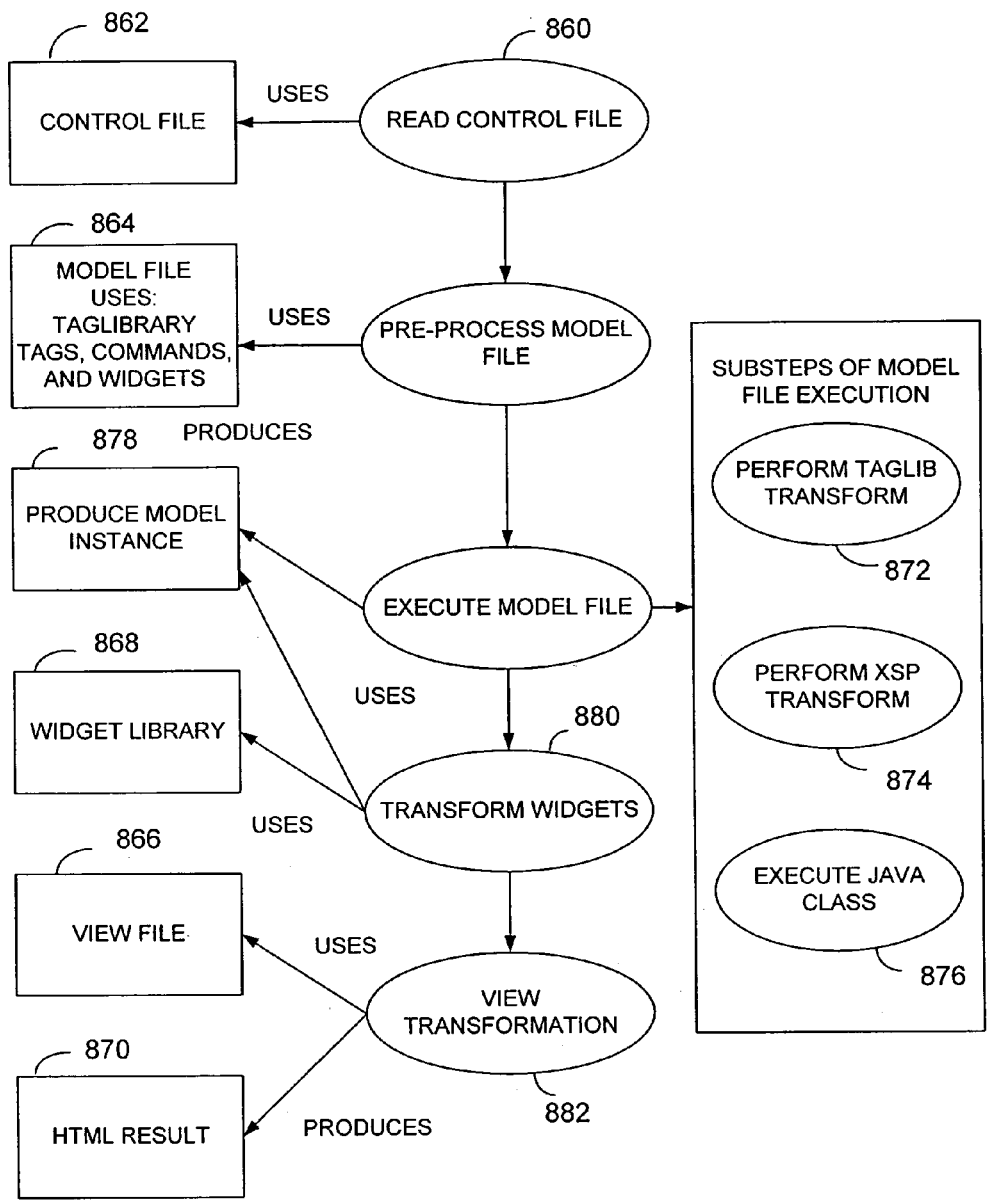
FIG. 8B shows a process flow diagram illustrating how to produce dynamic web content.

FIG. 8B shows how the engine 808 processes/uses these files to produce dynamic web content.

The process of creating the HTML to send to the browser begins with reading the control file, 860. The control file 862 is simply a file that identifies the model file 864, the view file 866 and the widget library 868 to use to produce the final HTML result 870. The control file 862 also contains link transformation information that is used to transform links used in the model file 864. This link transformation is used to map model-file hyperlink references contained in the model file 864 to appropriate control file names.

The model file 864 is loaded and preprocessed based on the information contained in the control file 862. The preprocessed model file is executed in three steps. In 872, any tags from the tag library are processed. The tag library includes tags for internationalization, command invocation and widget management. In 874, the resulting XML file is then further processed to generate a Java class. In 876, the Java class is executed to produce the model instance 878. The model instance 878 contains all data and other information needed for display. For example, the model instance 878 will contain the XML form of the data retrieved by the Commands invoked in the model page and it will contain all internationalized labels and widgets. In 880, the model instance 878 is first transformed using the widget library 868. In 882, the result of the widget transformation is then further transformed using the view transformation file 866 to produce the final result 870.

The process outlined above also highlights how the different aspects of developing dynamic web content are separated. The design of a particular web page is the result of answering the following questions: (a) What do I do with parameters sent from the browser and what data is needed to display the page? How do I perform these tasks? (b) How will the user interact with the page? What buttons, entry fields etc. will the user have? and (c) How are the data and the interaction elements displayed on the page?

The answer to question (a) results in the model page and the Command objects used by the model page. The model page invokes all needed Commands to perform the tasks of the page and to produce the data needed for display. The answer to question (b) produces a listing of all widgets and their linkages to the data being displayed. Although this list is part of the model page, the list of widgets and their linkages are all declared in a clearly identifiable part of the page. Finally, the answer to question (c) produces the view transformation page.

Page Development Process

Typically the page development process starts with an HTML mockup of the page. The Web Content Server 800 development process can start with the HTML mockup as well. However, users do not modify this mockup to include code. Instead the process illustrated in FIG. 8C is followed.

Figure 8C:
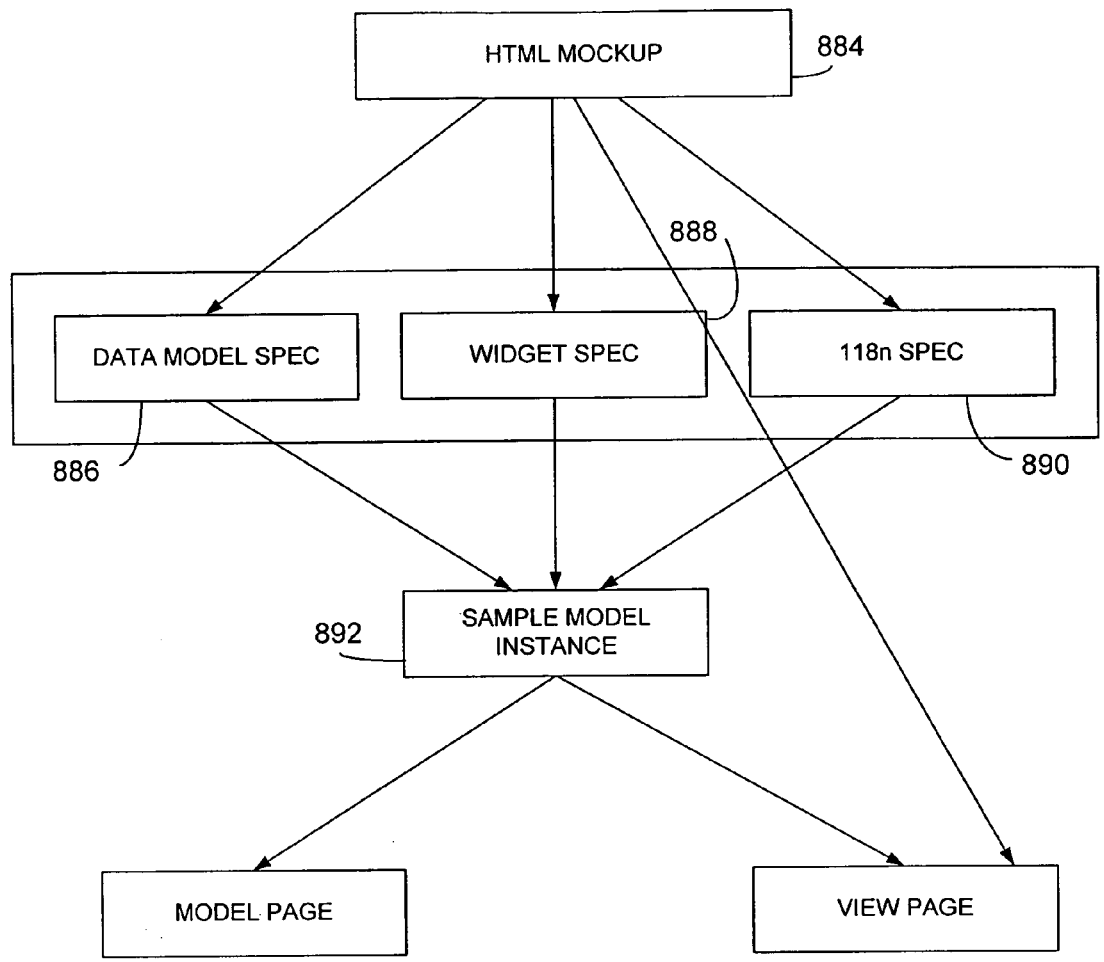
FIG. 8C shows a process flow diagram illustrating the page development process.

As illustrated in FIG. 8C, using the HTML mockup 884, the user develops three specifications. The data model specification 886 is developed to meet three basic criteria. First, the data model needs to contain enough information to drive the interface. For example, if the interface needs to display the name of an object, then the data model must contain the object name in some form. Second, the data model specification should maximize reuse of command objects. For example, if a command object already exists that can retrieve a needed object in a serialized XML format, then the data model of the command object should be reused instead of reinventing a new XML representation of the same object. Finally, the data model specification should be generic so other pages can reuse the model generation components (Commands). How general the data model should be is determined by balancing the trade-off between performance (since producing more data may incur performance penalty) and reusability. If producing a more general data model causes high performance penalty, then a less general solution may be better. On the other hand, if adding a few not needed items comes at no or little performance cost, then the more general data model is preferred. For example, objects implementing the IXMLObject interface will typically provide more than enough information about themselves. The data model specification 886 should essentially be a sample of the data returned by the Command objects and the specification XML should be wrapped in tags.

The widget specification 888 is a list of widgets needed by the page. These widgets include input fields of all types (textboxes, radio button collections, check box collections, dropdown lists, hyperlink buttons, etc.). Besides declaring what widgets the page needs, the specification 888 can also include how these widgets relate to the data model. For example, the page may require an edit button widget for every object it displays. The widget specification 888 can therefore indicate that the edit button is "attached to" those objects. The widget specification 888 can be very incomplete, because users (such as view developers) will typically only need the name of the widget for layout purposes. The widget library will take care of rendering the widget itself.

The third specification is the specification of internationalized items 890 (labels, graphics). The specification 890 includes a list of all labels and images used on the page. The specification 890 contains just the name of the label and some sample text for the label.

Once the specifications 886, 888, and 890 are complete, the user or a tool, produces a sample model instance 892. The user can use the model instance 892 to test the view stylesheet (by using any standard XSLT tool). The user develops the view stylesheet by converting the original HTML mockup to an XSLT stylesheet to retrieve dynamic data, widgets and internationalized labels from the model instance. This conversion process can mostly be done in an HTML editor.

Customizing/Modifying a Page

One of the benefits of using the platform 808 for page development is in the ease of page customization and page modification. Often the look and feel of pages needs to be modified after the initial design. Using conventional systems this process was very painful: individual pages had to be revisited by software engineers and tweaked to confirm to the new requirements. These new requirements often meant changed look of textual/graphical information (e.g., justification of text, font, color), changing the layout (e.g., adding another Save button to the bottom of the page, moving buttons and table columns around), or adding/removing information content (e.g., display the price of an offering but don't display the description of the offering). Also, often changes are required across pages: e.g., we want every link button to use "Helvetica" instead of "Verdana" for its label, and the alt label for the link image should be the same as the label of the link itself. Sometimes page changes include adding new interaction components, e.g. adding a "Cancel" button to the page, or adding an edit button next to each displayed object. Such changes are much simpler to perform using Web Content Server 800.

Modifying Text/Graphics Look and Feel

To change the look and feel of textual and graphical information, the user can edit the view page in an HTML tool. The user can add <span>, <div> etc. tags around the components needed modification, and define the "style" attribute to reflect the desired look and feel changes. If the user needs to develop for browsers with limited CSS support (e.g., Netscape 4.x), the user can wrap the components in <u>, <b>, <font>, etc. tags as needed.

Layout Changes

The cut/copy/paste commands of the HTML editor can be used to perform most layout changes requiring the repositioning of different components. Dreamweaver, for example, gives users powerful HTML/XML element selection capabilities that make it easier to move and copy whole HTML/XML document fragments.

Adding/Removing Information Content

Often the model specification will result in the production of more content than needed by a particular view. For example, the model for a page that needs to display the parents of a particular security domain only may also produce other information about the security domain (e.g., the description of the domain). This is especially likely when the model page reuses other, already existing command objects. In such cases displaying additional content can simply be done at the view page level: the user needs to place the newly required information somewhere on the view page. Removing information items is also very simple, since users can simply delete a particular HTML/XML fragment if viewing that piece of the model is not needed.

Changing Look and Feel of Widgets Globally

The use of widget libraries make it very simple to change the look and feel of widgets across pages. Either the widget transformation of the used widget library can be changed or an alternative widget library can be developed. In the latter case control pages must be updated to point to the new instead of the original widget library.

Adding New Interaction Components

If the guidelines for model page design are followed then adding new interaction components (e.g., buttons) is a very simple task. Adding a new widget (e.g., Cancel button) means adding a new widget to the widget section of the model page AND changing the view page to include the new widget. Since the widget section is a separate section of the model page, software engineers (and perhaps UI engineers) can make the required change without disturbing/interfering with any other part of the model page.

Components of the Platform 808

The control page associates a particular model page, view page and widget library.

The model page produces the data needed for displaying the page and it also defines the widgets (interaction elements, such as links, buttons, input fields, etc.) and internationalized resources (labels, graphics) used by the view page. The model page has a well defined structure. Model pages can produce XML representation of data using command managers and command objects. A model page can invoke a command using a tag. After the model page is executed, the tag will be replaced with the XML data produced by the selected Command.

The model instance is the XML document produced by executing the model page.

The view page displays the data and widgets contained in the model instance (i.e. the XML document produced by executing the model page). If the control page declares a widget library to use, then the view transformation takes place after the widgets have already been transformed to the appropriate format (e.g. HTML).

The widget library contains the display transformation for widget components. After the model page executes the produced widgets are transformed to the appropriate output format (e.g., HTML). The resulting HTML markup is wrapped in tags so the view transformation page can easily identify and place each widget.

The tag library contains tags users can use in their model pages to access common code functionality. This common functionality includes accessing resource bundles, retrieving page parameters, executing commands, declaring widgets, etc.

Control Page

The entry point into any platform 808 page is an XML document that serves as a controller. This page is simply an XML document that points to the model, view, and widget documents. This convention creates a clean decoupling between the three constituent pages. As an example of the benefit of this approach, web content administrators may substitute a different control page in a deployment environment; this allows them to use the same model while modifying just the view.

Coding Guidelines

Pages built using the platform 808 employ certain conventions and coding guidelines to ensure consistent operation and simplify some processing steps. These coding guidelines include the following:

a. head element

All model pages must contain a head page element that defines some information specific to the model. It is used to capture the following:

required metadata about input and pass-through parameters values of i18n labels. The convention is that all i18n values are obtained via the i18n utility tag in the model page; this information is then passed on to the stylesheet in a predetermined location within the wdk:head element page title and other useful information about the page.

b. Widget stylesheet

The widget stylesheet is simply a list of xsl:includes of the widgets used on this page. The widgets can be from the set of predefined widgets or can be customized widgets.

ONE EXAMPLE OF A PREFERRED EMBODIMENT

In one preferred embodiment, the Web Content Server 800 is a dynamic content generation framework based on the apache Cocoon project. Like other approaches, such as JSP, ASP, ColdFusion etc., the Web Content Server 800 would allow developers to create web pages to display data derived dynamically through some business logic. Unlike other dynamic content generation frameworks, the Web Content Server 800 separates the content from its presentation. This separation makes it easier to customize pages, to provide different versions of pages to different user agents (desktop browsers, handheld devices, etc.).

Content production and presentation separation is achieved by following a Model-View-Widget (MVW) paradigm. In this paradigm three distinct components are responsible for generating the final output sent to the client (desktop browser, WAP phone, handheld device). The model page is responsible for producing the content as well as the user interaction components (widgets). Widget look and behaviors are added during the widget transformation. Finally the View transformation provides the look and layout for the content and widgets produced by the model page.

File Loading Algorithm

When the Cocoon engine processes the HTTP request, it invokes the getDocument( ) method of the file producer registered with Cocoon. Web Content Server 800 uses a specific file producer (SabaProducerFromFile) to load the requested file. This file producer uses SabaSite properties to determine the location of the requested file. To register the Web Content Server 800 specific file producer, the following line is added to cocoon.properties:

producer.type.file=com.saba.web.engine.SabaProducerFromFile

SabaSite

SabaSite is an object containing a set of properties relevant to a particular saba application. These properties include, but are not limited to:

File system location of application pages

File system location of images

Name of the site

Name of the servlet driving this application

Etc.

Using the SabaSite object and the associated property file the configuration of a given Saba application can be changed with ease.

The Alorithm

The SabaProducerFromFile uses the request URL to identify the file requested. The getDocument method of this class performs the following steps:
1. Determines the SabaSite based on the request. The SabaSite is identified as follows:
   a. Extract the servlet path information from the request object using the HttpServletRequest API (getServletPath( )).
   b. If the servlet path ends with a Web Content Server 800 specific string suffix, then the associated SabaSite name is determined by stripping of that suffix.
   c. If the servlet path does not end with the Web Content Server 800 specific string suffix, then the system default SabaSite name is retrieved using the SabaSite API.
   d. The SabaSite is retrieved using the SabaSite API
   e. Finally the SabaSite is initialized using the request object
2. Uses the SabaSite object to determine the location of all web documents by getting the document root property of the site.
   a. Uses the SabaSite API to retrieve the document root (getDocumentRoot( )).
3. Determines the relative pathname of the requested document from the request object.
   a. Uses the HttpServletRequest getPathInfo( ) API.
4. Computes the absolute path of the document by combining the document root with the relative pathname.
   a. Appends the value of the document root and the relative pathname.
   b. Replaces all "\" characters with "/" to make sure the absolute pathname has the correct syntax.
5. Parses the file identified by the pathname and returns the resulting document object model (DOM).

ControlFile Processing Algorithm

When a client sends a request to a Web Content Server 800 application, above-described process is used to identify and parse the control file. The control file is an RDF document that ties the above-mentioned three components of the Model-View-Widget paradigm together.

Control File Example

The control file contains a Cocoon processing instruction (line 2) that is parsed by the Cocoon engine. The cocoon engine uses the processing instruction to look-up the processor it needs to use to process the document. The Web Content Server 800 installation contains the following entry in the cocoon.properties file:

processor.type.wdk=com.saba.web.engine.ControlFileProcessor

This line tells the cocoon engine that the com.saba.web.engine.ControlFileProcessor java class is responsible for processing all documents that contain a cocoon processing instruction of type="wdk".

The control file processor performs the following steps:
1. Identifies the model, view and widget files.
2. Parses the model file and creates a DOM representation of the XML document.
3. Inserts in the model file DOM:
    Cocoon processing instruction to invoke the Web Content Server 800 transformer after the model page is executed. The Web Content Server 800 transformer is responsible for transforming the result of the model page using the widget and then the view XSL stylesheets.
    XSLT processing instructions to declare where the widget and view transformation stylesheets are located. This information was extracted from the control file in step 1.
4. Updates hyperlinks in the model file based link mapping information found in the control file.

The control file processor returns the document object model containing all these updates, and the Web Content Server 800 engine then processes this DOM.

Identifying Model, View and Widget File

The control file contains the following three properties for encoding the three files:
wdk:model: the rdf:resource attribute of this property is the path to the model file. (See line 8 in the example above.)
wdk:view: the rdf:resource attribute of this property is the path to the view file. (See line 9 in the example above.)
wdk:widget: the rdf:resource attribute of this property is the path to the widget file. (See line 10 in the example above.)

Creating the DOM for the Model Document

Given the path information in the rdf:resource attribute of the wdk:model property, the actual path is computed based

```
1  <?xml version="1.0" encoding="UTF-8"?>
2  <?cocoon-process type="wdk"?>
3  <!DOCTYPE rdf:RDF SYSTEM ". . ./control10.dtd">
4  <rdf:RDF xmlns:rdf="http://www.w3.org/1999/02/22-rdf-syntax-ns#"
   xmlns:wdk="http://www.saba.com/XML/WDK">
5       <rdf:Description id="searchPerson">
6           <rdf:type resource="http://www.saba.com/XML/WDK/Control"/>
7           <wdk:version>1.0</wdk:version>
8           <wdk:model rdf:resource="searchPerson.xml"/>
9           <wdk:view rdf:resource="searchPerson.xsl"/>
10          <wdk:widgets rdf:resource=". . ./xsl/widget/wdk_widgets.xsl"/>
11          <wdk:links>
12              <wdk:link model="searchPerson.xml" control="searchPerson.rdf"/>
13          </wdk:links>
14      </rdf:Description>
15 </rdf:RDF>
``` on saba site information. The process of computing the path is almost identical to the process described under the File Loading Algorithm section. The only difference is that if the value of rdf:resource does not begin with the path delimiter character ("/") then the processor interprets the path as a relative path from the control file. Once the path is computed, the model file is parsed and a DOM representation is generated.

Updating the Model DOM

Before the model page (its DOM representation) can be further processed by the wdk engine, a cocoon processing instruction <?cocoon-process type="xsp"?> is inserted. This processing instruction instructs the engine to first process the model page using the xsp processor (see section below on Custom XSP Processor). The control file processor inserts another processing instruction: <?cocoon-process type="wdk_xsl"?>. This processing instruction directs the Cocoon engine to use the Web Content Server 800 specific XSLT transformer for the transforming steps (see section below on custom XSLT processor). Furthermore, two <?xml:stylesheet . . . ?> processing instructions are also inserted in the document object model following the above processing instruction. The "href" data component of these instructions identifies the widget and view stylesheets in that order. The Web Content Server 800 specific XSLT transformer will process these two processing instructions to perform the XSL transformations.

The following Java code shows how the processing instructions are inserted into the DOM:

private void insertNextPI(Document doc, ProcessingInstruction pi) throws ProcessorException Updating Link Information Model pages typically contain links that allow the model page to invoke another page. In order to make model pages reusable with different view pages, page references in a model page always refer to other model pages. This way different control files can reuse the same model page but use two different view pages. However, links pointing to model pages have to be transformed to control page hyperlinks before the final document is produced, since the request URL has to contain information about the control file and not the model file. In order to perform this transformation, the control file contains information about how to map a model page reference to a control page reference. The control file contains a single wdk:links element, which contains a number of wdk:link elements. Each wdk:link element has two attributes: model and control. The model attribute is the hyperlink name of a model file, while the value of the control attribute is the hyperlink name of the control file.

The control file processor locates the wdk:link and wdk:links elements in the control file DOM using the standard DOM API. Once all wdk:links elements are located, the control file processor inserts a wdk:linkMap element in the wdk:head element of the model DOM, and then inserts one wdk:linkMapEntry for each wdk:link found in the control file using the DOM API. The wdk:linkMapEntry element has the same attributes as the corresponding wdk:link in the control file. This way the mapping information is made available in the model page, and can be used by either the model page itself or the subsequent widget and view transformations. For example, the wdk:link widget makes use of this information to transform model page references to control page URLs.

```
{
    try{
        NodeList nodeList = doc.getChildNodes( );
        Node theNode=null;
        Node lastPI=null;
        // find last PI
        for (int i=nodeList.getLength( )-1 ; i >= 0; i--) {
            theNode = nodeList.item(i);
            if (theNode.getNodeType( ) ==
Node.PROCESSING_INSTRUCTION_NODE){
                lastPI=theNode;
                break;
            }
        }
        if (lastPI==null) {
            // cound not find a PI so just get the first node
            theNode=nodeList.item(0);
        } else {
            //going to do an insertBefore, so we want to move to the next
            //node so that this new PI gets inserted AFTER the last PI
            theNode=lastPI.getNextSibling( );
            if (theNode==null) {
                //should always have at least a root node after a PI
                throw new ProcessorException("Error processing control file: need
a root node after a processing instruction");
            }
        } //if lastPI==null
        doc.insertBefore((Node) pi, theNode);
    } catch (DOMException e) {
        throw new ProcessorException("Unexpected error processing control
file: " + e.toString( ));
    }
} /*insertNextPI*/
```

Example

The Model DOM Before and After the
ControlFileProcessor

The following code sample shows the XML serialized version of a model file before the ControlFileProcessor updated the DOM.

```xml
<?xml version="1.0"?>
<xsp:page language="java" xmlns:xsp="http://www.apache.org/1999/XSP/Core"
xmlns:wdktags="http://www.saba.com/XML/WDK/taglib">
    <xsp:structure>
        <xsp:include>com.saba.exception.*</xsp:include>
        . . .
    </xsp:structure>
    <wdk:page xmlns:wdk="http://www.saba.com/XML/WDK">
        <wdk:head>
            <wdktags:in>
                <wdktags:param name="sessionKey"/>
                <wdktags:param name="actionKey" required="false" type="String" default=" "/>
                <wdktags:param name="personSearch"/>
            </wdktags:in>
            <wdktags:out>
                <wdk:param name="sessionKey" type="String" required="true"/>
                <wdk:param name="actionKey" type="String" required="false"/>
                <wdk:param name="personSearch" type="String" required="true"/>
            </wdktags:out>
            <xsp:logic>
            Session sabaSession = SessionManager.getSession(sessionKey);
            String desiredLang = (String)sabaSession.getBlob("selectedLanguage");
            </xsp:logic>
            <wdktags:i18n.load resource="party_labels">
                <language><xsp:expr>desiredLang</xsp:expr></language>
            </wdktags:i18n.load>
            <wdk:title>wdktags:i18n.label name="kl18n6000SearchForPeopleLabel"/>
            </wdk:title>
            <wdk:labels>
                <wdk:label name="busUnitLabel"><wdktags:i18n.label
name="kl18n6008BusinessUnitLabel"/></wdk:label>
                <wdk:label name="locLabel"><wdktags:i18n.label
name="kl18n6000LocationLabel"/></wdk:label>
                <wdk:label name="firstNameLabel"><wdktags:i18n.label
name="kl18n6000RegularFirstNameLabel"/></wdk:label>
                <wdk:label name="lastNameLabel"><wdktags:i18n.label
name="kl18n6000RegularLastNameLabel"/></wdk:label>
                <wdk:label name="locationLabel"><wdktags:i18n.label
name="kl18n6000RegularLocationLabel"/></wdk:label>
            </wdk:labels>
        </wdk:head>
        <wdk:form method="GET">
            <wdk:hidden_field>
                <name>sessionKey</name>
                <value><xsp:expr>sessionKey</xsp:expr></value>
            </wdk:hidden_field>
            <wdk:hidden_field>
                <name>actionKey</name>
                <value>search</value>
            </wdk:hidden_field>
            <wdk:model>
                <xsp:logic>
                if (actionKey.equals("search"))
                {
                    <people>
                        <wdktags:execute
manager="com.saba.client.party.beans.PersonCommandManager" command="searchForPeople"
argument="personSearch"/>
                    </people>
                } /* if actionKey.equals("search")*/
                </xsp:logic>
            </wdk:model>
        </wdk:form>
        <wdk:widgets>
            <wdk:input name="lastNameField">
                <label><wdktags:i18n.label name="kl18n6000LastNameLabel"/></label>
                <id>personSearch</id>
                <value><xsp:expr>personSearch</xsp:expr></value>
```

-continued

```
            </wdk:input>
            <wdk:link name="go">
                <id>GO</id>
                <href>searchPerson.xml</href>
                <type>button</type>
                <label><wdktags:i18n.label name="kl18n6XXXXXGO"/></label>
                <prompt><wdktags:i18n.label name="kl18n6XXXXXGO"/></prompt>
            </wdk:link>
        </wdk:widgets>
    </wdk:page>
</xsp:page>
```

The following code sample shows the same model file after the ControlFileProcessor updated the model file. The changes are shown in bold face:

```
<?xml version="1.0"?>

<xsp:page language="java" xmlns:xsp="http://www.apache.org/1999/XSP/Core"
xmlns:wdktags="http://www.saba.com/XML/WDK/taglib">
    <xsp:structure>
        <xsp:include>com.saba.exception.*</xsp:include>
        . . .
    </xsp:structure>
    <wdk:page xmlns:wdk="http://www.saba.com/XML/WDK">
        <wdk:head>
            <wdktags:in>
                <wdktags:param name="sessionKey"/>
                <wdktags:param name="actionKey" required="false" type="String" default=" "/>
                <wdktags:param name="personSearch"/>
            </wdktags:in>
            <wdktags:out>
                <wdk:param name="sessionKey" type="String" required="true"/>
                <wdk:param name="actionKey" type="String" required="false"/>
                <wdk:param name="personSearch" type="String" required="true"/>
            </wdktags:out>
            <xsp:logic>
            Session sabaSession = SessionManager.getSession(sessionKey);
            String desiredLang = (String)sabaSession.getBlob("selectedLanguage");
            </xsp:logic>
            <wdktags:i18n.load resource="party_labels">
                <language><xsp:expr>desiredLang</xsp:expr></language>
            </wdktags:i18n.load>
            <wdk:title><wdktags:i18n.label name="kl18n6000SearchForPeopleLabel"/>
            </wdk:title>
            <wdk:labels>
                <wdk:label name="busUnitLabel"><wdktags:i18n.label
name="kl18n6008BusinessUnitLabel"/></wdk:label>
                <wdk:label name="locLabel"><wdktags:i18n.label
name="kl18n6000LocationLabel"/></wdk:label>
                <wdk:label name="firstNameLabel"><wdktags:i18n.label
name="kl18n6000RegularFirstNameLabel"/></wdk:label>
                <wdk:label name="lastNameLabel"><wdktags:i18n.label
name="kl18n6000RegularLastNameLabel"/></wdk:label>
                <wdk:label name="locationLabel"><wdktags:i18n.label
name="kl18n6000RegularLocationLabel"/></wdk:label>
            </wdk:labels>

</wdk:head>
        <wdk:form method="GET">
            <wdk:hidden_field>
                <name>sessionKey</name>
                <value><xsp:expr>sessionKey</xsp:expr></value>
            </wdk:hidden_field>
            <wdk:hidden_field>
                <name>actionKey</name>
                <value>search</value>
            </wdk:hidden_field>
            <wdk:model>
```

```
            <xsp:logic>
                if (actionKey.equals("search"))
                {
                    <people>
                        <wdktags:execute
manager="com.saba.client.party.beans.PersonCommandManager" command="searchForPeople"
argument="personSearch"/>
                    </people>
                } /* if actionKey.equals("search")*/
            </xsp:logic>
        </wdk:model>
    </wdk:form>
    <wdk:widgets>
        <wdk:input name="lastNameField">
            <label><wdktags:i18n.label name="kl18n6000LastNameLabel"/></label>
            <id>personSearch</id>
            <value><xsp:expr>personSearch</xsp:expr></value>
        </wdk:input>
        <wdk:link name="go">
            <id>GO</id>
            <href>searchPerson.xml</href>
            <type>button</type>
            <label><wdktags:i18n.label name="kl18n6XXXXXGO"/></label>
            <prompt><wdktags:i18n.label name="kl18n6XXXXXGO"/></prompt>
        </wdk:link>
    </wdk:widgets>
</wdk:page>
</xsp:page>
```

Custom XSP Processor

Instead of using the XSP processor of Cocoon, Web Content Server 800 uses a custom XSP processor. To make this happen, the following line is added to the cocoon.properties file:

processor.type.xsp=com.saba.web.engine.SabaXSPProcessor

This processor adds the following capabilities:

Debugging: The Web Content Server 800 XSP processor can produce intermediate files representing the documents as the model page is transformed from its original form to the java code that is executed and the actual data that is produced by the java code. These intermediate files can be inspected to locate the source of a problem more easily.

Cache control: For debugging purposes it is important to know that the code that executes is the code that the developer has just edited. However, the cocoon engine contains a number of caching mechanisms that make this assumption incorrect sometimes (ie. The code that's executed is code that is in the cache instead of code that the developer has just changed). The Web Content Server 800 XSP processor allows control over caching.

Producing Intermediate Files for Debugging Purposes

The SabaXSPProcessor can produce intermediate files as the model file goes through the different transformation steps. The helper classes XSPDebugger and DebuggerConfig are used to control which if any intermediate files should be produced. The following properties are introduced in cocoon.properties for controlling debugging behavior:

wdkdebugoutput
wdkdisablecache
wdkdebug

The wdkdebug property can have the following values:

off: No debugging information is produced
full: Every intermediate file is produced
wdktags: Only the result of the wdk tag library transformation is output wdk: Only the result of the widget library transformation is output
xsp: Only the result of the xsp transformation is output.
model: Outputs the result of executing the java code produced from the model page.

The wdkdebugoutput property can have the following values:

sourcedir: The output files are placed in the same directory where the source documents are read from.
browser: The output files are sent to the browser
repository: The output files are placed in the cocoon repository directory.

The wdkdisablecache can either be "true" or "false". If true the cocoon cache is not used.

The init method of the SabaXSPProcessor creates an instance of the DebuggerConfig class, and the process method creates an instance of XSPDebugger. The XSPDebugger is a subclass of Debugger and it uses the DebuggerConfig object to read the debugger configuration from the cocoon.properties file.

The Debugger and XSPDebugger classes
The Debugger has the following API:
public void readParameters(Dictionary parameters, DebuggerConfig config);
This method initializes the Debugger with the current debugging property values.
protected boolean debugThis(String rule);
The method returns true if the wdkdebug property is either "full" or matches the rule parameter.
protected boolean browserOnly( );
The method returns true if the wdkoutput property is set to "browser".
public boolean cacheDisabled( );
Returns true if the wdkdisablecache is true.
The XSPDebugger introduces the following methods:
public boolean debugLogicsheet(String rule, Document document);
Returns true if Debugger.debugThis(rule) is true AND if Debugger.browserOnly( ) is true. If only Debugger.debugThis(rule)is true, then first saves the intermediate result before returning false. public void debugFinalXSP(Document document)

If the the wdkdebug property is full or set to model then the result of executing the code produced from the model file is output.

Custom XSLT Processor

The default XSLT processor that comes with Cocoon performs a single XSLT transformation only. However, Web Content Server 800 requires two XSL transformations after the java code produces the data. The first transformation replaces the widgets with their HTML representation (the widget transformation) while the second transformation renders the data (the view transformation). To make the engine aware of the Web Content Server 800 XSLT processor, the following line is added to the cocoon.properties file:

processor.type.wdk_xsl=com.saba.web.engine. WDK_XSLTProcessor

The Web Content Server 800 XSLT processor takes as input the document object model produced by executing the XSP page. The processor extracts the xml:stylesheet processing instructions from the DOM, and executes XSL transformations using the stylesheet documents referred to by the "href" data element in the processing instructions. (The xml:stylesheet processing instructions were inserted in the source document by the control file processor—see the ControlFileProcessor algorithm section for details). After each transformation step, if the debugger flags are set, the DOM is serialized and saved to a text file.

The following code snippet shows how the widget and view transformations are performed:

```
try {
    /* get all stylesheets referred to by this document */
    Vector resources = getResources(document, request, context);
    /* apply each stylesheet in turn */
    Enumeration e = resources.elements( );
    while (e.hasMoreElements( )) {
        Object resource = e.nextElement( );
        this.logger.log(this, "Processing stylesheet" +
                resource.toString( ), Logger.DEBUG);
        Document stylesheet = getStylesheet(resource, request,
                !xsltDebugger.cacheDisabled( ));
        Document result = this.parser.createEmptyDocument( );
        document = transformer.transform(document, null, stylesheet,
                resource.toString( ), result, params);
        if (xsltDebugger.debugStylesheet(document, resource)) {
            // requested debug output to browser, so done now
            return document;
        }
    }
    return document;
} catch (PINotFoundException e) {
    return document;
}
```

Custom XSP Page Class

Each XSP page (model page) is transformed to a java object (source code generated, compiled and the class is loaded). In Web Content Server 800 the generated java objects are instances of the SabaXSPPage class, which is a subclass of the XSPPage class. (The XSPPage class is the default class provided by Cocoon.) In order to change the class from XSPPage to SabaXSPPage, the following changes had to be made:

1. Create a new xsp-java.xsl taglibrary stylesheet based on the default stylesheet that comes with Cocoon:

a. Change the class declaration line to extend SabaXSPPage instead of XSPPage as follows:
      public class <xsl:value-of select="@name"/> extends SabaXSPPage {
   b. Invoke the initialization method specific to SabaXSPPage in the populateDocument method:
      initializeOnRequest(request, response);
      This method initializes protected site and logger variables. (See below)

2. Change the cocoon.properties file by adding the following line:
   processor.xsp.java.logicsheet=/com/saba/web/engine/xsp-java.xsl The SabaXSPPage class provides model pages access to frequently needed information including:

Site: information about the SabaSite object representing the current saba site.

Path information: extracted from the Saba site object for convenience

Access to a logger for debugging and status messages

SabaXSPPage declares protected member variables for each:

| | |
|---|---|
| protected SabaSite | wdkSite; |
| protected Logger | wdkLogger; |
| protected String | wdkBaseURL; |
| protected String | wdkRoot; |

These variables are therefore accessible by model pages and by the tags defined in the wdktags tag library.

Structure of Model Pages

Model pages are Extensible Server Page (XSP) pages. XSP pages can contain a mix of static content and content generating programming logic by using xsp directives (tags) defined in the xsp tag library. Furthermore, an XSP page can make use of an indefinite number of application specific tag libraries. A Web Content Server 800 model page uses the wdktags tag library to simplify certain common programming tasks.

Web Content Server 800 model pages have a very well defined structure. The document element of the page is <xsp:page>. The document element can contain <xsp:structure> and other xsp directives, but it can contain a single non-xsp element only. For a Web Content Server 800 page that element is wdk:page. The wdk:page element consists of the following subsections:

wdk:head—contains internationalized labels, the page title, image references, link mapping information (generated automatically from the control file by the control file processor).

wdk:form—The wdk:form element is one of the elements in the widget library. Since most wdk pages are HTML forms, the wdk:form element is used to generate the HTML form and javascript functions required by a Web Content Server 800 application. For example, a javascript function is generated that can be called by link widgets to submit the form.

wdk:widgets—widgets (input fields, buttons, hyperlinks, etc.) are all listed in the wdk:widgets section.

The wdk:form element can contain the declaration of hidden fields needed by the application, and it contains a singe wdk:model element. The wdk:model element contains all "data" generated by the page.

Often all the wdk:model section contains is invocations of Commands that produce the appropriate XML content.

Separating Content from Interaction

An important property of model pages is the ability to generate/declare dynamic content (through commands) and interaction elements (widgets) independently of each other. This separation of content and widget generation allows for greater reusability. However, at the end of all the processing, the widgets and the content have to be combined. For example, an input text field (a widget) and the "name" property of a business object have to be connected/combined some way to make sure that that particular text field can display that particular property. This connectivity between model elements and widgets is achieved by Web Content Server 800 tag library tags.

The wdktags:attachTo tag can be used to "attach" (copy) a particular widget to a model element.

For example, a software engineer may author the following simple model document:

```
<xsp:page language= "java"
    xmlns:xsp= "http://www.apache.org/1999/XSP/Core"
    xmlns:wdktags= "http://www.saba.com/XML/WDK/taglib"
>
<wdk:page>
    <wdk:head>
    </wdk:head>
    <wdk:form method= "POST">
    <wdk:model>
        <domain>
            <name>Domain 1</name>
            <id>id1</id>
        </domain>
        <domain>
            <name>Domain 2</name>
            <id>id2</id>
        </domain>
    </wdk:model>
    </wdk:form>
    <wdk:widgets>
        <wdk:input name= "editName">
            <wdktags:attachTo path= "domain"/>
            <value><wdktags:nodeRef path= "name"/></value>
        </wdk:input>
    </wdk:widgets>
</wdk:page>
</xsp:page>
```

The document resulting from processing the Web Content Server 800 tag library and the XSP engine execution will be:

```
<wdk:page>
    <wdk:head>
    </wdk:head>
    <wdk:form>
    <wdk:model>
        <domain>
            <name>Domain 1</name>
            <id>id1</id>
            <wdk:input name= "editName">
                <value>Domain 1</value>
            </wdk:input>
        </domain>
        <domain>
            <name>Domain 2</name>
            <id>id2</id>
            <wdk:input name= "editName">
                <value>Domain 2</value>
            </wdk:input>
        </domain>
    </wdk:model>
    </wdk:form>
    <wdk:widgets/>
</wdk:page>
```

Note that the attachTo directive effectively created a copy of the input widget inside each domain element. Furthermore, the nodeRef directive has been replaced with the text value of the element it refers to in its path attribute.

The following describes the implementation of the attachTo tag.

```
1   <xsl:template match="*[wdktags:attachTo]">
2   <xsl:variable name="rootNode">
        <xsl:choose>
            <xsl:when test="wdktags:attachTo/@root">
                <xsl:value-of select="wdktags:attachTo/@root"/></xsl:when>
            <xsl:otherwise>
        WDKDomUtils.getModelNode(xspCurrentNode.getOwnerDocument( ).
                    getDocumentElement( ))
            </xsl:otherwise>
        </xsl:choose>
    </xsl:variable>
3   <xsp:logic>
    {
    List wdkNodes = WDKDomUtils.getNodes((Element)<xsl:value-of
    select="$rootNode"/>,"<xsl:value-of select="wdktags:attachTo/@path"/>");
4   if (wdkNodes == null) {
        throw new RuntimeException("Could not find node: <xsl:value-of
    select="wdktags:attachTo/@path">");
    }
    Iterator wdkIter = wdkNodes.iterator( );
    while (wdkIter.hasNext( )) {
5       wdkwidgetNode = (Node)wdkIter.next( );
        wdktagsNodeStack.push(xspCurrentNode);
        xspCurrentNode = wdkwidgetNode;
```

-continued

```
6       if (xspCurrentNode == null) {
            throw new RuntimeException("Null node in node list");
        }
7       <xsp:content>
            <xsl:copy>
                <xsl:apply-templates select="*|@*"/>
            </xsl:copy>
        </xsp:content>
8       xspCurrentNode = (Node)wdktagsNodeStack.pop( );
    }
    }
    </xsp:logic>
</xsl:template>
```

Line 1 specifies the match condition: this template will match any element that contains a wdktags:attachTo sub-element. Section 2 contains XSL logic for determining what root element should be used as the starting point for the value of the path attribute. If the developer specifies a root attribute, then the value of that attribute is used, otherwise the root element defaults to the wdk:model node of the model page. Section 3 invokes the getNodes( ) method on the WDKDomUtils class. That method returns the set of nodes that can be accessed from the root node through the path given in the path attribute of the wdktags:attachTo directive. Section 4 checks for error conditions and sets up the iteration through the set of DOM elements returned in section 3. In section 5 the current xsp node (the value of the xspCurrentNode variable) is saved on a stack, and its value is replaced with the next node from the set of nodes returned in section 3. Since the XSP processor uses the xspCurrentNode variable to mark the current "insertion point"—i.e. the location where the next DOM node will be inserted in the Document, this operation effectively copies the current subtree (the widget) to each node returned in section 3. (Sections 6 and 7 perform the actual copying.) Finally, section 8 restores the value of the xspCurrentNode and resumes the iteration.

The following section describes the implementation of the nodeRef tag.

```
1   <xsl:template match="wdktags:nodeRef">
2       <xsl:variable name="root">
            <xsl:choose>
                <xsl:when test="@source"><xsl:value-of select=
                    "@source"/></xsl:when>
                <xsl:otherwise>wdkwidgetNode</xsl:otherwise>
            </xsl:choose>
        </xsl:variable>
3       <xsp:logic>{
            Element wdkChildNode = WDKDomUtils.getChildNode
            ((Element)<xsl:value-of select="$root"/>,"<xsl:value-of select=
            "@path"/>");
                <xsp:content><xsp:expr>WDKDomUtils.getTextValue
                (wdkChildNode)</xsp:expr></xsp:content>
            }
        </xsp:logic>
    </xsl:template>
```

Line 1 specifies the match condition: this rule matches every nodeRef tag. Section 2 determines the root node: if the source attribute is given then the value of that attribute is used, otherwise the value of wdkwidgetNode Java variable is used. The wdkwidgetNode variable is initialized in the wdktags:attachTo template described above. This way, if nodeRef is used in the context of an attachTo tag, the root node is the same node the widget is copied to. The actual node whose value is needed is located by following the path from the root node. Finally, the text value of the node is computed by calling the WDKDomUtils.getTextValue( ) method.

Structure of View Pages

View pages are XSLT stylesheets. The role of the view stylesheet is to convert the XML document produced by executing the model file (and the subsequent widget transformation) to a format understood by the user agent. For example, for desktop browsers this typically means conversion to an HTML representation. Since model pages have a well-defined structure, view pages are also highly regular. For example, there are a number of model page elements that should not be rendered (such as wdk:head element and its content should not be copied to the output). Other model pages nodes have a standard representation in HTML (or in the desired output format). For example, the rule for rendering wdk:page is to generate the <html> element, the <head> element containing the <title> element. These common templates are all grouped in a default stylesheet that can be imported using the <xsl:import> directive by every view page. As a result, for simple pages, the view page needs to contain a singe customized xsl:template rule that matches on the "wdk:model" node. This template is responsible for rendering the data as well as the widgets.

Example

Default View Transformation Templates

```
1   <?xml version="1.0"?>
    <xsl:stylesheet version="1.0" xmlns:xsl="http://www.w3.org/1999/
        XSL/Transform"
    xmlns:wdk="http://www.saba.com/XML/WDK">
    <xsl:output method="xml" indent="yes"/>
    <xsl:strip-space elements="*"/>
2   <xsl:template match="/">
        <xsl:variable name="titleLabel"><xsl:value-of select="//wdk:
            head/wdk:title"/></xsl:variable>
        <html>
            <head>
                <title><xsl:value-of select="$titleLabel"/></title>
            </head>
            <body>
                <xsl:apply-templates/>
            </body>
        </html>
    </xsl:template>
3   <xsl:template match="* | @*|text( )|comment( )" priority="-1">
        <xsl:copy>
```

-continued

```
            <xsl:apply-templates select="* | @*|text( )|
                comment( )"/>
        </xsl:copy>
    </xsl:template>
4   <!--eliminate the wdk:head element and all children of wdk:
        widgets -->
    <xsl:template match="wdk:head | wdk:widgets">
    </xsl:template>
5   <!-- replace widget with span (so we can do CSS on it) and process
        their children -->
    <xsl:template match="wdk:widget">
        <span class="{@name}">
            <xsl:apply-templates/>
        </span>
        <br/>
    </xsl:template>
6   <xsl:template match="wdk:page">
        <xsl:apply-templates/>
    </xsl:template>
</xsl:stylesheet>
```

Section 1 defines the namespaces used in the stylesheet. Section 2 defines the root level template. This template produces the html tags, and generates the html head element complete with the title element. Section 3 defines the default template: every element, attribute, text and comment is copied to the resulting document, unless a more specific template provides different instructions. Section 4 specifies a template for eliminating the wdk:head and wdk:widgets elements and their contents (since the contents of these tags should not be rendered using the default template defined in section 3). Section 5 introduces a template for transforming every widget by wrapping them into a span element replacing the wdk:widget "wrapper". This makes it possible to use CSS styling on a per named-widget basis. Finally, section 6 defines the template for processing the wdk:page element.

A View Page Example

```
1   <?xml version="1.0"?>
    <xsl:stylesheet version="1.0" xmlns:xsl="http://www.w3.org/1999/
        XSL/Transform"
        xmlns:wdk="http://www.saba.com/XML/WDK">
2   <xsl:import href="../xsl/view/wdk_defaultview.xsl"/>
3   <xsl:template match="wdk:model">
4       <h2 align="center"><xsl:value-of select="/wdk:page/wdk:
            head/wdk:title"/></h2>
5       <p>
        <xsl:value-of select="/wdk:page/wdk:head/wdk:labels/wdk:label
            [@name='nameLabel']"/>
6       <xsl:for-each select="parents/parent">
            <xsl:value-of select="name"/>
            <xsl:text> > </xsl:text>
        </xsl:for-each>
        <xsl:value-of select="parents/leaf/name"/>
        </p>
7       <xsl:apply-templates select="//wdk:widget"/>
8   </xsl:template>
    </xsl:stylesheet>
```

Section 2 imports the stylesheet containing the default templates. Line 3 defines the rule for processing the wdk:model node. Line 4 displays the title of the page by accessing the wdk:title tag inside the wdk:head tag. Section 6 iterates through each "parent" element inside the wdk:model element and displays its name. In section 7 any widget produced by the model page is displayed.

The wdk Taglibrary

The wdk taglibrary contains a number of tags to simplify the development wdk model pages. The tag library includes tags for:

handling resource bundles for page internationalization, invoking commands to generate XML representation of the data retrieved from the database, managing the connectivity between widgets and the produced data model, managing the input and output parameters to the model page, etc.

To make the tag library accessible by the processing engine, the following line is inserted in cocoon.properties:

processor.xsp.logicsheet.wdktags.java=s:/sys/java/web/com/saba/web/xsl/taglib/wdk_taglib.xsl The value of the above property identifies the location of the taglibrary stylesheet. The taglibrary stylesheet contains a number of xsl:import directives to import templates responsible for implementing subsets of tags and it also contains a number of default templates, as the code example below shows:

```
<?xml version="1.0" encoding="UTF-8"?>
<xsl:stylesheet version="1.0" xmlns:xsl="http://www.w3.org/1999/
    XSL/Transform"
xmlns:xsp="http://www.apache.org/1999/XSP/Core"
xmlns:wdktags="http://www.saba.com/XML/WDK/taglib"
xmlns:wdk="http://www.saba.com/XML/WDK">
<xsl:preserve-space elements="*"/>
<xsl:include href="wdk_param.xsl"/>
<xsl:include href="wdk_i18n.xsl"/>
<xsl:include href="wdk_command.xsl"/>
<xsl:include href="wdk_control.xsl"/>
<xsl:include href="wdk_site.xsl"/>
    <xsl:template match="xsp:page">
        <xsl:copy>
            <!-- need to explicitly call some logic in the wdk_command
                stylesheet -->
            <xsl:call-template name="command_header"/>
            <!-- need to explicitly call some logic in the control
                stylesheet -->
            <xsl:call-template name="control_header"/>
            <xsl:apply-templates/>
        </xsl:copy>
    </xsl:template>
<xsl:template match="@*|*|text( )|processing-instruction( )|
    comment( )" priority="-1">
    <xsl:copy>
        <xsl:apply-templates select="@*|*|text( )|processing-
            instruction( )|comment( )"/>
    </xsl:copy>
</xsl:template>
<xsl:template match="wdk:head">
    <xsl:copy>
        <wdk:site>
            <href>/<xsp:expr>wdkRoot</xsp:expr>/</href>
            <imageRoot><xsp:expr>wdkSite.getImageRoot( )</xsp:expr>
                </imageRoot>
<sabaservlet><xsp:expr>WDKSabaUtil.getAssociatedSabaSiteName
(wdkRoot)</xsp:expr></sabaservlet>
            <sitename><xsp:expr>wdkSite.getName( )</xsp:expr></sitename>
        </wdk:site>
        <xsl:apply-templates/>
    </xsl:copy>
</xsl:template>
</xsl:stylesheet>
```

An Example: wdktags:param

The wdktags:param is one of the tags defined in the wdk tag library. The purpose of this tag is to simplify the extraction of parameters from the HttpServletRequest object. Traditionally, JSP, XSP or servlet programmers have to write a number of lines of code for the parameters they want to process. The code for each parameter is typically similar to the following:

```
String param = request.getParameter("param");
if (param == null) {
    param = "some default";
}
```

The wdktags:param tag intends to simplify this by allowing developers to declare what parameters they want to use in the model page, and the mundane task of extracting the parameter is performed by the tag itself. Thus, Web Content Server 800 developer can write the following in the <wdk: head> section of the model page:

```
<wdktags:in>
    <wdktags:param name= "param" type= "String"
        default= "some default" required= "true"/>
</wdktags:in>
```

Each parameter can be defined with a single line of XML code and as a result of this line the developer can use a Java variable named "param" in their code wherever the value of the "param" HttpRequest parameter is needed. The wdktags: param tag is implemented in wdk_param.xsl, and is imported by the main taglibrary stylesheet. The following code shows the implementation of wdktags:param:

```
1 <?xml version="1.0" encoding="UTF-8"?>
  <xsl:stylesheet version="1.0" xmlns:xsl="http://www.w3.org/1999/
      XSL/Transform"
  xmlns:xsp="http://www.apache.org/1999/XSP/Core"
  xmlns:wdktags="http://www.saba.com/XML/WDK0/taglib">
2 <xsl:template match="wdktags:in/wdktags:param">
3   <xsp:logic>
      <xsl:variable name="paramName"><xsl:value-of select=
          "@name"/></xsl:variable>
      <xsl:variable name="paramType">
        <xsl:choose>
          <xsl:when test="not(@type)">String</xsl:when>
          <xsl:when test="@type='ID'">String</xsl:when>
          <xsl:otherwise><xsl:value-of select="@type"/>
          </xsl:otherwise>
        </xsl:choose>
      </xsl:variable>
      <xsl:variable name="paramRequired">
        <xsl:choose>
          <xsl:when test="not(@required)">false</xsl:when>
          <xsl:otherwise><xsl:value-of select="@required"/>
          </xsl:otherwise>
        </xsl:choose>
      </xsl:variable>
      <xsl:variable name="paramDefault">
        <xsl:choose>
          <xsl:when test="@default!=''"><xsl:value-of select=
              "@default"/></xsl:when>
          <xsl:when test="@default=''">""</xsl:when>
          <xsl:when test="not(@default) and @type='String'">""
          </xsl:when>
          <xsl:otherwise>null</xsl:otherwise>
        </xsl:choose>
      </xsl:variable>
4     <xsl:value-of select="$paramType"/><xsl:text> </xsl:text>
    <xsl:value-of select="$paramName"/>request.getParameter
    ("<xsl:value-of select="$paramName"/>");
      if (<xsl:value-of select="$paramName"/> == null)
        <xsl:value-of select="$paramName"/> = <xsl:value-of
            select="$paramDefault"/>;
```

-continued

```
    </xsp:logic>
  </xsl:template>
</xsl:stylesheet>
```

Section 1 declares all namespaces used in the stylesheet. In line 2 the match condition is given for the template. This template matches on every wdktags:param tag inside a wdktags:in tag. This nested condition is necessary, because a different template may transform wdktags:param tags inside the wdktags:out tag. Section 3 computes the values to use for parameter type and parameter default value. These values are either determined from the values of "type" and "default" attributes of the wdktags:param tag, or default values are selected (the java String class for type, and the java null constant for default). Section 4 produces the java code declaring the java variable by the name given in the "name" attribute of the param tag, and the value is initialized either from the HttpServletRequest object or by using the default value computed in line 2.

Tags Defined in the Web Content Server 800 Tag Library wdktags:param Provides a convenient method for declaring and using parameters passed in through the HttpServletRequest.

wdktags:siteRef: Generates an absolute URL from a relative URL based on the current site information.

wdktags:execute: XML fragments produced by Java objects (Commands) can be embedded in the resulting model document using the execute tag.

wdktags:i18n.load: Declares the i18n resource bundle to use for the labels in the page.

wdktags:i18n.path: Generates internationalized image path information using site parameters and information from the resource bundle specified by wdktags:i18n.load.

wdktags:i18n.label: Retrieves internationalized labels from the resource bundle specified by wdktags:i18n.load.

wdktags:attachTo and wdktags:nodeRef: As described above these tags can be used to assign widgets to model elements and to add data dependent information to widgets.

wdktags:repeat: Provides the capability to replicate widget components based on elements in the generated model. Used mainly by list widgets to generate the set of options dynamically.

The Widget Library

The Web Content Server 800 widget library contains rules (XSLT templates) for transforming a number of widgets to their HTML representation. The widget library provides a level of abstraction between the user interaction component (e.g., a text input field) and its presentation (e.g., an HTML input field or a WML input field). This way the content producing model pages can be reused by different control files—one may deliver the content to a desktop browser using the HTML widget library, while another may deliver the same content to a handheld device using a modified version of the widget library (e.g., using WML).

The widget library contains widgets for most commonly used inputs and controls, such as:

Buttons and links: The link widget can be used to display an image button or regular hyperlink;

List widgets: the list widget can be used to display common drop-down menus, set of radio boxes or set of check boxes;

Input widgets for entering and displaying text values and passwords;

Hidden variables: for storing values in the webpage without displaying them;
Etc.

An Example: wdk:input

The wdk:input widget represents the abstract notion of a text field. If the model page developer needs a text field to get information from the user, he or she needs to use the wdk:input widget. Here is an example of using the input widget:

```
<wdk:input name= "inputZip">
    <id>inputZip</id>
    <size>5</size>
        <maxlength>5</maxlength>
        <value>60202</value>
        <label>Enter the zip code</label>
        <required>false</required>
        <password>false</password>
</wdk:input>
```

The widget transformation transforms this document fragment to the following:

```
<wdk:widget name= "inputZip">
        <span align= "left" class= "Input_Label">Enter the zip code</span>

<span align= "left" class= "Input_Field">
        <input type= "text" name= "inputZip" size= "5" maxlength= "5" value= "60202"/>
    </span>
</wdk:widget>
```

Note that the transformed version of the widget is "wrapped into" wdk:widget tags. This makes it very simple for the view transformation to reference the entire widget (e.g. by using <xsl:apply-templates select="wdk:widget [@name='inputZip']/>). Also note that the label and the field parts of the widget are wrapped in <span> tags with the class attribute set to Input_Label and Input_Field, respectively. These class attributes can be used to customize the look and feel of the input widget by using Cascading Stylesheets (CSS) or by writing specific XSLT templates in the view transformation. For example, the following view transformation template will set all input labels in the page to use Arial font:

```
<xsl:template match= "span[@class= 'Input_Label']">
    <span style= "font-family:Arial">
        <xsl:apply-templates select= "*"/>
    </span>
</xsl:template>
```

The wdk:input widget is implemented as XSLT templates as shown below:

```
1   <xsl:template match="wdk:input">
        <xsl:variable name="formElement">
            <xsl:choose>
                <xsl:when test="boolean(id)">
                    <xsl:value-of select="normalize-space(id)"/>
                </xsl:when>
                <xsl:otherwise>
                    <xsl:value-of select="@name"/>
                </xsl:otherwise>
            </xsl:choose>
        </xsl:variable>
2       <wdk:widget name="{@name}">
3           <span align="left" class="Input_Label">
4               <xsl:if test="required='TRUE'">
                    <xsl:attribute name="style">color: red</xsl:attribute>
                </xsl:if>
                <xsl:value-of select="label"/>
            </span>

5           <span align="left" class="Input_Field">
                <xsl:choose>
                    <xsl:when test="normalize-space(password)='true'">
                        <input name="{$formElement}" type="password">
                            <xsl:call-template name="input_attributes"/>
                        </input>
                    </xsl:when>
                    <xsl:otherwise>
                        <input name="{$formElement}" type="text">
                            <xsl:call-template name="input_attributes"/>
                        </input>
                    </xsl:otherwise>
                </xsl:choose>
            </span>
6       </wdk:widget>
    </xsl:template>
7   <xsl:template name="input_attributes">
        <xsl:if test="boolean(size)">
            <xsl:attribute name="size"><xsl:value-of select="normalize-space(size)"/></xsl:attribute>
        </xsl:if>
        <xsl:if test="boolean(maxlength)">
            <xsl:attribute name="maxlength"><xsl:value-of select="normalize-space(maxlength)"/></xsl:attribute>
        </xsl:if>
        <xsl:if test="boolean(value)">
            <xsl:attribute name="value"><xsl:value-of select="normalize-space(value)"/></xsl:attribute>
        </xsl:if>
    </xsl:template>
```

Section 1 contains the match condition for the template: every wdk:input element in the document will be transformed using this template. In section 1 the name of the input field is computed as well. Section 2 shows that this widget (just like all the other widgets) is nested inside a wdk:widget element, which makes it simpler to place widgets in the view transform. Section 3 shows how the different components (the label and the actual text field) are embedded in an HTML span element. In section 4 the color of the text label is determined based on the "required" sub-element of the wdk:input widget. The logic in section 5 determines what type of text field to generate: either "password" or regular "text" field. Section 7 shows the template called from section 5 to fill in the attributes of the generated HTML input element.

List of Widgets Defined in the wdk Widget Library wdk:hidden_element: Represents an HTML hidden element. The widget generates the required element and Javascript functions that can be invoked to set the value of this element.

wdk:form: Generates the HTML form element and Javascript functions needed to manage the form.

wdk:input: Represents a single line text element. Can render the widget as a PASSWORD or TEXT HTML form field.

wdk:list: Represents a widget for selecting an item from a set of predefined items. Supports four different HTML renderings:

Dropdown list
List box
Checkbox set
Radiobutton set wdk:link: Represents a link or button. Besides submitting the form, the link widget can be used to:

Pass parameters with the invoked URL using <field> subelements;
Execute an unlimited number of javascript functions before (or instead of) submission;
Open popup-windows and initialize the popup-window variables.
Process the data returned by the popup window invoked by the link Commands Model pages are responsible for producing an XML representation of the content of the page. This content typically comes from executing complex business logic (e.g., running database queries, exercising business APIs, etc.). Although model pages (being XSP pages) are capable of including programming logic, including a large amount of code in an XSP page makes it hard to maintain. To solve this problem Web Content Server 800 introduces an implementation of the Command pattern (Gamma et al.). A developer can invoke a command from a model page by using the execute Web Content Server 800 tag library tag. For example, the following line <wdktags:execute manager="CatalogCommandMgr" command="search"/> invokes the execute method of the ICommand object registered under the "search" key of the CatalogCommandMgr and replaces the element with the XML result of executing the method. Here is the implementation of the wdktags:execute tag:

```
<?xml version="1.0"?>
<xsl:stylesheet version="1.0" xmlns:xsl=
"http://www.w3.org/1999/XSL/Transform"
xmlns:xsp="http://www.apache.org/1999/XSP/Core"
xmlns:wdktags="http://www.saba.com/XML/WDK/taglib">
<xsl:template name="command_header">
    <xsp:structure>
        <xsp:include>com.saba.xml.*</xsp:include>
        <xsp:include>com.saba.web.dk.*</xsp:include>
    </xsp:structure>
    <xsp:logic>
    ICommand cmd = null;
    private ICommand getCommand(String mngrName,
    String cmdName)
        throws Exception {
    Class mngrClass = Class.forName(mngrName);
    ICommandManager mngr =
    (ICommandManager)mngrClass.newInstance( );
    return cmd = mngr.getCommand(cmdName);
    }
    Node executeCommand(String mngrName, String cmdName,
        HttpServletRequest request, HttpServletResponse response,
        Document document, Object argument)
        throws Exception {
    StringWriter writer = new StringWriter( );
    IXMLVisitor visitor = XML.getDefaultXMLVisitor(writer);
    cmd = getCommand(mngrName, cmdName);
    if (argument != null)
        cmd.execute(request, visitor, argument);
```

-continued

```
    else
        cmd.execute(request, visitor);
    String xml = writer.toString( );
    if (xml.length( ) !=0) {
        InputSource source = new InputSource(new
            StringReader(writer.toString( )));
        XercesParser parser = new XercesParser( );
        Document doc = parser.parse(source, false);
        return document.importNode(doc.getFirstChild( ), true);
    }
    else {
        return null;
    }
    }
    </xsp:logic>
</xsl:template>
<xsl:template match="wdktags:execute">
    <xsl:variable name="returnVariable">
        <xsl:choose>
            <xsl:when test="boolean(@return)"><xsl:value-of select=
                "@return"/></xsl:when>
            <xsl:otherwise>wdkExecuteReturn<xsl:value-of select=
                "generate-id( )"/></xsl:otherwise>
        </xsl:choose>
    </xsl:variable>
    <xsp:logic>
        Node <xsl:value-of select="$returnVariable"/>;
    </xsp:logic>
    <xsp:logic>{
        String wdkMngrName = "<xsl:value-of select=
            "@manager"/>";
        String wdkCmdName = "<xsl:value-of select=
            "@command"/>";
        Object wdkArgument = null;
        <xsl:if test="boolean(@argument)">
            wdkArgument = (Object) <xsl:value-of select=
                "@argument"/>;
        </xsl:if>
        <xsl:value-of select="$returnVariable"/> =
        (Node)executeCommand(wdkMngrName,
wdkCmdName, request, response, document, wdkArgument);
    }
    </xsp:logic>
    <xsp:expr><xsl:value-of select="$returnVariable"/></xsp:expr>
</xsl:template>
</xsl:stylesheet>
```

The stylesheet for the wdktags:execute contains two templates. The first template (named command_header) is a template called by the main taglibrary stylesheet to create class level methods. These methods (getCommand and executeCommand) are called by the code that results from the transformation of the wdktags:execute tags. The getCommand method takes two arguments: the fully qualified name of a Command manager (see below) and a command name. It returns an ICommand object (see below for details) that is registered with the command manager by the command name. The executeCommand method performs the following steps:

1. Creates an IXMLVisitor. It uses the default visitor provided by the XML class.
2. Uses the getCommand method to get the command object
3. Invokes the execute method on the command object. The created IXMLVisitor is passed to this method along with the request and argument objects that are passed to the executeCommand method.
4. The serialized XML document produced by the visitor object is parsed and the resulting DOM Node is returned.

The template for the execute tag performs the following steps:

1. Sets up a DOM Node variable for the node generated by the executeCommand method.
2. Invokes the executeCommand method with the classname of the command manager, the name of the command and the optional argument, and assignes the returned Node to the Node variable set up in step 1.
3. Adds the generated Node to the document using <xsp: expr> tags.

ICommandManager

ICommandManager is the interface implemented by individual command managers. It declares the following method:

public ICommand getCommand(String name) throws Exception;

For convenience an abstract class implementing the ICommand is defined. This class provides the following API for its subclasses:

public void registerCommand (String name, ICommand command);

Command managers can extend this class and implement a single method:

public abstract void initializeMapStructure( ) throws Exception;

For example, the Domain command manager that manages commands related to security domains has the following implementation:

```
public class DomainCommandManager extends AbstractCommandManager
{
    public DomainCommandManager ( ) throws SabaException {
        super( );
    }
    public void initializeMapStructure( )
        throws SabaException
    {
        registerCommand("searchForDomain", new SearchCommand( ));
        registerCommand("getDomainAndParents", new ParentsCommand( ));
        registerCommand("editDomain", new EditCommand( ));
    }
}
```

ICommand

Command objects implement the ICommand interface. The ICommand interface follows the Command pattern (see Gamma et al., 1995) and the Prototype pattern. To support prototyping, ICommand extends the java Cloneable interface. ICommand declares the following methods:

public void execute (HttpServletRequest req, IXMLVisitor visitor) throws Exception;
    public void execute (HttpServletRequest req, IXMLVisitor visitor, Object arg) throws Exception These methods are invoked by the wdktags:execute tag in a model page.

XML Serialization Framework

Commands are used to generate an XML representation of some business objects. To make this task simpler, Web Content Server 800 introduces the notion of IXMLVisitor and IXMLObject following the Visitor pattern (see Gamma et al, 1995.).

IXMLVisitor

IXMLVisitor declares the following methods:
  public void visit (String prefix, String tagName, String value) throws XMLVisitorException;
  public void visit (String prefix, String tagName, Number value) throws XMLVisitorException;
  public void visit (String prefix, String tagName, Locale value) throws XMLVisitorException;
  public void visit (String prefix, String tagName, TimeZone value) throws XMLVisitorException;
  public void visit (String prefix, String tagName, Date value) throws XMLVisitorException;
  public void visit (String prefix, String tagName, URL value) throws XMLVisitorException;
  public void visit (String prefix, String tagName, IXMLObject value) throws XMLVisitorException;
  public void writeOpenTag (String prefix, String tagname) throws XMLVisitorException;
  public void writeCloseTag (String prefix, String tagname) throws XMLVisitorException;
  public void createModel (String className) throws XMLVisitorException;

Visit methods are declared for most frequently used data types and for IXMLObject. Besides the visit methods writeOpenTag and writeCloseTag are also declared. These two methods must be used when generating nested XML elements. For example, take the following XML document fragment:

```
<doc>
    <name>A name</name>
    <updated>
        <person>Jill August</person>
        <date>1/1/2000</date>
    </updated>
</doc>
```

A visitor can produce this document fragment with the following sequence of visit calls:

```
visitor.writeOpenTag(null, "doc");
visitor.visit(null, "name", "A name");
visitor.writeOpenTag(null, "updated");
visitor.visit(null, "person", "Jill August");
visitor.visit(null, "date", aDate);
visitor.writeCloseTag(null, "update");
visitor.writeCloseTag(null, "doc");
```

Note: the prefix parameter for the visit, writeOpenTag and writeCloseTag methods is used if the tags to generate are in some specific namespace. (There is a separate namespace registration mechanism that associates the prefix with a particular namespace URLI).

IXMLObject

The IXMLObject interface declares the following methods:
    public void acceptXMLVisitor (IXMLVisitor visitor)
  throws XMLVisitorException;
    public String getTagName( );
Business objects that implement the IXMLObject interface can be converted to XML by a command with a single method call:
    public void execute (HttpServletRequest req,
    IXMLVisitor
  visitor) throws Exception {
  IXMLObject obj = getBusinessObject(req);
visitor.visit(null, "theObject", obj);
}

In the above example the getBusinessObject(req) method call stands for some business logic that's used to create the business object (e.g., by using some of the business APIs).

Interconnect Server

The present invention provides a solution to the needs described above through a system and method for integrating the disparate applications, and managing the applications processes in a hardware resource and user effort efficient manner. The automated system of the present invention uses a business systems platform comprised of several unique servers to efficiently manage multiple applications which are themselves generally distributed across a network, and to control the execution of the required tasks with minimum use of redundant data input to the several applications, thereby minimizing the use of hardware resources and user input effort.

As indicated above, in a preferred embodiment, the Platform Interconnect Server allows a platform installation to interconnect with external systems. In the preferred embodiment, the Interconnect Server is a platform for information exchange based on XML and supports many types of information exchange across heterogeneous systems. Such heterogeneous systems could include Enterprise Resource Planning (ERP) systems, e-mail servers, and other Saba installations. The Interconnect Server allows interconnection between such external systems and the Interface Server, Business Server, and Information Server.

For example, this connection can be for purposes of importing data from ERP systems, exporting billing information to accounting systems, making catalog information available for automated search, or allowing automated purchasing of products. The Interconnect enables collaboration with the Platform network in a bi-directional fashion to allow a Platform-enabled site to share catalog information with the platform network, allow the platform network to place and track orders, and to share and update learner profiles. In addition, the process can be reversed: the platform-enabled site can enhance their internal offering of courses by including selected platform network courses in their internal catalog offering.

In the preferred embodiment, the Interconnect model consists of three parts: (1) the interconnect backbone and the individual interconnect components installed on the interconnect backbone (2) the development API's (both the high-level and the low level interfaces) and (3) the standard protocols used to communicate between heterogeneous systems.

Figure 9:
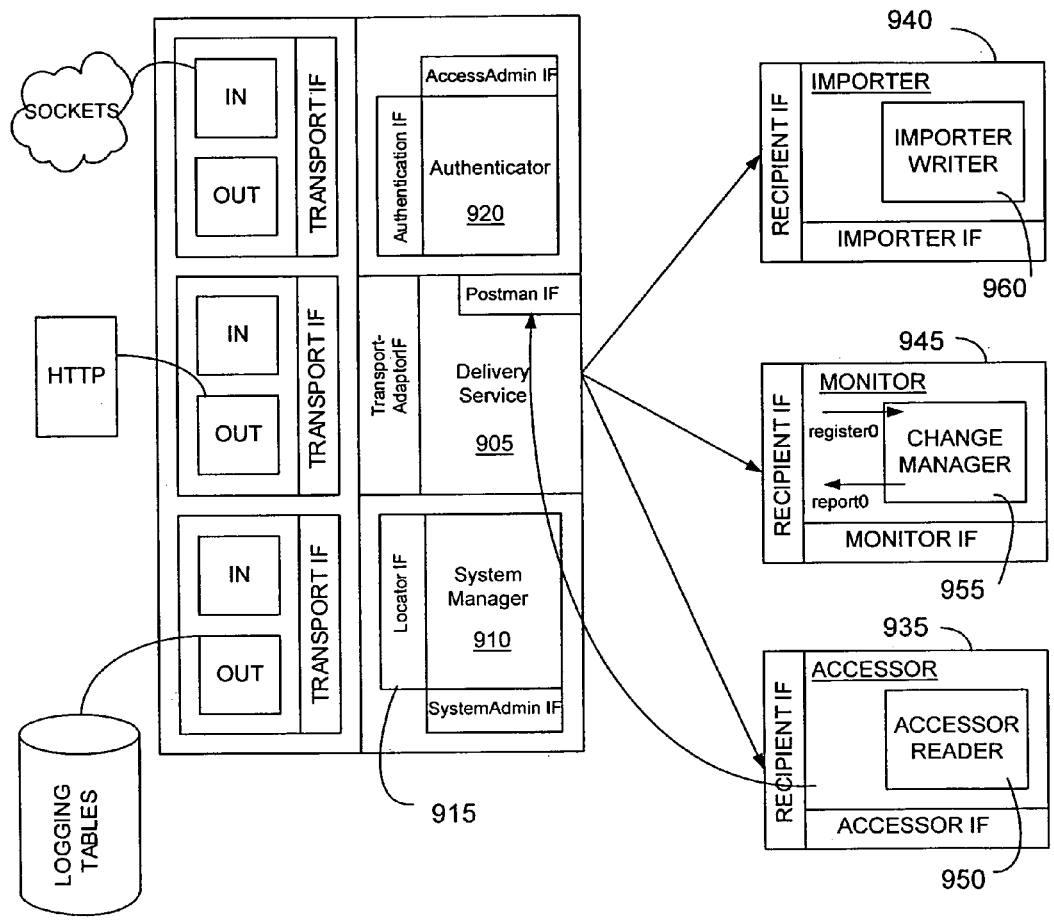
FIG. 9 illustrates a preferred embodiment of the Interconnect Backbone.

Referring to FIG. 9, the Interconnect Backbone of the preferred embodiment is shown. The Interconnect Backbone is the framework that supports all Interconnect components. The Interconnect Backbone provides the foundation services required by higher-level services. These foundation services are always present, and include services for reliable messaging, service registration, monitoring and management. The Interconnect Backbone comprises the following components that provide the core Interconnect services: DeliveryService 905, ServiceManager 910, Locator 915, and Authenticator 920. The core Interconnect services are always present.

The Interconnect Backbone provides a framework for registering and resolving services. Services are registered and resolved by name in an interconnect node. The ServiceManager 910 is a core service for the management of services for the Interconnect at a particular location. The ServiceManager 910 tracks installed components, versions and system status. The ServiceManager 910 provides system management capabilities and can be queried for system status: which other components are present and whether they are currently running. Components, which implement Interconnection Services 925, are installed on the Interconnect Backbone at a specific installation by being registered with the ServiceManager 910. The Locator 915 service is a service component that provides a way to register and resolve services by name. The Locator 915 services provides a flat registry of services at a particular interconnect location.

The DeliveryService 905 is a service component that insures the reliable delivery of messages. The DeliveryService 905 understands the sender, the recipient and quality of service, but not the content. DeliveryService 905 works over a variety of transport protocols by using different DeliveryTransports. DeliveryTransports are abstract service components that are used by the DeliveryService 905 to reliably deliver messages over a particular set of network protocols. Such protocols include sockets, database logging tables, and HTTP. The messaging model provided by the DeliveryService 905 provides a mechanism for the delivery of persistent asynchronous messages using a mailbox metaphor. Interconnect Services 925 using the DeliveryService 905 register themselves and are assigned an Inbox by the DeliveryService 905. Subsequently, the registered service may check for messages at that Inbox. The DeliveryService 905 component is described in further detail below.

The Authenticator service insures that messages coming into the system have the appropriate credentials. Capabilities can be associated with a particular service and users can be assigned CapabilitySets. When a service is resolved, the Locator 915 calls the Authenticator 920 to validate that the requesting user has the appropriate capabilities to use the service they are requesting. A Capability is created for each named service in an interconnect location, for example "SAP/Financials/Accessor". Capabilities have names and in this case the name of the capability will be the same name as the service. Once created, Capabilities can then be given to users who want to access the service. When a message is constructed, the user adds their capabilities to the message. When the message is received by the target location the local DeliveryService 905 validates the capabilities with the Authenticator 920. The Authenticator service is the generator of capabilities and capability keys. If a passed in capability doesn't have the appropriate key the capability is not set and the authentication is rejected. The service is also used by other core Interconnect Services for authenticating particular application level requests. Since a capability is a name-key mapping, an interconnect service can create capabilities for any purpose desired.

Other interconnect services are implemented like the core Interconnect Services described above. These Interconnect Services register and resolve by name and respond to and send Interconnect messages. Services are configured and managed using java classes and scripts. When interconnect components are installed on the Interconnect Backbone, a site is said to be "connector enabled". These components allow connections to external systems such as ERP systems to import, export, and synchronize data.

Key to the Interconnect design is the separation of interface from implementation. Many of the service components are broken into a generic platform independent portion and a platform specific portion that minimizes the impact of changes to the implementation in the future. Most connector components consist of a public service component (which is generic) and a service sub-component (which is system specific). The implementation of a connector in this framework consists of providing concrete implementations for the service sub-components and creating XSL stylesheets that describe mappings between a Local Format (LF) and Interchange Format (IF). Local formats are system-specific representations of the data supported by a service, while Interchange Formats are universal representations used for exchange between systems.

Referring to FIG. 9, these Connectors services may include Monitor 945, Accessor 935, Importer 940, and Updater (not shown). Accessors, Importers, and Updaters are essentially thin wrappers around XSL stylesheet operations. They translate documents between native formats and the Interchange format using a predefined stylesheet. These connector services may also contain additional logic for cases where a single Interchange format document represents multiple native documents, and vice versa. A more detailed description of the service components for these Connector services and their implementation on the Interconnect Backbone follows.

The Accessor 935 is a public service component that is used to extract objects from the source representation and convert them to a Interchange Format (IF). An Accessor 935 is configured to use a particular AccessorReader 950 to extract the objects from the source system and collaborate with Translators to perform the conversion to IF. The AccessorReader 950 is an abstract service sub-component that is used by an Accessor 935 to extract an object, or set of objects from a source system and convert them into an Interchange Format. Concrete implementations of the AccessorReader 950 are system specific and use the native API of the source system.

The Importer 940 is a public service component that is used to import objects from Interchange Format to the target representation. An Importer 940 will collaborate with Translators to perform the conversion from IF and be configured to use a particular ImporterWriter 960 to inject the objects into the target system. The ImporterWriter 960 is an abstract service sub-component that is used by an Importer 940 to convert an object, or set of objects into a Local Format (LF) and write them to a source system. Concrete implementations of the ImporterWriter 960 are system specific and use the native API of the target system.

The Monitor 945 is a public service component that monitors changes to local objects and reports changes to interested parties in Interchange Format. Clients can register to receive notification of the change only, or have the changed object sent with the notification. A Monitor 945 is configured to use a particular ChangeManager 955 to map changes in the source system to a standard event format that the monitor can use. The ChangeManager 955 is an abstract service sub-component that is used by a Monitor 945 to map local events into the standard event format. Concrete implementations of the ChangeManager 955 are system specific and use the native API of the source system to capture events.

When the Monitor 945 receives an event from the ChangeManager 955, it checks to see if the object needs to be sent with the notification. If so, the Monitor 945 will collaborate with the Accessor 935 and Mapper to provide the conversion from source object to Interchange Format. The Monitor 945 uses the Mapper to find the platform ID associated with the local identifier in the event. This platform ID is then used to request the object from the Accessor 935. The Mapper is a utility that provides object and class level mapping services between representations, each connector framework contains a single instance of the Mapper. The Mapper data is persistent this enables the cross reference data to survive restarts. The Mapper maintains maps for (1) Platform ID to Document Type, (2) Local ID to Platform ID, and (3) Platform (Interconnect) user to Local (mapped system) user. The Mapper (discussed in detail in a later section) converts a local object Id (a combination of Id and Class type) into a Platform Object Id (POID), POID is an Id that is unique across applications. POID is a serializable class that has URL representation "http://"+host +"/interconnect/"+platform +"/"+seqNo where host -> is the hostname of the machine on which the connector is running platform -> a parameter defined at the Saba site level. This parameter will make the POID unique if multiple Saba sites are running on the same machine.

SeqNo -> is a sequence number that that is unique for a host.

Example of a POID is http://jade/interconnect/Saba/1 this could be a representation of local id emplo000000000001000 with class type com.saba.busobj.SabaEmployee. This representation can be converted to instance of POID by using static method in the POID class.

POID class definition is

```
public class POID implements IXMLRenderable
{
    private GenericObjectID mLocalID;
    private URL mURL;
    private long mId;
    public POID (GenericObjectID localID) {
        mId = getNextId( );
        try
        {
            mLocalID = localID;
            mURL = new URL(getURLPrefix( ) + localID.toString( ) + "/" + mId);
        }
        catch (MalformedURLException x)
        {
        }
    }
    public void setLocalID(GenericObjectID localID) {
        try {
            mLocalID = localID;
            mURL = new URL(getURLPrefix( ) + localID.toString( ) + "/" + mId)
        }
        catch (MalformedURLException x) {
        }
        if (mId == −1)
        {
            mId = getNextId( );
        }
    }
    public String toString( )
    {
        return mURL.toString( );
    }
    public URL getURL( )
    {
        return mURL;
    }
    public GenericObjectID getLocalID ( )
    {
        return mLocalID;
    }
    public static POID getPOID (String url)
    {
        String temp=new String(url);
        int pos=temp.lastIndexOf("/");
        String temp1=temp.substring(pos+1);
        Long temp2=Long.valueOf(temp1);
        long hash=temp2.longValue( );
        POID poid=new POID( );
        poid.mId=hash;
```

-continued

```
try {
    poid.mURL=new URL(url);
}
catch (MalformedURLException x)
{
}
return poid;
}
```

Mapper stores the cross reference between the local Id and the POID representation of the local Id. The Mapper also stores cross reference between foreign POID and local Id in the case where the Object originated from a foreign system.

A Transformer is a utility that provides translation services between representations using mapping data and XSL style sheets. A Transformer wraps a particular XML parser and XSL translator. The Accessor calls an implementation of the transformer and passes the Local Format and the stylesheet, the transformer translates the Local Format into Interchange Format.

Implementing a connector involves building four platform specific components and defining a set of document, object and user mappings. The platform specific components are described in detail below and include the (1) ChangeManager 955 (maps system events to Monitor 945 events), (2) AccessorReader 950 (extracts objects from the system in XML format), (3) ImporterWriter 960 (injects objects into the system from XML format), and (4) LocalObjectID (Encapsulates the system object identifier, this is not required if the system can use the GenericObjectID available). Additionally, the types of documents to be exchanged need to be defined. Once these are determined and their format defined, XSL style sheets need to be written which convert Interchange Format to the system specific XML format and vice versa.

At system deployment time, a number of mappings need to be defined. These include (1) Document type to style sheet, (2) local User to system user, and (3) the Translator the connector will use.

The ChangeManager 955 sub-component monitors the native system for all events such as Insert/Update/Delete on objects. It can interact with the event notification mechanism of the native system to capture all the events and then pass these events to the monitor for further handling. The ChangeManager 955 accepts events from the native system, converts these events into MonitorEvent Objects, and forwards these to the Monitor 945 using the method IChangeManagerAdaptor.notify( ) method. Once the Change Manager passes an event on to the Monitor 945, it is then the responsibility of the Monitor 945 to reliably deliver the request on to any subscribers who have registered interest. The Monitor 945 will filter out any events that are not subscribed to. Specifically, the Change Manager is responsible for (1) keeping track of all the events that take place in the native system, (2) creating MonitorEvent Objects for all events supported by the native change management, (3) Calling the notify method of the Monitor with a given event.

ChangeManager 955 requires a reference to its owning Monitor 945 class to invoke its notify( ) event. It also needs a LocalUser object to obtain credential information. These references are provided during construction.

```
public abstract class ChangeManager throws
connectorException
{
        public ChangeManager (Monitor theMonitor, UserObject
        user)
        public void shutdown( )
}
```

As mentioned above, the ChangeManager 955 converts each system event into a MonitorEvent object, which it passes on to the monitor by calling its notify method. The Monitor Event class is as follows:

```
public class MonitorEvent {
        public Object objectID;
        public String eventType;
    public String docType;
    public Boolean applyStyleSheet;
        }
```

The Monitor is responsible for implementing the interface IChangeManagerAdaptor which currently defines a single method.

```
public interface IChangeManagerAdapter {
        public void notify(MonitorEvent event);
}
```

The ChangeManager.shutdown( ) method is invoked by the Monitor 945 and is used to gracefully disconnect the ChangeManager 955. When shutdown( ) is called, the ChangeManager 955 is responsible for closing any open connections, unregistering itself from the native event system and taking any other action required to perform a clean shutdown. The ChangeManager 955 can shut down itself if required by using this method.

The AccessorReader 950 is a platform specific sub-component of the Accessor 935. It is responsible for extracting an object from the native system in a convenient XML representation. The representation produced must be complete enough to allow it to be transformed into the appropriate document in Interchange Format. An instance of an AccessorReader 950 will service the requests of a particular user. When an AccessorReader 950 is created a UserObject that identifies the system user is passed to it in its constructor. The AccessorReader 950 is responsible for making managing a connection to the native system on behalf of this user. The Accessor 935 is responsible for making sure that incoming requests are assigned to the appropriate AccessorReader 950 for the requesting user. The AccessorReader calls the Mapper to get the Platform Id ( POID ) for the local Id representation, the local Id representation is replaced with the POID.

An implementation of an AccessorReader 950 will be derived from the abstract class of the same name:

```
public abstract class AccessorReader implements
IAccessorReader
{
        public AccessorReader(UserObject user);
```

-continued

```
}
public interface IAccessorReader {
    public Reader extractObjectReader(Object localID)
        throws IOException, ConnectorException;
    public URL extractObjectURL(Object localID)
        throws MalformedURLException,
    ConnectorException;
    public void shutdown( );
}
```

Specifically, the AccessorReader 950 is responsible for (1) Establishing a connection into the system based on the User Id and Credentials (2) Extracting the required object based on the information passed in Local Object (3) Transforming that Object into a serialized representation, which is an XML document (4) If the object type of the local object maps to more than one object in native system, then extracting all the corresponding objects in the current context, (5) As the objects to be transported to and from the native system are known, information about which objects have to be extracted for a given object can be maintained specifically for the current implementation, (6) Serializing this localObject/s into a single Local XML representation (7) Returning this XML document back to the Accessor 935, (8) Providing a clean shutdown by closing the connection. The shutdown method is invoked by the Accessor 935 when it needs to shutdown the AccessorReader 950.

The ImporterWriter 960 is a platform specific sub-component of the Importer 940. It is responsible importing an object into the native system from a convenient XML representation. The representation must be able to be produced from a document in Interchange Format using XSL style sheet transformations. Like the AccessorReader 950, an instance of an ImporterWriter 960 will service the requests of a particular user. Once an Object has been imported the newly created local Id and the Foreign POID sent along with the Interchange format are inserted into the Mapper for subsequent use. Mapper is discussed in detail in a later section.

An implementation of an ImporterWriter 960 will be derived from the abstract class of the same name:

```
public abstract class ImporterWriter implements
IImporterWriter {
    Object mUser;
    public ImporterWriter (UserObject user)
    {
        mUser = user;
    }
}
public interface IImporterWriter {
    /**
    Insert the objects from the input stream and return
        an array of native (local) identifiers for the new
        objects. The input stream is in a localized XML
format.
    */
    public Object insertObjectFromStream(Writer in)
        throws ConnectorException;
    /**
    Insert the objects from the URL and return an array
        of native (local) identifiers for the new objects.
        The input URL is in a localized XML format.
    */
    public Object insertObjectFromURL(URL url)
        throws MalformedURLException, ConnectorException;
    public void shutdown( );
}
```

The ImporterWriter 960 is responsible for (1) Establishing a connection into the system based on the User Id and Credentials (2) Mapping the single XML document received to one or more objects required to be inserted into the native system (3) Converting the Native XML representation of the object into native system specific format (4) Based on the event to be performed, insert, update or delete the database (5) In case of a new object being inserted, returning the local identifier for the object inserted (6) Providing a clean shutdown by closing the connection. The Importer 940 invokes the shutdown method when it needs to shutdown the ImporterWriter 960.

The UserObject encapsulates system specific User information for an application level login (user id and password). The platform specific parts of the connector services will use this information to log into the target system. For example a ChangeManager 955 may need to login to the database to trap the events. The UserObject object encapsulates a string-based userID and the notion of Credentials. Each Platform implementation provides its own LocalUser object. Implementations provide a subclass of the credentials Object customized for the security requirements of their system; in the simplest case the credentials are a String password.

```
public class UserObject implements Serializable
{
    String mUsername;
    Object mCredentials;
    public UserObject (String username, Object credentials)
    {
        mUsername = username;
        mCredentials = credentials;
    }
    public String getUsername( )
    {
        return mUsername;
    }
    public Object getCredentials( )
    {
        return mCredentials;
    }
}
```

The Local object contains information about the object that the connector uses uniquely identify an object in the native system. It holds the following information about the object (1) ID: An opaque object identifier, and (2) aClass: the type or class of the object.

The LocalObjectID class is defined as:

```
public class LocalObjectID
{
    Object mID;
    Object mClass;
    public LocalObjectID(Object ID, Object aClass)
    {
        mID = ID;
        mClass = aClass;
    }
    public Object getID( )
    {
        return mID;
    }
    public Object getObjectClass( )
    {
        return mClass;
    }
}
```

Figure 10:
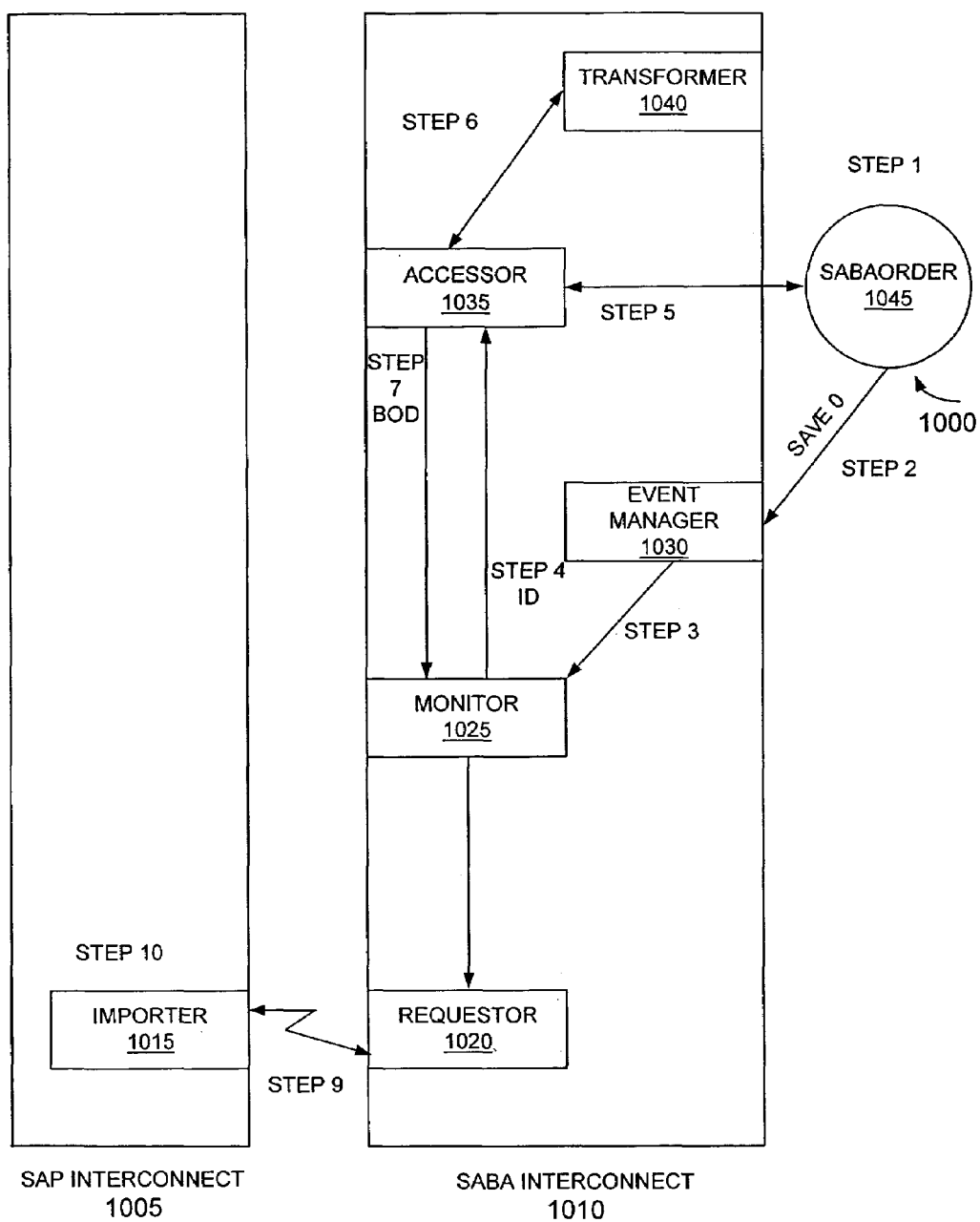
FIG. 10 shows a process flow diagram illustrating a purchase order delivered from a Source site to a target system through Interconnect.

Referring to FIG. 10, an example of the operation of the above Interconnect services in which a purchase order is delivered from a Source site 1000 to a target SAP system 1005 utilizing the Interconnect Server 1010 is set forth. An Importer component 1015 resides on the target SAP system and the Requestor 1020, Monitor 1025, Event Manager 1030, Accessor 1035, and Transformer 1040 components reside on the Interconnect Server 1010. At step 1, At the Source site 1000, a Purchase order 1045 is generated and a "SabaInvoice" object is created. At step 2, the Purchase Order 1045 is saved. Because it needs to be synchronized with a remote system, this triggers a pre-registered ChangeManager event at the EventManager 1030. At step 3, the ChangeManager passes the unique id of the SabaInvoice to the Monitor 1025. At step 4, the Monitor 1025 instructs the Accessor 1035 to retrieve the SabaOrder in Interchange Format. At step 5, the Accessor 1035 retrieves the SabaInvoice in serialized, canonical XML format. This is an internal XML format that varies for each business object. Its essential feature is that it contains all relevant information about the PO in attribute/value format. Step 5 uses a standard method available for all SabaObjects.

The following example Local Format document is a sample SabaInvoice serialized into XML:

```
<?xml version="1.0" standalone="yes"?>
<SabaObjectSerialization xmlns:dt="urn:w3-org:xmldatatypes">
    <SabaObject type="com.saba.busobj.SabaInvoice" id="invce000000000001000" status="new">
        <amt_paid dt:type="number">0.0</amt_paid>
        <other_charges dt:type="number">0.0</other_charges>
        <acct_id idref="http://spanuganti/interconnect/Saba/com.saba.interconnect.ObjectID@94902deb/206"/>
        <updated_by dt:type="string">uone</updated_by>
        <balance dt:type="number">425.0</balance>
        <updated_on dt:type="dateTime">2000-11-10 19:17:40.000</updated_on>
        <created_by dt:type="string">uone</created_by>
        <created_id idref="http://spanuganti/interconnect/Saba/com.saba.interconnect.ObjectID@170064/6"/>
        <inv_date dt:type="dateTime">2000-11-10 19:17:40.000</inv_date>
        <created_on dt:type="dateTime">2000-11-10 19:17:40.000</created_on>
        <split dt:type="string">domin000000000000001</split>
        <status dt:type="number">100</status>
        <time_stamp dt:type="string">200011101917399262</time_stamp>
        <flags dt:type="string">0000000000</flags>
        <invoice_no dt:type="string">001000</invoice_no>
        <currency_id idref="http://spanuganti/interconnect/Saba/com.saba.interconnect.ObjectID@14966/34"/>
        <total_charges dt:type="number">425.0</total_charges>
    </SabaObject>
    <SabaObject type="com.saba.busobj.SabaInvoiceItem" id="invit000000000001000" status="new">
        <order_item_id idref="ordit000000000001060"/>
        <invoice_id idref="http://bnemazie/interconnect/Saba/com.saba.interconnect.ObjectID@c82f961c/101"/>
        <time_stamp dt:type="string">200011101917406145</time_stamp>
    </SabaObject>
    <SabaObject type="com.saba.busobj.SabaOrder" id="extor000000000001040" status="new">
        <city dt:type="string">Sunnyvale</city>
        <addr1 dt:type="string">Addr 11</addr1>
        <country dt:type="string">US</country>
        <shipped_amt dt:type="number">0.0</shipped_amt>
        <state dt:type="string">CA</state>
        <discount dt:type="number">0.0</discount>
        <updated_by dt:type="string">UONE</updated_by>
        <order_no dt:type="string">001040</order_no>
        <updated_on dt:type="dateTime">2000-11-10 19:13:19.000</updated_on>
        <created_by dt:type="string">uone</created_by>
        <created_id idref="http://spanuganti/interconnect/Saba/com.saba.interconnect.ObjectID@170064/6"/>
        <shipped_attn dt:type="string">test1 test1</shipped_attn>
        <contact_id idref="http://bnemazie/interconnect/Saba/com.saba.interconnect.ObjectID@c9162811/1"/>
        <created_on dt:type="dateTime">2000-11-10 19:13:19.000</created_on>
        <sold_by_id idref="http://spanuganti/interconnect/Saba/com.saba.interconnect.ObjectID@170064/6"/>
        <split dt:type="string">domin000000000000001</split>
        <status dt:type="number">400</status>
        <time_stamp dt:type="string">200011101917406145</time_stamp>
        <company_id idref="http://spanuganti/interconnect/Saba/com.saba.interconnect.ObjectID@94902deb/206"/>
        <territory_id idref="terri000000000000001"/>
        <conf_type dt:type="number">0</conf_type>
        <zip dt:type="string">94086</zip>
        <account_id idref="http://spanuganti/interconnect/Saba/com.saba.interconnect.ObjectID@94902deb/206"/>
        <currency_id
```

```
idref="http://spanuganti/interconnect/Saba/com.saba.interconnect.ObjectID@14966/34"/>
        <status_flag dt:type="string">2000200000</status_flag>
        <total_charges dt:type="number">425.0</total_charges>
        <children>
          <SabaObject type="com.saba.busobj.SabaOrderItem" id="ordit000000000001061"
status="new">
            <order_id idref="extor000000000001040"/>
            <unit_cost dt:type="number">425.0</unit_cost>
            <description dt:type="string">Inventory1</description>
            <actual_qty dt:type="number">1</actual_qty>
            <part_id idref="prdct000000000001022"/>
            <pkg_item_id idref="ordit000000000001061"/>
            <created_on dt:type="dateTime">2000-11-10 19:13:28.000</created_on>
            <req_qty dt:type="number">1</req_qty>
            <delivered_on dt:type="dateTime">2000-11-10 19:17:13.000</delivered_on>
            <status dt:type="number">300</status>
            <time_stamp dt:type="string">200011101917406145</time_stamp>
            <Custom0 dt:type="string">Billed</Custom0>
            <flags dt:type="string">0000000000</flags>
            <total_cost dt:type="number">425.0</total_cost>
            <item_typ dt:type="number">1</item_typ>
            <billing_state dt:type="number">101</billing_state>
          </SabaObject>
          <SabaObject type="com.saba.busobj.SabaOrderItem" id="ordit000000000001060"
status="new">
            <order_id idref="extor000000000001040"/>
            <unit_cost dt:type="number">0.0</unit_cost>
            <description dt:type="string">Default Default</description>
            <actual_qty dt:type="number">1</actual_qty>
            <part_id idref="shpmd000000000000001"/>
            <pkg_item_id idref="ordit000000000001060"/>
            <created_on dt:type="dateTime">2000-11-10 19:13:27.000</created_on>
            <req_qty dt:type="number">1</req_qty>
            <delivered_on dt:type="dateTime">2000-11-10 19:17:13.000</delivered_on>
            <status dt:type="number">300</status>
            <time_stamp dt:type="string">200011101917406145</time_stamp>
            <Custom0 dt:type="string">Billed</Custom0>
            <flags dt:type="string">0000000000</flags>
            <total_cost dt:type="number">0.0</total_cost>
            <item_typ dt:type="number">6</item_typ>
            <billing_state dt:type="number">101</billing_state>
          </SabaObject>
        </children>
      </SabaObject>
      <SabaObject type="com.saba.busobj.SabaInvoiceItem" id="invit000000000001001"
status="new">
        <order_item_id idref="ordit000000000001061"/>
        <invoice_id
idref="http://bnemazie/interconnect/Saba/com.saba.interconnect.ObjectID@c82f961c/101"/>
        <time_stamp dt:type="string">200011101917406145</time_stamp>
      </SabaObject>
</SabaObjectSerialization>
```

At step 6, the Accessor 1035 then transforms the XML document into an Interchange document format. The Accessor 1035 accomplishes this by passing the source document and an XSL stylesheet to the Transformer 1040.

The following is a sample purchase order XSL stylesheet:

```
<!--COPYRIGHT NOTICE Copyright (c) 1997-2000 Saba Software Inc., 2400 Bridge
Parkway, Redwood Shores, California 94065-1166 USA. All rights reserved.-->
<xsl:stylesheet xmlns:xsl="http://www.w3.org/1999/XSL/Transform">
    <xsl:output omit-xml-declaration="no" indent="yes" method="xml"/>
    <xsl:template match="SabaObjectSerialization">
        <SYNC_INVOICE_001>
            <CNTROLAREA>
                <BSR>
                    <VERB>SYNC</VERB>
                    <NOUN>INVOICE</NOUN>
                    <REVISION>001</REVISION>
                </BSR>
                <SENDER>
```

-continued

```xml
        <LOGICALID/>
        <COMPONENT/>
        <TASK/>
        <REFERENCEID/>
        <CONFIRMATION/>
        <LANGUAGE/>
        <CODEPAGE/>
        <AUTHID>
            <xsl:value-of select="created_by"/>
        </AUTHID>
    </SENDER>
    <DATETIME qualifier="CREATION">
        <YEAR>
            <xsl:value-of select="substring(//created_on,7,4)"/>
        </YEAR>
        <MONTH>
            <xsl:value-of select="substring(//created_on,1,2)"/>
        </MONTH>
        <DAY>
            <xsl:value-of select="substring(//created_on,4,2)"/>
        </DAY>
        <HOUR/>
        <MINUTE/>
        <SECOND/>
        <SUBSECOND/>
        <TIMEZONE/>
    </DATETIME>
</CNTROLAREA>
<DATAAREA>
    <xsl:for-each select="//SabaObject[@type='com.saba.busobj.SabaInvoice']">
        <INVOICE>
        <INVDATE>
            <xsl:value-of select="//inv_date"/>
        </INVDATE>
        <CURRENCYID>
            <xsl:value-of select="//currency_id/@idref"/>
        </CURRENCYID>
        <INVNO>
            <xsl:value-of select="//invoice_no"/>
        </INVNO>
        <INVOICEID>
            <xsl:value-of select="@id"/>
        </INVOICEID>
        <TOTALCHARGES>
            <xsl:value-of select="//total_charges"/>
        </TOTALCHARGES>
        <ACCTID>
            <xsl:value-of select="acct_id/@idref"/>
        </ACCTID>
        <CREATEDID>
            <xsl:value-of select="created_id/@idref"/>
        </CREATEDID>
        <UPDATEDON>
            <xsl:value-of select="updated_on"/>
        </UPDATEDON>
        <ORDERID>
            <xsl:value-of select="order_id/@idref"/>
        </ORDERID>
        <BALANCE>
            <xsl:value-of select="balance"/>
        </BALANCE>
        <AMTPAID>
            <xsl:value-of select="amt_paid"/>
        </AMTPAID>
        <OTHERCHARGES>
            <xsl:value-of select="other_charges"/>
        </OTHERCHARGES>
        <STATUS>
            <xsl:value-of select="status"/>
        </STATUS>
        <FLAGS>
            <xsl:value-of select="flags"/>
        </FLAGS>
        <SPLIT>
            <xsl:value-of select="split"/>
        </SPLIT>
        <POID>
            <xsl:value-of select="po_id/@idref"/>
        </POID>
```

-continued

```
            <REMINVDATE/>
            <REMINVID/>
         </INVOICE>
      </xsl:for-each>
      <xsl:for-each select="//SabaObject[@type='com.saba.busobj.SabaInvoiceItem']">
         <xsl:variable name="ORDERITEMID">
            <xsl:value-of select="order_item_id/@idref"/>
         </xsl:variable>
         <xsl:for-each select="//SabaObject[@type='com.saba.busobj.SabaOrderItem']">
            <xsl:if test="$ORDERITEMID=@id">
               <ITEM>
                  <ACCTID>
                     <xsl:value-of select="//account_id/@idref"/>
                  </ACCTID>
                  <TOTALCOST>
                     <xsl:value-of select="total_cost"/>
                  </TOTALCOST>
                  <DESCRIPTN>
                     <xsl:value-of select="description"/>
                  </DESCRIPTN>
                  <UNITCOST>
                     <xsl:value-of select="unit_cost"/>
                  </UNITCOST>
                  <ACTUALQTY>
                     <xsl:value-of select="actual_qty"/>
                  </ACTUALQTY>
                  <LINEID>
                  <xsl:value-of select="@id"/>
               </LINEID>
               <ATTRIBUTE1>
                     <xsl:value-of select="@id"/>
               </ATTRIBUTE1>
                  <xsl:variable name="STUDENTID">
                     <xsl:value-of select="student_id/@idref"/>
                  </xsl:variable>
                  <xsl:for-each select="//SabaObject[@id=$STUDENTID]">
                  <xsl:variable name="STUDENTNAME">
                     <xsl:value-of select="lname"/>,<xsl:value-of
select="fname"/>,Phone:<xsl:value-of select="workphone"/>
                  </xsl:variable>
                  <ATTRIBUTE2>
                  <xsl:value-of select="$STUDENTNAME"/>
                  </ATTRIBUTE2>
                  </xsl:for-each>
               </ITEM>
            </xsl:if>
         </xsl:for-each>
      </xsl:for-each>
      <xsl:for-each select="//SabaObject[@type='com.saba.busobj.SabaInvoice']">
         <USERAREA>
            <OBJSTATUS>
               <xsl:value-of select="@status"/>
            </OBJSTATUS>
            <OBJTYPE>
               <xsl:value-of select="@type"/>
            </OBJTYPE>
      <AMOUNT_INCLUDES_TAX_FLAG>N</AMOUNT_INCLUDES_TAX_FLAG>
         </USERAREA>
      </xsl:for-each>
      </DATAAREA>
   </SYNC_INVOICE_001>
   </xsl:template>
</xsl:stylesheet>
```

The following is the equivalent Interchange Format document generated by the stylesheet transformation, an Invoice in OAG BOD format.

```
<SYNC_INVOICE_001>
<CNTROLAREA>
<BSR>
<VERB>SYNC</VERB>
<NOUN>INVOICE</NOUN>
```

-continued

```
<REVISION>001</REVISION>
</BSR>
<SENDER>
<LOGICALID/>
<COMPONENT/>
<TASK/>
<REFERENCEID/>
<CONFIRMATION/>
<LANGUAGE/>
```

-continued

```
<CODEPAGE/>
<AUTHID/>
</SENDER>
<DATETIME qualifier="CREATION">
<YEAR>1-10</YEAR>
<MONTH>20</MONTH>
<DAY>0-</DAY>
<HOUR/>
<MINUTE/>
<SECOND/>
<SUBSECOND/>
<TIMEZONE/>
</DATETIME>
</CNTROLAREA>
<DATAAREA>
<INVOICE>
<INVDATE>2000-11-10 19:17:40.000</INVDATE>
<CURRENCYID>http://spanuganti/interconnect/Saba/com.saba.interconnect.ObjectID@14966/34</CURRENCYID>
<INVNO>001000</INVNO>
<INVOICEID>invce000000000001000</INVOICEID>
<TOTALCHARGES>425.0</TOTALCHARGES>
<ACCTID>http://spanuganti/interconnect/Saba/com.saba.interconnect.ObjectID@94902deb/206</ACCTID>
<CREATEDID>http://spanuganti/interconnect/Saba/com.saba.interconnect.ObjectID@170064/6</CREATEDID>
<UPDATEDON>2000-11-10 19:17:40.000</UPDATEDON>
<ORDERID/>
<BALANCE>425.0</BALANCE>
<AMTPAID>0.0</AMTPAID>
<OTHERCHARGES>0.0</OTHERCHARGES>
<STATUS>100</STATUS>
<FLAGS>0000000000</FLAGS>
<SPLIT>domin000000000000001</SPLIT>
<POID/>
<REMINVDATE/>
<REMINVID/>
</INVOICE>
<ITEM>
<ACCTID>http://spanuganti/interconnect/Saba/com.saba.interconnect.ObjectID@94902deb/206</ACCTID>
<TOTALCOST>0.0</TOTALCOST>
<DESCRIPTN>Default    Default</DESCRIPTN>
<UNITCOST>0.0</UNITCOST>
<ACTUALQTY>1</ACTUALQTY>
<LINEID>ordit000000000001060</LINEID>
<ATTRIBUTE1>ordit000000000001060</ATTRIBUTE1>
</ITEM>
<ITEM>
<ACCTID>http://spanuganti/interconnect/Saba/com.saba.interconnect.ObjectID@94902deb/206</ACCTID>
<TOTALCOST>425.0</TOTALCOST>
<DESCRIPTN>Inventory1/</DESCRIPTN>
<UNITCOST>425.0</UNITCOST>
<ACTUALQTY>1</ACTUALQTY>
<LINEID>ordit000000000001061</LINEID>
<ATTRIBUTE1>ordit000000000001061</ATTRIBUTE1>
</ITEM>
<USERAREA>
<OBJSTATUS>new</OBJSTATUS>
<OBJTYPE>com.saba.busobj.SabaInvoice</OBJTYPE>
<AMOUNT_INCLUDES_TAX_FLAG>N</AMOUNT_INCLUDES_TAX_FLAG>
</USERAREA>
</DATAAREA>
</SYNC_INVOICE_001>
```

At step 7, the Monitor 1025 receives the Interchange Format document back from the Accessor 1035. At step 8, the Monitor 1025 instructs the Requestor 1020 to deliver the Invoice to the SAP system. At step 9, the Process Invoice document is actually delivered over the network to the SAP system. The Requestor 1020 reliably ensuring that the Invoice is actually delivered and received. At step 10, the Process Invoice document is inserted into the SAP system as a new Invoice. Step 10 is performed by the SAP Importer. There are several possibilities for the implementation of the SAP Importer, depending on the level of functionality provided by SAP: (1) SAP supports the Interchange Document format directly, in which case this step is trivial, or (2) SAP supports a proprietary XML format, in which case a stylesheet can be used to transform the Invoice into SAP's proprietary format, or (3) SAP supports a proprietary API, which is used to read and process the XML document, either in its original format or after a stylesheet transformation into a more convenient format.

As another example, an employee record maintained in an external system is reflected in a SABA site. An administrator registers a callback event with an Interconnect enabled human resources (HR) system. A change in the HR system generates an event that is captured by the external system Monitor. The Monitor requests the HR data from the Accessor. The external system Accessor generates the updated HR record as an Interchange Document. The following is another example Interchange Format document, a Sync Personnel BOD:

```
<SYNC_EMPLOYEE_001>
<CNTROLAREA>
<BSR>
<VERB>SYNC</VERB>
<NOUN>EMPLOYEE</NOUN>
<REVISION>001</REVISION>
</BSR>
<SENDER>
<LOGICALID/>
<COMPONENT/>
<TASK/>
<REFERENCEID/>
<CONFIRMATION/>
<LANGUAGE/>
<CODEPAGE/>
<AUTHID/>
</SENDER>
<DATETIME qualifier="CREATION">
<YEAR/>
<MONTH/>
<DAY/>
<HOUR/>
<MINUTE/>
<SECOND/>
<SUBSECOND/>
<TIMEZONE/>
</DATETIME>
</CNTROLAREA>
<DATAAREA>
<SYNC_EMPLOYEE>
<EMPLOYEE>
<NAME index="1">MR.</NAME>
<NAME index="2">testfirst</NAME>
<NAME index="3">testlast</NAME>
<EMPLOYEEID>http://bnemazie/interconnect/Saba/com.saba.interconnect.ObjectID@170179/6805</EMPLOYEEID>
<EMPLOYEETYPE>Permanent</EMPLOYEETYPE>
<SYNCIND/>
<DUNSNUMBER/>
<ADDRESS>
<ADDRLINE index="1"/>
<ADDRLINE index="2"/>
<CITY/>
<COUNTRY/>
<POSTALCODE/>
<STATEPROVN/>
<TELEPHONE1/>
<TELEPHONE2/>
<FAX1/>
<PARENTID/>
<EMAIL/>
</ADDRESS>
<NAME2/>
<CURRENCY/>
<DESCRIPTN/>
```

```
        </EMPLOYEE>
        <USERAREA>
        <MNAME/>
        <TERRITORYID/>
        <COMPANYID/>
        <STARTEDON>2000-07-24 00:00:00.0</STARTEDON>
        <TERMINATEDON/>
        <LOCATIONID>http://bnemazie/interconnect/Saba/com.saba.inter
connect.ObjectID@cd92/6801</LOCATIONID>
        <RATE/>
        <SSNO>111-11-2222</SSNO>
        <GENDER>0</GENDER>
        <SHORTDESCRIPTN/>
        <JOBTYPEID/>
        <MANAGERID/>
        <QUOTA/>
        <UPDATEDON>provide</UPDATEDON>
        <UPDATEDBY>provide</UPDATEDBY>
        <MAXDISCOUNT/>
        <HOMEDOMAIN/>
        <USERNAME>1093-202</USERNAME>
        <FLAGS>0</FLAGS>
        <PASSWORD/>
        <STATUS>Full Time</STATUS>
        <LOCALEID/>
        <EMPLOYEENO>185</EMPLOYEENO>
        <SPLIT/>
        <CREATEDON>provide</CREATEDON>
        <OBJTYPE/>
        <OBJSTATUS>new</OBJSTATUS>
        <DESIREDJOBTYPEID/>
        </USERAREA>
        </SYNC_EMPLOYEE>
        </DATAAREA>
        </SYNC_EMPLOYEE_001>
```

The Monitor then receives the BOD from the Accessor and instructs the external system Requestor to deliver the personnel change to the SABA system. The Requestor then delivers the Sync Personnel document over the network to the SABA system. The SABA Updater receives the Sync Personnel document. It uses an XSL stylesheet to transform the document into the canonical format used internally. The following is an example XSL personnel stylesheet:

```
    <xsl:stylesheet
xmlns:xsl="http://www.w3.org/1999/XSL/Transform">
    <!—COPYRIGHT NOTICE Copyright (c) 1997-2000 Saba
Software Inc., 2400 Bridge
    Parkway, Redwood Shores, California 94065-1166 USA. All
rights reserved.—>
        <xsl:output indent="yes" method="xml" omit-xml-
declaration="no"/>
        <xsl:template match="*|/">
            <xsl:apply-templates/>
        </xsl:template>
        <xsl:template match="text ( ) |@*">
            <xsl:value-of select="."/>
        </xsl:template>
        <xsl:template match="SYNC_EMPLOYEE_001">
            <xsl:for-each select="/">
                <SabaObjectSerialization xmlns:dt="urn:w3-
org:xmldatatypes">
                    <SabaObject>
                        <xsl:attribute
name="type">com.saba.busobj.SabaEmployee</xsl:attribute>
                        <xsl:attribute name="status">
                            <xsl:value-of
select="//USERAREA/OBJSTATUS"/>
                            <xsl:if test="//USERAREA/OBJSTATUS=' '"/>
                        </xsl:attribute>
                        <xsl:attribute name="id">
                            <xsl:value-of select="//EMPLOYEEID"/>
                            <xsl:if test="//EMPLOYEEID=' '"/>
                        </xsl:attribute>
                        <title dt:type="string" dt:size="10">
                            <xsl:value-of select="//NAME[1]"/>
                        </title>
                        <fname dt:type="string" dt:size="25">
                            <xsl:value-of select="//NAME[2]"/>
                            <xsl:if test="//NAME[2]=' '"/>
                        </fname>
                        <lname dt:type="string" dt:size="25">
                            <xsl:value-of select="//NAME[3]"/>
                            <xsl:if test="//NAME[3]=' '"/>
                        </lname>
                        <mname dt:type="string" dt:size="25">
                            <xsl:value-of select="//USERAREA/MNAME"/>
                        </mname>
                        <homephone dt:type="string" dt:size="25">
                            <xsl:value-of select="//TELEPHONE1"/>
                        </homephone>
                        <workphone dt:type="string" dt:size="25">
                            <xsl:value-of select="//TELEPHONE2"/>
                        </workphone>
                        <fax dt:type="string" dt:size="25">
                            <xsl:value-of select="//FAX1"/>
                        </fax>
                        <created_on dt:type="string" updateFlag="No">
                            <xsl:attribute
name="provide">true</xsl:attribute>
                        </created_on>
                        <created_by dt:type="string" updateFlag="No">
                            <xsl:attribute
name="provide">true</xsl:attribute>
                        </created_by>
                        <updated_by dt:type="string">
                            <xsl:attribute
name="provide">true</xsl:attribute>
                        </updated_by>
                        <updated_on dt:type="dateTime">
                            <xsl:attribute
name="provide">true</xsl:attribute>
                        </updated_on>
                        <territory_id>
                            <xsl:attribute name="idref">
                                <xsl:value-of
select="//USERAREA/TERRITORYID"/>
                            </xsl:attribute>
                        </territory_id>
                        <custom0 dt:type="string">
                            <xsl:value-of
select="//USERAREA/CUSTOM0"/>
                        </custom0>
                        <custom1 dt:type="string">
                            <xsl:value-of
select="//USERAREA/CUSTOM1"/>
                        </custom1>
                        <custom2 dt:type="string">
                            <xsl:value-of
select="//USERAREA/CUSTOM2"/>
                        </custom2>
                        <custom3 dt:type="string">
                            <xsl:value-of
select="//USERAREA/CUSTOM3"/>
                        </custom3>
                        <custom4 dt:type="string">
                            <xsl:value-of
select="//USERAREA/CUSTOM4"/>
                        </custom4>
                        <company_id>
                            <xsl:attribute name="idref">
                                <xsl:value-of
select="//USERAREA/COMPANYID"/>
                                <xsl:if
test="//USERAREA/COMPANYID=
' '">bisut000000000000001</xsl:if>
                            </xsl:attribute>
                        </company_id>
                        <addr1 dt:type="string" dt:size"80">
                            <xsl:value-of select="//ADDRLINE[1]"/>
                        </addr1>
```

-continued

```
            <addr2 dt:type="string" dt:size="80">
                <xsl:value-of select="//ADDRLINE[2]"/>
            </addr2>
            <city dt:type="string" dt:size="50">
                <xsl:value-of select="//CITY"/>
            </city>
            <state dt:type="string" dt:size="50">
                <xsl:value-of select="//ADDRESS/STATEPROVN"/>
            </state>
            <zip dt:type="string" dt:size="80">
                <xsl:value-of select="//POSTALCODE"/>
            </zip>
            <country dt:type="string" dt:size="80">
                <xsl:value-of select="//COUNTRY"/>
            </country>
            <email dt:type="string">
                <xsl:value-of select="//EMAIL"/>
            </email>
            <employee_no dt:type="string" updateFlag="No" dt:size="80">
                <xsl:value-of select="//EMPLOYEENO"/>
                <xsl:if test="//EMPLOYEENO=' '"/>
            </employee_no>
            <status dt:type="number">
                <xsl:value-of select="//USERAREA/STATUS"/>
                <xsl:if test="//USERAREA/STATUS=' '">Full Time</xsl:if>
            </status>
            <password dt:type="string" updateFlag="No">
                <xsl:value-of select="//USERAREA/PASSWORD"/>
                <xsl:if test="//USERAREA/PASSWORD=' '">412ABF98CDF3EF99</xsl:if>
            </password>
            <username dt:type="string" updateFlag="No">
                <xsl:value-of select="//USERAREA/USERNAME"/>
            </username>
            <manager_id>
                <xsl:attribute name="idref">
                    <xsl:value-of select="//USERAREA/MANAGERID"/>
                </xsl:attribute>
            </manager_id>
            <emp_type>
                <xsl:value-of select="//EMPLOYEETYPE"/>
                <xsl:if test="//EMPLOYEETYPE=' '"/>
            </emp_type>
            <started_on dt:type="dateTime">
                <xsl:value-of select="//USERAREA/STARTEDON"/>
            </started_on>
            <terminated_on dt:type="dateTime">
                <xsl:value-of select="//USERAREA/TERMINATEDON"/>
            </terminated_on>
            <location_id>
                <xsl:attribute name="idref">
                    <xsl:value-of select="//USERAREA/LOCATIONID"/>
                    <!-- Change value for default location_id -->
                    <xsl:if test="//USERAREA/LOCATIONID=' '">locat0000000000l000</xsl:if>
                </xsl:attribute>
            </location_id>
            <max_discount dt:type="number">
                <xsl:value-of select="//USERAREA/MAXDISCOUNT"/>
                <xsl:if test="//USERAREA/MAXDISCOUNT=' '">0</xsl:if>
            </max_discount>
            <split dt:type="string">
                <xsl:value-of select="//USERAREA/SPLIT"/>
                <xsl:if test="//USERAREA/SPLIT=' '">domin000000000000001</xsl:if>
            </split>
            <rate dt:type="number">
                <xsl:value-of select="//USERAREA/RATE"/>
                <xsl:if test="//USERAREA/RATE=' '">0</xsl:if>
            </rate>
            <quota dt:type="number">
                <xsl:value-of select="//USERAREA/QUOTA"/>
                <xsl:if test="//USERAREA/QUOTA=' '">0</xsl:if>
            </quota>
            <jobtype_id>
                <xsl:attribute name="idref">
                    <xsl:value-of select="//USERAREA/JOBTYPEID"/>
                </xsl:attribute>
            </jobtype_id>
            <ss_no dt:type="string">
                <xsl:value-of select="//USERAREA/SSNO"/>
                <xsl:if test="//USERAREA/SSNO=' '"/>
            </ss_no>
            <gender dt:type="number">
                <xsl:value-of select="//USERAREA/GENDER"/>
                <xsl:if test="//USERAREA/GENDER=' '"/>
            </gender>
            <home_domain>
                <xsl:attribute name="idref">
                    <xsl:value-of select="//USERAREA/HOMEDOMAIN"/>
                    <xsl:if test="//USERAREA/HOMEDOMAIN=' '">domin000000000000001</xsl:if>
                </xsl:attribute>
            </home_domain>
            <desired_job_type_id>
                <xsl:attribute name="idref">
                    <xsl:value-of select="//USERAREA/DESIREDJOBTYPEID"/>
                </xsl:attribute>
            </desired_job_type_id>
            <locale_id>
                <xsl:attribute name="idref">
                    <xsl:value-of select="//USERAREA/LOCALEID"/>
                    <xsl:if test="//USERAREA/LOCALEID=' '">local000000000000001</xsl:if>
                </xsl:attribute>
            </locale_id>
            <flags dt:type="string">
                <xsl:value-of select="//USERAREA/FLAGS"/>
                <xsl:if test="//USERAREA/FLAGS=' '">0000000000</xsl:if>
            </flags>
            <timezone_id>
                <xsl:attribute name="idref">
                    <xsl:value-of select="//TIMEZONE"/>
                    <!-- Change value for default timezone_id -->
                    <xsl:if test="//TIMEZONE=' '">tzone000000000000008</xsl:if>
                </xsl:attribute>
            </timezone_id>
        </SabaObject>
    </SabaObjectSerialization>
    </xsl:for-each>
  </xsl:template>
</xsl:stylesheet>
```

The following is the equivalent Local Format document, a generated Saba Person in Saba Canonical Format:

```
<SabaObjectSerialization xmlns:dt="urn:w3-org:xmldatatypes">
<SabaObject type="com.saba.busobj.SabaEmployee" status="existing" id="http://bnemazie/interconnect/Saba/com.saba.interconnect.ObjectID@170179/6805">
    <title dt:type="string" dt:size="10">MR.</title>
```

-continued

```
    <fname dt:type="string" dt:size="25">testfirst</fname>
    <lname dt:type="string" dt:size="25">testlast</lname>
    <mname dt:type="string" dt:size="25"/>
    <homephone dt:type="string" dt:size="25">972 580 7645</homephone>
    <workphone dt:type="string" dt:size="25"/>
    <fax dt:type="string" dt:size="25"/>
    <updated_by dt:type="string" provide="true"/>
    <updated_on dt:type="dateTime" provide="true"/>
    <territory_id idref=" "/>
    <custom0 dt:type="string"/>
    <custom1 dt:type="string"/>
    <custom2 dt:type="string"/>
    <custom3 dt:type="string"/>
    <custom4 dt:type="string"/>
    <company_id idref="bisut000000000000001"/>
    <addr1 dt:type="string" dt:size="80">1213 addr1 1234</addr1>
    <addr2 dt:type="string" dt:size="80"/>
    <city dt:type="string" dt:size="50">Irving</city>
    <state dt:type="string" dt:size="50">TX</state>
    <zip dt:type="string" dt:size="80">75038</zip>
    <country dt:type="string" dt:size="80">US</country>
    <email dt:type="string"/>
    <employee_no dt:type="string" dt:size="80">185</employee_no>
    <status dt:type="number">Full Time</status>
    <password dt:type="string">412ABF98CDF3EF99</password>
    <username dt:type="string">1093-202</username>
    <manager_id idref=" "/>
    <emp_type>Permanent</emp_type>
    <started_on dt:type="dateTime">2000-07-24 00:00:00.0</started_on>
    <terminated_on dt:type="dateTime"/>
    <location_id idref="http://bnemazie/interconnect/Saba/com.saba.interconnect.ObjectID@cd92/6801"/>
    <max_discount dt:type="number">0</max_discount>
    <split dt:type="string">domin000000000000001</split>
    <rate dt:type="number">0</rate>
    <quota dt:type="number">0</quota>
    <jobtype_id name="idref"/>
    <ss_no dt:type="string">111-11-2222</ss_no>
    <gender dt:type="number">0</gender>
    <home_domain idref="domin000000000000001"/>
    <desired_job_type_id idref=" "/>
    <locale_id idref="local000000000000001"/>
    <flags dt:type="string">0</flags>
    <timezone_id idref="tzone000000000000008"/>
  </SabaObject>
</SabaObjectSerialization>
```

A SabaEmployee object is instantiated based on the canonical XML document. This object is then saved, committing any changes to the database.

The set of interconnect components is extensible so additional functionality can be added over time. Adding a Searcher component allows a site to be "exchange enabled"—able to share catalog (or other) information with other sites. In this way users can get results from searches that combine remote catalog offerings with local catalog offerings. Adding a Purchaser component makes a site "eCommerce enabled"—able to offer products for sale via an automated interface. This enables learners who choose classes from a catalog that has been shared on SabaNet to purchase them via SabaNet. A Versioner component could offer the ability to automatically upgrade to the latest version of the software or to automatically purchase a license extension via a Licensor component.

As described above the DeliveryService is a key component of the Interconnect Backbone. Interconnect messages follow an persistent asynchronous protocol. Messages are sent and received with a message payload. Message payloads are opaque to the DeliveryService, any object may be sent as a message payload. A message recipient may reply to a message by constructing a reply message from the original message and sending that reply as a separate asynchronous message.

Message senders and recipients are responsible for synchronizing their own messages. There are message ID fields in the Message that may be used for this purpose. A Message contains (1) The sender's InterconnectAddress (2) The recipient's InterconnectAddress (3) The sender's credentials (4) A messageID (5) A replyID (6) The message payload (an Object). Message senders and recipients have an InterconnectAddress. This Address is managed by the DeliveryService and contains (1) An Inbox identifier (InboxID) assigned by the local DeliveryService (2) A String in URI format identifying the service (mServiceURI), (3) An Object identifying the associated User (mUser).

The InboxID is used by a DeliveryService for local message routing. The URI identifies the specific software component and is used to determine whether the InterconnectAddress is local or remote. To send a message, an Interconnect client must: (1) construct a Message for the given sender and recipient, (2) add the message payload to the message, (3) set the message ID or the reply ID if needed, (4) send the message using the DeliveryService's IPostman interface. If the message is local it will be delivered using the InboxID. If it is remote it will be forwarded to the appropriate remote DeliveryService for delivery at that location.

In order to use the DeliveryService, a connect must first be made. Upon connection the DeliveryService assigns an InboxID that is used internally for message routing and synchronization. This InboxID is used in subsequent calls to the DeliveryService.

Once connected, messages may be sent or received from the DeliveryService. There are two ways messages can be delivered depending upon how the recipient registers. The recipient may Poll for messages using IPostman.getMessage( ) or handle incoming messages by implementing IRecipient.recieveMessage( ). The IPostman.connect( ) method has an optional IRecipient parameter. If a valid IRecipient is passed, incoming messages will be delivered using that interface. In this case, behind the scenes, an InboxAssistant is created in a separate thread to watch the Inbox on behalf of the recipient. When a message is sent using IPostman.sendMessage( ) the DeliveryService is responsible for making sure that the message gets delivered to the appropriate Inbox. If it cannot it must report or log an error.

In the simple case where a message recipient is in the same installation as the sender, the DeliveryService will put the message in the recipient's Inbox and be done with it. The message will stay there until the recipient or the InboxAssistant takes it out. When finished using the service, an Interconnect client may disconnect from or release the Inbox. Disconnecting tells the DeliveryService to maintain messages as the recipient intends to reconnect at some later time. Releasing frees all DeliveryService resources associated with the Inbox.

When the DeliveryService determines that message is destined for a recipient in another Interconnect location, the local DeliveryService must forward the message to its peer DeliveryService at that location. The service identifier in the message's recipient address is used to determine whether the recipient is local or remote. This identifier is a URI with the Host name (as returned by InetAddress.getLocalHost( )).getHostName( )) and Interconnect service name. For example, a service named "SabaAccessor" running on Saba host "flamenco" would have an URI of the form "rmi://flamenco.saba.com/SabaWeb/Saba/Accessor".

The ServiceManager will look at the serviceURI and determine whether the service in remote or local, if it is remote it will resolve the address with it's remote peer.

Key to the design of the Interconnect is the notion of pluggable transport protocols. To accommodate this, the Delivery Service has 2 components (1) Delivery Service (2) Persistent Message Manager. The Delivery Service writes messages to outbound queues (if the message needs to be delivered to an external system), the Persistent Message Manager polls out bound queues to deliver the message to the host the message is intended for. The persistent Message Manager has the uses pluggable transport protocol. For implementing a protocol using RMI a class needs to be written implementing IPMTransport. The Persistent Message Manager (PMM) acts as the listener for receiving messages. Messages received are put into inbound queues, the Delivery Service delivers messages from the inbound queues to the Subscribers.

The rationale behind this separation is to allow for the Interconnect DeliveryService/PMM to be deployed across a wide variety of communication protocols. Supporting a new protocol requires building a delivery transport that wraps that protocol. The protocol wrappers are implemented as peers, and initiate and accept connections, send and receive messages, terminate gracefully, etc. For example, the following steps would be performed to build a TCP/IP socket Interconnect Transport:

1. Implement a interconnect listener/accepter
2. Implement a client connection initiator
3. marshal and write interconnect messages onto a socket
4. read and unmarshal interconnect messages from a socket
5. implement the IPMTransport interface A discussion of mapping Ids from one system to another using the POID concept follows. When the Accessor receives a request to export an object to a stream, it is passed a user object and a platform ID (POID). In this case the POID is an ID associated with the local object in this system. Generally this ID will be acquired from another exported document or as a result of a Monitor event however, some initial mappings may need to be provided to bootstrap the system.

Given the POID, the Accessor looks up the local ID and the document type in the Mapper. It is an error if there is no associated local object. The Accessor then uses the document type to look up the appropriate stylesheet, transformer and XMLHelper to use during the accessing and transformation steps.

Using the AccessorReader for the configured system, the local object is extracted into a stream in a system specific XML format. The XML stream, the stylesheet and an output stream are then passed to the transformer that writes the transformed XML to the new stream. The transformed stream is then returned.

This is in the simple case where the XML to export contains no external references to objects in the source system which are not contained in the generated XML. In the more complicated case, the XML stream is not fully self contained, i.e. it contains references to objects that are not part of the XML stream. XML however may contain the local Object Id of this Object, this Id is meaning less outside this system. This Id needs to be replaced with its POID.

The Accessor service needs to attempt to insure that all unresolved references in the outbound XML document are represented in the form of a POID. During export, the Accessor must find or create a POID for each reference encountered and fix up those object references in the XML stream. The Accessor will use the Mapper to determine if the referenced object has an associated POID. If a POID does not exist, one will be created and added to the Mapper's tables.

Step by step on the Accessor side:
1. The Accessor requests a document be exported by invoking the Accessor method:
   Reader IAccessor.getObjectReader(UserObject user, POID poid)
2. The Accessor looks up the local object ID from the Mapper:
   LocalObjectID Mapper.getLocalID(POID platformID)
   If there is no local ID an exception is raised.
3. The Accessor looks up the document type from the Mapper:
   String Mapper. getDocumentType (POID platformID)
   If there is no document type, a default is used for the configured AccessorReader.
4. The Accessor looks up the stylesheet, IXMLHelper and ITransformer using the docType.
5. The Accessor requests the object in XML format from the AccessorReader:
   Reader IAccessorReader.extractObjectReader(LocalObjectID localID, IXMLHelper helper)
6. The Accessor fixes up ID references in the XML stream. It scans the stream looking for foreign POIDs.
7. When a reference ID is encountered by the Accessor, it resolves it to the POID using the Mapper. If no POID exists one is created. The POID is written to the XML stream.
8. An output stream is created and the document is transformed:
   void ITransformer.transform(String stylesheet, Reader in, Writer out)

When the Importer receives a request to import an object from a stream, it is passed the stream, a user object, the document type and a platform ID (POID). This POID is a foreign ID, created when the document is exported from the source system.

The XML stream, a stylesheet and an output stream are passed to the transformer and a new XML stream is produced. This new stream is passed to a platform specific object that inserts it into the system. On insert, a local object ID is created by the system and returned.

When the local ID is returned to the Importer, the Importer asks the Mapper to map the foreign POID to the Local Object. The POID is then returned to the requestor in the import status reply.

This is in the simple case where the XML to import contains no external references to objects in the source system which are not resolved in the XML.

In the more complicated case, the XML document not fully self contained. The document to import contains references to objects that are not part of the XML document. The import service attempts to resolve these references to insure the referential integrity of the object being imported. During the transformation phase, the Importer must resolve the foreign references to local objects and fix up those object references in the XML stream.

The specified object may have already been imported in which case there will be an entry in the local Mapper's foreign POID map. The Importer asks the mapper to resolve the POID to a local object. If this object has been mapped, a string representation of the Object ID is used to replace the foreign POID in the XML document.

In the case where the object has not been previously imported the importer has two choices. Either it can fail and report an error, or it can attempt to pull the object from the foreign system. It is reasonable to make this a configurable option and perhaps only support error reporting in the initial release.

Step by step Id mapping on Import:
1. The Subscriber requests a document be imported by invoking the IImporter method:
   ImportStatus IImporter.importObjectFromStream (POID poid, UserObject user, Reader stream, String docType)
2. The Importer looks up the stylesheet, IXMLHelper and ITransformer using the docType.
3. An output stream is created and the document is transformed:
   void ITransformer.transform(String stylesheet, Reader in, Writer out)
4. The Importer fixes up foreign ID references in the XML stream. It scans the stream looking for foreign POIDs.
5. When a foreign ID is encountered by the Importer, it resolves it to the local ID using its Mapper. The local ID is written to the XML stream.
   LocalObjectID Mapper.resolveForeignObject(POID foreignID)
6. The fixed-up XML stream is passed to the ImporterWriter to insert into the system.
   LocalObjectID insertObjectFromStream(Reader in, IXMLHelper helper)
7. Map the new local ID to the original foreign POID passed with the import request.
   void Mapper.mapForeignObject(POID foreignID, LocalObjectID localID)

So far the discussion has been around the Interconnect/Connector framework. The following discusses Connector Specific plug ins, and defines the specific components for each connector. Taking Saba Connector as an example:
a. SabaChangeManager—This class extends the Change Manager, starts a thread that polls the database for changes. Once a change is detected the change is passed over to the Monitor for further processing. This class has the specific logic to poll Saba database.
b. SabaImporterWriter—This class extends the ImporterWriter and has the logic to import Objects in Local format (SCF)into Saba system.
c. SabaAccessorReader—This class extends the AccessorReader and has the specific logic to retrieve objects from Saba system in local format.

Every new connector has to implement these 3 classes to work with application connecting. Extending this we have sapChangeManager, sapImporterWriter and sapAccessorReader.

Information Server

The present invention relates to a novel information distributor method and apparatus. The present invention can provide services for consolidating, analyzing, and delivering information that is personalized, relevant, and needed.

It employs metadata-based profiles to match information with users. User profiles may include skill competencies and gaps, roles and responsibilities, interests and career goals.

The Platform services provides the interface and infrastructure for building agents that work in concert to decide what information is delivered, when it is delivered, and how it is delivered.

The platform services integrate with the Platform Interconnect Server to work across different networks and disparate information systems. This allows users to receive information from a variety of sources and locations via a single, consistent interface.

The present invention uses an Information Distributor Developer's Kit (IDK) to be used by software application developers of ordinary skill in the art.

The platform of the present invention identifies and fills information gaps across the corporate value chain. IDK provides the infrastructure and core functionality to find and deliver relevant and targeted information. In an embodiment, the IDK enables more sophisticated querying and matching functionality than in the prior art and serves as the technology underpinnings for a stand-alone Enterprise Information Portal (EIP) solution.

For more information on RDF, refer to the W3C home page, incorporated by reference in its entirety, at the URL www.w3.org/RDF/ and formal specification located at URL www.w3.org/TR/REC-rdf-syntax/.

The above sources of information are incorporated by reference in their entireties.

Figure 11:
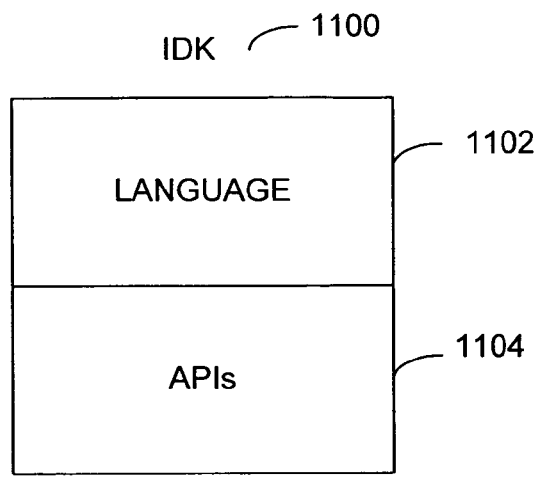
FIG. 11 illustrates one embodiment of the structural overview of an IDK.

FIG. 11 shows a structural overview of an IDK 1100 of the present invention. IDK 1100 is associated with a language 1102, such as RDF, for representing web metadata, a language for querying web metadata, and a set of APIs 1104 for defining information services based on what data is used, when and how a match is performed, and what is done with the results.

Figure 12:
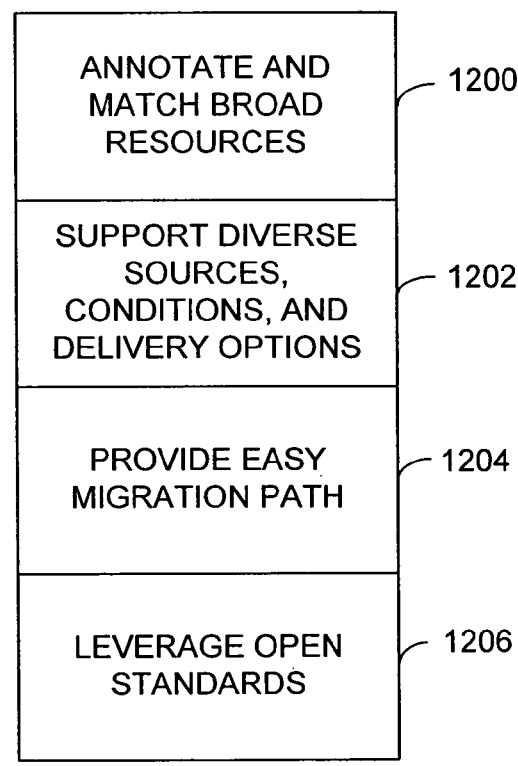
FIG. 12 illustrates one embodiment of a functional overview of an Information Distributor.

FIG. 12 shows a functional overview of an Information Distributor 1201 of the present invention. IDK 1100 can annotate and match broad resources 1200, support diverse sources, conditions, and delivery options 1202, provide an easy migration path 1204, and leverage open standards 1206.

In an embodiment of the invention, Information Distributor 1201 provides a flexible mechanism for annotating and matching web resources 1200. Information Distributor 1201 can locate and deliver a wide variety of resources, from web pages to Business Objects. Information Distributor 1201 also supports a wide variety of descriptive information required by business applications, from standard web metadata to catalog information to skills and competencies.

Information Distributor 1201 also supports a broad variety of information sources, match conditions, and delivery mechanisms 1202. Information Distributor 1201 generates matches under a variety of circumstances and supports a variety of options for delivering match results.

Information Distributor 1201 provides an easy migration path 1204. A software developer of ordinary skill in the art can write queries using a combination of Java code and SQL. IDK provides equivalent functionality using a higher-level languages for representing and querying data and simpler programming APIs. Information Distributor 1201 also leverages open standards 1206 by supporting industry standards such as RDF and XML. Support for industry standards helps ensure the availability of third-party tools that interoperate with IDK and increases the set of data and information on which IDK can act.

In an embodiment of the invention, Information Distributor 1201 can determine if a new software developer has just joined a new project. If one of the skills required for the new software developer's new assignment is knowledge of XML, then upon joining the project, Information Distributor 1201 automatically send an email to the new software developer containing information about the company's standard "Introduction to XML" course.

In an embodiment of the invention, Information Distributor 1201 can keep a development manager informed about the status of the other development groups in his division. As part of his custom home page provided by the corporate portal, he can view a list of the most recent updates submitted by each development manager, and call up each report in his web browser.

In an embodiment of the invention, Information Distributor 1201 can detect when an affiliated training provider has made available a new advanced class in Java. Information Distributor 1201 sends email to all advanced and expert Java programmers in the company announcing the availability of this class.

In an embodiment of the invention, Information Distributor 1201 can detect when the HR department institutes a new approval practice for all new hires. Information Distributor 1201 assures all hiring managers in the company receive a new entry in the Corporate Information channel that explains the policy change.

If an updated price list for a region is generated, Information Distributor 1201 sends an email containing the new price information to all dealers in that region.

If an employee has a change in his family status, such as if the employee has a baby, the next time the employee views the HR department's benefits page in his web browser, the Information Distributor assures customized plan and deductible information appears that is appropriate for his new family status.

Referring again to FIG. 11, in an embodiment, the Information Distributor adopts a new standard for web metadata and its definition of a high-level language 1102 for querying this metadata.

Metadata is structured information about information, and is used to identify, categorize, and locate resources of interest. Resource Description Format (RDF) is a new, XML-based standard for associating arbitrary metadata with any web resource. It can be used to describe resources ranging from a course catalog on the WWW to a business object representing a client.

In an embodiment a language used to query web metadata 1102 may be RDF Query Language (RQL), an XML-based query language for writing queries against RDF data. It can represent both simple and complex queries, and can also accommodate metadata matching, where a metadata description can be part of the query. For example, this allows a particular employee's complete skills gap—expressed as an RDF description—to be used in a query to locate classes that fill the gap.

Figure 13:
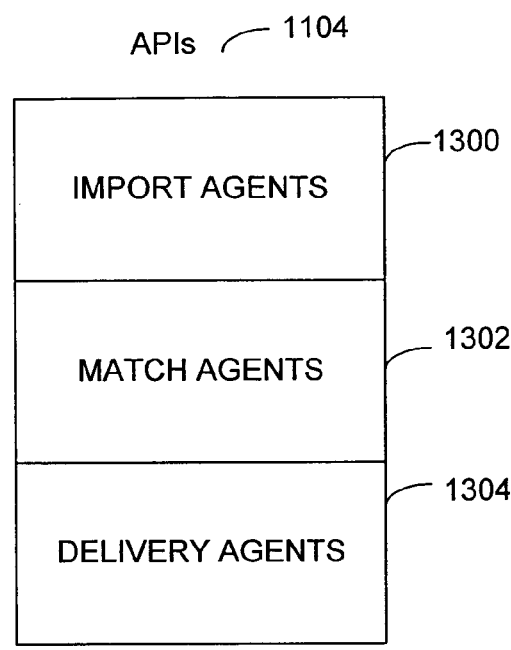
FIG. 13 illustrates an exemplary view of APIs associated with the Information Distributor.

FIG. 13 shows an exemplary view of APIs 1104 associated with the Information Distributor. In an embodiment, the Information Distributor partitions information matching and delivery issues into three areas, each addressed by a distinct type of agent, Import Agents 1300, Match Agents 1302, and Delivery Agents 1304. The combination of Import Agent 1300, Match Agents 1302, and Delivery Agents 1304 is a novel combination of the present invention.

Import Agents 1300 create and import the RDF descriptions used by IDK. Import Agents 1300 can generate metadata from a variety of sources, from existing web pages and business objects to content management systems to enterprise applications.

Match Agents 1302 determine what matches and queries occur under what conditions. Match Agents 1302 can be triggered by a request to a web or application server, by specific events, or on a regularly scheduled basis. A Match Agent 1302 also specifies the RQL and any input metadata to use as the metadata query.

Delivery Agents 1304 dispatch the results of a query or match. In an embodiment, Delivery Agents 1304 integrate with a variety of delivery mechanisms, from web page generation and XML datagrams to email and event messaging systems.

Figure 14:
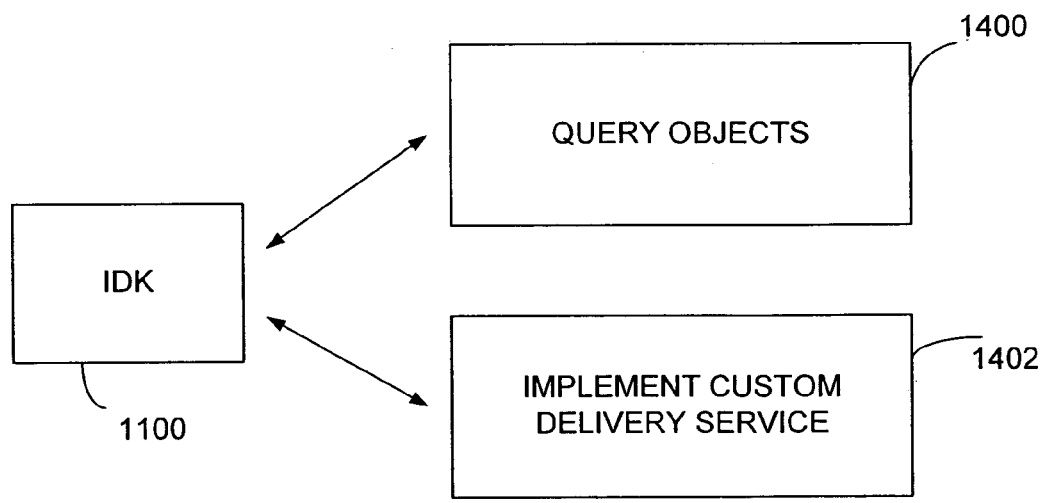
FIG. 14 illustrates an exemplary view of using Information Distributor or IDK.

In an embodiment of the invention, FIG. 14 shows an exemplary view of using Information Distributor or IDK 1100. A software developer of ordinary skill in the art can use IDK to query objects 1400 or to implement custom delivery service 1402. In an embodiment, Query Objects 1400 may be used similarly to today's finder methods, that is, a high-level mechanism to query SABA business objects, but using and requiring knowledge of RDF and RQL.

Figure 15:
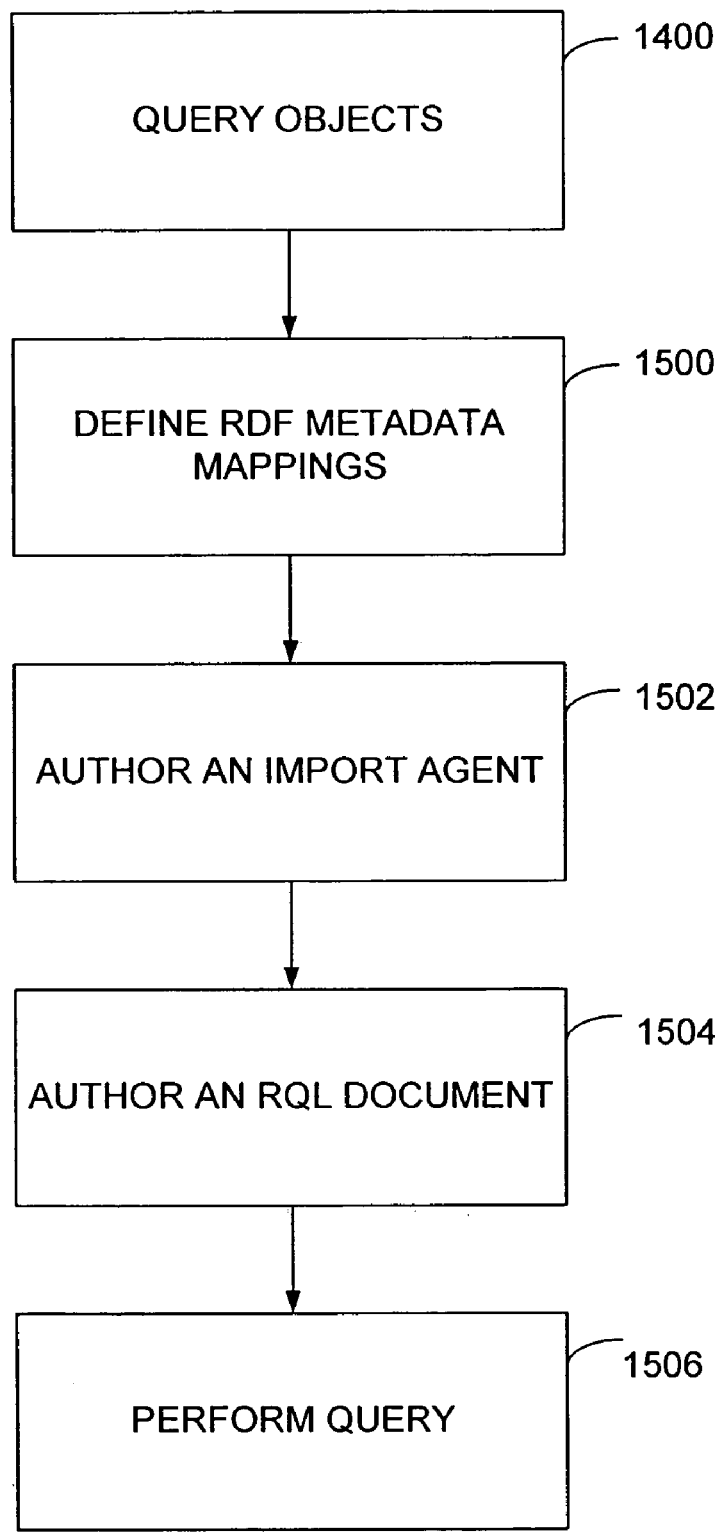
FIG. 15 illustrates an exemplary overview of Query Objects.

FIG. 15 shows an exemplary overview of Query Objects 1400. The invention, through a user associated with the invention, such as but not limited to a software developer of ordinary skill in the art, defines RDF Metadata Mappings 1500 for the objects and metadata of interest. Then, the invention Authors An Import Agent 1502 to capture this metadata. The invention may then Author An RQL Document 1504 to query this metadata and author a Match Agent to Perform the Query 1506 and a Delivery Agent to act on the query results.

Figure 16:
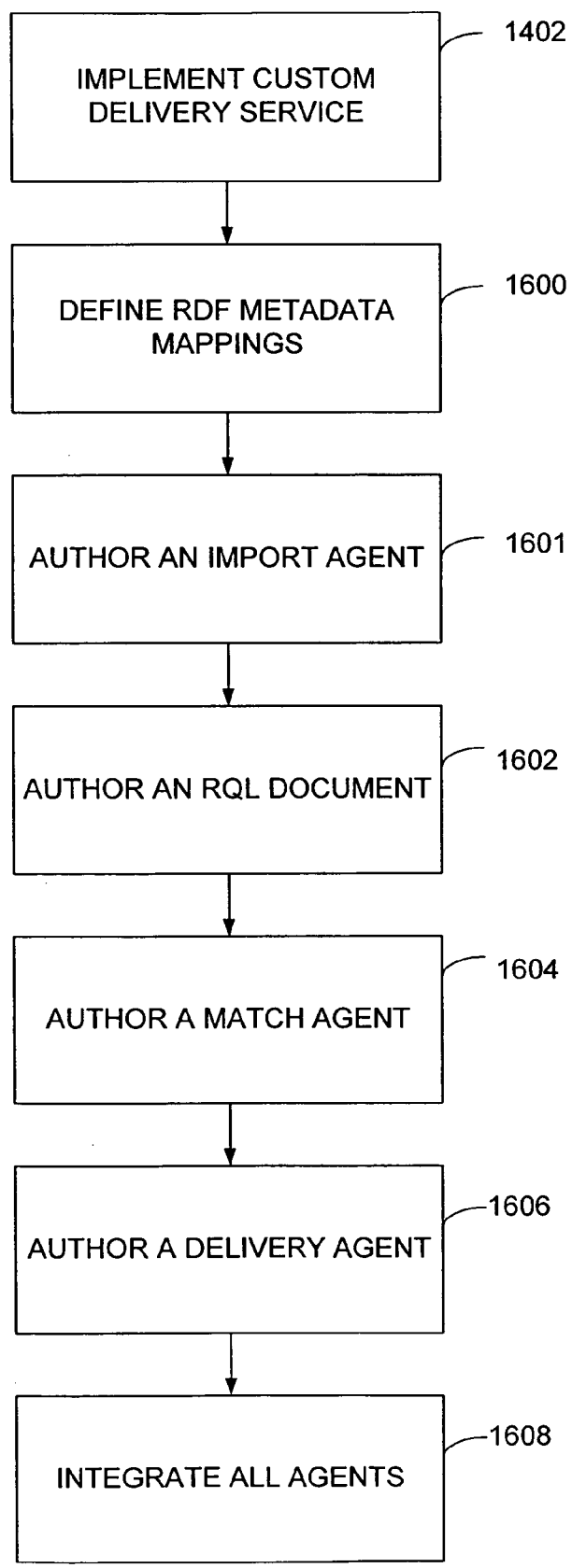
FIG. 16 illustrates an exemplary overview of the Implement Custom Delivery Service.

FIG. 16 shows an exemplary overview of Implement Custom Delivery Service 1402. The invention, through a user, such as but not limited to a software developer of ordinary skill in the art, may use the invention's IDK to novelly Implement a Custom Information Delivery Service 1402, using RDF, RQL, and the full IDK interface. In an embodiment, the invention Defines RDF Metadata Mappings 1600 for the objects and metadata of interest. The invention Authors An Import Agent 1601 to capture this metadata. The system and method of the present invention then Authors An RQL Document 1602 to query this metadata. The invention then Authors a Match Agent 1604 to perform the query. and Authors a Delivery Agent 1606 to dispatch the query results. The invention then Integrates All Agents 1608, including the import agent, the match agent, and the delivery agent, into the existing system.

In an embodiment of the invention, Information Distributor (IDK) is a Software Development Kit delivered as part of Platform 4.0. It provides the infrastructure and basic functionality needed to build and customize the Enterprise Information Portal.

IDK provides the infrastructure and services to perform metadata-based queries. Unlike traditional text-based search engines, in an embodiment the IDK operates solely on descriptive data about resources, rather than the resources themselves.

In an exemplary embodiment of the invention, referring again to FIG. 13, IDK defines interfaces for metadata generation (Importers or Import Agents 1300) and matching (Resolvers or Match Agents 1302) and for delivering query results (Dispatchers or Delivery Agents 1304). Combinations of these three services allow the Information Distributor to interoperate with a variety of enterprise systems and to service queries in a broad range of application domains.

In an embodiment, a portal server may be delivered using IDK.

Import Agents are responsible for consolidating a variety of information sources. Importers integrate with various external systems, analyze the descriptive data about specific resources in the system, and import this data into a custom RDF database. Exemplary information sources include internal email systems and Intranets, SABA EMS, ERP systems, and the World Wide Web.

Common tasks supported by Import Agents include:
Executing batch imports
Scheduling imports at regular intervals Analyzing and translating metadata formats
Specifying a target database
Integrating with SABA Interconnect Match Agents are responsible for matching between information resources and user profiles. Match Agents execute at regular intervals or in response to specific requests. They perform intelligent comparisons between metadata descriptions of imported resources and user profiles. These comparisons return a set of information resources as the match result.

Because they act on detailed user profiles, Match Agents can function as personal agents, identifying those resources most relevant to a user's job, interests, or objectives. For example, they can determine that a user requires knowledge of a specific technology for a new job assignment, and deliver suggestions for classes covering that technology.

Because they match against categorized metadata, Resolvers can return more accurate and meaningful results than is possible with traditional text-based searches. For example, Match Agents can return only documents that have been updated within the last week. Or they can distinguish between articles about an individual and articles written by the individual.

Delivery Agents are responsible for delivering the results of a match to the correct recipients in the appropriate fashion. Delivery Agents integrate with various delivery mechanisms, delivering either pointers to the match results or the actual information itself. Typical delivery vehicles include e-mail, web servers, and enterprise portals.

Common tasks supported by Delivery Agents include:
Delivering results immediately upon availability
Delivering results at delayed or batched intervals
Integrating with SABA Interconnect In an embodiment, the final system and method of the present invention may be capable of scaling to handle enterprise-wide document databases. An initial prototype that may be delivered is capable of demonstrating the proof-of-concept without exhibiting the scalability of the final system.

The IDK provides a flexible mechanism for describing and comparing a wide variety of resources. The actual data being compared may vary widely among applications, ranging from competencies and skills for gap analysis to document summaries and reviews for web content. Yet the actual operations involved in determining a match tend towards a small set, text and numeric comparisons and basic Boolean logic. Thus, the IDK needs to casts a broad variety of properties into a consistent format for purposes of comparison.

In an embodiment, the invention employs the Resource Description Format (RDF), the World Wide Web Consortium's standard for web metadata. It meets the above requirements because it is designed to support a wide range of different applications, expressing them all in a consistent attribute property/value format. The format also allows the definition of standard vocabularies for specific application domains, and the mixing and matching of these vocabularies to describe a resource. The format has a web-centric design, employing URLs to describe any form of web resource and XML to serialize its data graphs and is seeing slow but steady adoption in a variety of domains, from electronic documents and on-line learning to news stories and business cards.

By choosing RDF as the Information Distributor's standard metadata format, the invention makes it easy and efficient for customers to work with the system because they can turn to external sources for training and documentation, can use third party tools for defining their metadata, and are more likely to already have or be able to find developers familiar with RDF. Furthermore, as RDF is used for more domains, the Information Distributor can be applied to an ever-increasing amount of content.

RDF is essentially a model for representing attribute/value pairs as a directed labeled graph. It consists of statements that pair a web resource (anything identified by a URL) with a property and a value. At its core, IDK provides a flexible mechanism for comparing these attribute/value pairs and taking action upon the comparison results.

The Match Agent operates by comparing one RDF description to the full set of RDF descriptions in a specified database. Because of the variety and flexibility of RDF descriptions, additional instructions are required to specify how the match is performed. This is the function of the match template.

Match templates specify certain fields as belonging to a target RDF file. In an embodiment, the target is a file that is provided along with the match template to customize the search, for example, to perform a predefined search against a specific individual's description. Match templates may also be written to perform a fixed search, in which case there is no target RDF file. Merging a match template with a target RDF file produces an RDF query.

Match templates can specify the following aspects of a query:
The specific properties to be compared.
The comparison operation (=, !=, <,>)
Boolean operators (AND, OR, NOT)
A set of comparison functions, including:
 like (text matching)
 latest (most recent date)
container operation: contains, first, etc.
In an embodiment, match templates are:
easy to create and edit by hand
conducive to creation by an authoring tool
easy to parse In an embodiment, the complete syntax and specification used by match templates is defined by the RDF Query Language Specification, described below.

RDF-based Match Templates are unique and never before contemplated by the prior art. The combination of a match template and a target RDF file can produce an RDF Query. In an embodiment of the invention, the core of the Information Distributor is a RDF Query engine that performs a query on one or more RDF databases, then returns a set of resources that satisfy the query.

In an embodiment of the invention, a client may use the Information Distributor SDK by performing the following exemplary method steps:
1. Write an Import Agent that implements the ImportAgent interface and employs the MR.importRDF( ) method.
2. Write a Match Agent that implements the MatchAgent interface and employs the MR.match( ) method.
3. Write a Delivery Agent that implements the DeliveryAgent interface.
4. Create a new instance of an MR (Metadata Repository).
5. Write code to create specific instances of the above agents and set them into motion.

In an embodiment of the invention, an ImportAgent is responsible for delivering metadata in RDF format to a Metadata Repository. Specific Import Agents may interface with a particular source of metadata, translate that metadata into RDF, and use the MR.importRDF( ) method to import that RDF. Import Agents may register with the Event Manager to perform imports in response to particular events. In an embodiment, the Import Agent has the sole responsibility for performing the metadata translation. In an embodiment of the invention, the invention provides utility routines that assist with translating various common metadata formats or serve to automatically generate metadata. In an embodiment, the invention provides additional utility functions for interfacing with the Event Manager or scheduling batch imports.

In an embodiment of the invention, a MatchAgent is responsible for performing a metadata match. Specific Match Agents may create a Match Descriptor and pass it to a specific MR to perform a match. Match Agents may perform matches in response to particular events. In an embodiment of the invention, distributed queries may be performed across multiple MR.

Match Agents may employ a utility class called MatchDescriptor that captures all information needed for a metadata query or match template.

This class is defined as follows:

```
public class MatchDescriptor
{
    /** MatchDescriptor constructor.
    *
    * @param aTemplate Contents of a match template.
    * @param aTarget URI of a target RDF file. May be NULL if the match
    *        template describes a fixed search.
    * @param aHandler MatchHandler to operate on the match results.
    */
    public MatchDescriptor(String aTemplate, String aTarget, MatchHandler aHandler)
}/* MatchDescriptor */
```

In an embodiment of the invention, a Delivery Agent is responsible for delivering the result of a metadata match. Delivery Agents implement the following Java interface:

```
public interface DeliveryAgent
{
    /** Deliver the results of a match.
     * @param mrs A MatchResultSet containing the match results.
     * @exception DeliveryException Thrown when delivery fails.
     */
    public void deliver(MatchResultSet mrs) throws DeliveryException;
}   /* DeliveryAgent */
```

Delivery Agents use a utility class called MatchResultSet that contains the result of a metadata match. A MatchResultSet contains a Vector of RDFResource objects, a class containing a URI for each resource returned by a metadata match, as well as additional, optional properties. The MatchResultSet class is defined as follows:

```
public class MatchResultSet
{
    /**
     * Set the results.
     * @param theResults Vector of RDFDescription objects.
     */
    public void setResults(Vector theResults)
    /**
     * Return an Enumeration of match results.
     * @return Enumeration of RDFDescription objects
     */
    public Enumeration getResults( )
```

In an embodiment of the invention, the contents of the MatchResultSet may be serialized as a simple XML document. One RDF Description element may be associated with each result. Using RDF permits the invention to deliver additional properties that may be useful to the consumer of the MatchResultSet, such as properties taken from the source RDF Description or additional properties returned by the Match Engine.

The following is pseudocode for a sample XML result:

```
*
* 
*    <Description about = "http://sabainet/devo/status/sb11_12_99.html">
*       <dc:Title>Weekly Status of Project Sweet Baboo</dc:Title>
*    </Description>
*    <Description about="http://sabainet/devo/status/lp11_08_99.html">
*       <dc:Title>Weekly Status of Project Beethoven</dc:Title>
*    </Description>
* 
*
```

In an embodiment of the invention, a MR (Metadata Repository) is an interface that any Metadata Repository must implement.

The following is the interface for a MR:

```
public interface MR
{
    /* The import methods are used to insert RDF metadata into the MR. */
    /** Import an RDF document specified in a URI.
     * @param uri URI to the RDF file.
     * @exception ImportException Thrown when import fails.
     */
    public void importRDF(String uri) throws ImportException;
    /** Import an RDF document specified in a Reader.
     *
     * The "key" parameter serves as a unique identifier;
     * when RDF is re-imported with the same key value, it replaces the previous
     * import. The "key" value is most typically the URI.
     *
     * @param r Reader containing RDF text.
     * @param key Unique identifier for this RDF source.
     * @exception ImportException Thrown when import fails.
     */
    public void importRDF(Reader r, String key) throws ImportException;
    /** Perform a metadata match. This involves the following steps:
     *
     * <ol>
     * <li>Extracting the contents of the MatchDescriptor
     * <li>Generating a MatchResultSet
     * <li>Passing the MatchResultSet to the
```

-continued

```
MatchHandler contained
        * in the MatchDescriptor
        * </ol>
        *
        * @param md MatchDescriptor fully describing the
match to perform.
        * @exception MatchException Thrown when match
fails.
        */
        public abstract void match (MatchDescriptor md)
throws MatchException;
        /**
        * Retrieve a named property of a specific
resource.  Returns null if
        * the specified property does not exist.
        *
        * @param resource URI of resource.
        * @param namespace URI of namespace; null if no
namespace is specified.
        * @param property Property name.
        * @return Property value.
        */
        public String getProperty(String resource, String
namespace, String property) throws MatchException;
        } /* MR */
,,
```

In an embodiment of the invention, RDF Query Language (RQL) is an easy-to-learn, easy-to-author language for querying collections of RDF documents. It is designed to support the full functionality required by Information Distributor.

RQL is an XML application. An RQL document may consist of a single Select element containing a single Condition. A condition may be either a direct operation on a single property, or a Boolean grouping operation, which can in turn contain further Conditions. RQL can define a number of built-in comparison operations; it also allows comparisons against variables extracted from an accompanying target RDF file.

Each Element is described in detail below.

RDFQuery

RDFQuery is the root element of an RQL document. It must contain a single Select element.

Container

A container is a grouping property value. Containers can be Bags, unordered lists of resources or literals, Sequences, ordered lists of resources of literals, or Alternatives, distinct choices.

Literal

A literal is a property value that is a simple string (including possibly XML markup) or other primitive datatype.

Property

A property is a specific characteristic or attribute used to describe a resource. The RDF model may contain Statements, which are a named property and value assigned to a specific resource.

Resource

A resource may be anything described by an RDF expression. A resource is identified by a URI.

Select

The Select element defines the properties that are returned by an RDF Query. The result of an RDF Query is itself an RDF document; it is the set of RDF Description elements that satisfy the query. By default, only the Resource URI is returned (as an about, aboutEach, or aboutEachPrefix attribute of the Description element). The properties attribute is used to define additional properties to be returned. It is a space-separated list of all property names to be returned. The initial implementation only allows literal, first-level property values to be returned; that is, containers, nested properties, and resources are not supported.

Within the Information Distributor, the returned RDF elements are wrapped in a MatchResultSet object for convenient manipulation from Java.

Condition

The Condition element defines a condition that RDF Descriptions must satisfy to be returned. Conditions are either simple, in which case they specify a Property/Value/Operation triple, or complex, in which case they contain one of the boolean operators. The simple Conditions simply obtain a property and compare it to the value using the specified operation. Operations are defined for literal properties and container properties.

A Property/Value/Operation triple can also contain a nested Condition; this allows querying against reified statements, or statements about statements. Refer to Query 11 for an example.

And, Or, Not

The Boolean operators perform logical operations on one or more conditions. Not negates the value of a single conditions, while And and Or perform logical operations on two or more conditions.

Because many RQL operations operate on containers, there is an "applies" attribute that determines the behavior of grouping operators on containers. When "applies=within" (the default), operations within a grouping condition must apply to the same value within a container. For example, this allows specifying conditions on two elements within the same container element. When "applies=across," conditions need not apply to the same value in the container.

Notice that the Not operator returns all resources that do not satisfy the specified condition, which is not the same as resources that satisfy the negation of the condition. Refer to Query 3 for an example of this distinction.

Property

The Property element identifies a specific, named property of a Resource. Its contents identify the named property (also known as the predicate). Its contents can be a nested property, that is, multiple property names separated by forward slashes. This syntax may navigate over multiple properties, where each property value is a resource with its own properties. This may be the same syntax used by RDF Query's "path" attribute for nested queries.

As a convenience, it may not be necessary to specify Container-related properties as part of the path, that is, Bag, Seq, Alt, and li elements are automatically navigated past.

Value

The Value element defines the value against which a specific property is compared. It can contain a literal string, which is compared directly against literal properties, or against a container property using one of the container operations.

In a Match Template, the Value element may also contain a Variable element, which indicates that the value is extracted from the target RDF file. The Value element can also specify a dt:dtype attribute that specifies the datatype of the value. The only datatype that must be explicitly specified is "dateTime," which indicates that a date comparison is to be performed on a ISO 8601 date. Date values can also incorporate the "sysdate" keyword to indicate an operation based on the current date. Refer to Query 12 for an example.

Operation

The Operation element defines how the comparison is performed. RQL supports a number of predefined operations.

Literal operations operate on literal values. They include:
equals (=) performs an exact text match or numeric comparison. It will also match a resource URI.
notEquals (!=) tests for inequality.
greaterThan (>) performs the numeric comparison.
lessThan (<) performs the numeric comparison.
greaterThanOrEquals (>=) performs the numeric comparison.
lessThanOrEquals (<=) performs the numeric comparison.
like performs a substring text match.

We provide verbose forms of the various arithmetic operations for readability; this is because characters such as < require escaping within XML, which can become unwieldy.

Container operations operate on container values (Bags, Sequences, and Alternatives). They include:
contains
first
last
index(n)
sum
count Notice that the first, last, and index( ) operations are only meaningful for Sequences.

Multiple Operations can be specified in a single Condition; this is useful for queries that combine container and literal operations, such as a numeric comparison on the first entry of a Sequence. There are also two implicit shortcuts:
1. A literal operation on a container first performs an implicit "contains."
2. A container operation without a further literal operation always performs an implicit "equals."

Variable

The Variable element defines a substitution variable. It contains a Property element, and is used to obtain a literal value from a target RDF file.

Variable elements are only found in Match Template.

Namespaces

RQL supports namespace declarations as attributes of any element. It then applies these namespaces to property values. This means that property values can use namespaces prefixes. See the examples section for several illustrations of this technique. Notice also that this is an uncommon use of namespaces; rather than applying namespace declarations to element and attribute names, it is applied to the text within the document.

Notice also that for variables, the corresponding namespace declarations must exist in the target RDF file, as opposed to the RQL file itself.

Document Type Definition (DTD) for RQL Documents

```
<!-- An RQL document contains a single Select element. -->
<!ELEMENT rdfquery (select)>
<!-- Each Select clause contains a single Condition.
  The "properties" attribute defines the information to
return as part of the result set.
  Note that the URI of each matching Resource is always
returned. -->
<!ELEMENT select (condition)>
<!ATTLIST select properties NMTOKENS #IMPLIED>
```

-continued

Document Type Definition (DTD) for RQL Documents

```
<!-- A Condition can either directly contain an operation,
or contain a boolean grouping operator -->
    <!ELEMENT condition ( (operation+, property, value,
condition?) | and | or | not)>
    <!-- Boolean grouping operators -->
    <!ELEMENT and (condition, condition+) >
    <!-- the "applies" attribute determines whether or not the
condition within a grouping operation must
    all apply to the same value in a Collection. -->
    <!ATTLIST and applies (within | across) "within">
    <!ELEMENT or (condition, condition+) >
    <!ATTLIST or applies (within | across) "within">
    <!ELEMENT not (condition) >
    <!-- An operation defines how to compare a property to a
value -->
    <!ELEMENT operation (#PCDATA) >
    <!-- Property identifies a specific property in an RDF file.
    For container objects, any children are acceptable
    matches, and intervening Container and Description tags are
automatically navigated past. -->
    <!ELEMENT property (#PCDATA)>
    <!-- A value defines the value to which a property is
compared. It is either a constant String, or a
    Variable whose value comes from a target RDF file.
    -->
    <!ELEMENT value (#PCDATA | variable) * >
    <!-- The value element can have a dt:type attribute
specifying its datatype -->
    <!ATTLIST value dt:type NMTOKEN #IMPLIED>
    <!-- A variable indicates a property value obtained from a
target RDF file; it contains a Property element. -->
    <!ELEMENT variable (property)>
```

The following are exemplary embodiments of RQL documents. The example queries may all use the following source RDF document:

```
<?xml version="1.0"?>
<rdf:RDF xmlns:rdf="http://www.w3.org/1999/02/22-rdf-syntax-ns#"
    xmlns:hr="http://www.saba.com/hr#"
    xmlns:ewp="http://www.saba.com/ewp#"
    xmlns:ems="http://www.saba.com/ems#"
    xmlns:vCard="http://imc.org/vCard/3.0#">
<rdf:Description
about="http://www.saba.com/people/sally_brown">
    <vCard:N rdf:parseType="Resource">
        <vCard:Family>Brown</vCard:Family>
        <vCard:Given>Sally</vCard:Given>
    </vCard:N>
    <vCard:UID>987-65-4320</vCard:UID>
    <vCard:ROLE>Manager</vCard:ROLE>
    <vCard:ORG rdf:parseType="Resource">
        <vCard:Orgname>Development</vCard:Orgname>
    </vCard:ORG>
    <hr:Location>HQ</hr:Location>
    <hr:Reports>
        <rdf:Bag>
            <rdf:li
resource="http://www.saba.com/people/Snoopy"/>
            <rdf:li
resource="http://www.saba.com/people/Woodstock"/>
        </rdf:Bag>
    </hr:Reports>
    <ewp:competency>
        <rdf:Bag>
            <rdf:li>Java.Expert</rdf:li>
            <rdf:li>XML.Proficient</rdf:li>
        </rdf:Bag>
    </ewp:competency>
    <ewp:Interests>
        <rdf:Bag>
            <rdf:li>Java</rdf:li>
```

```
            <rdf:li>EJB</rdf:li>
            <rdf:li>COM</rdf:li>
          </rdf:Bag>
        </ewp:Interests>
        <ems:Training_Locations>
          <rdf:Seq>
            <rdf:li>San Francisco, CA</rdf:li>
            <rdf:li>San Jose, CA</rdf:li>
            <rdf:li>Los Angeles, CA</rdf:li>
            <rdf:li>Denver, CO</rdf:li>
          </rdf:Seq>
        </ems:Training_Locations>
      </rdf:Description>
      <rdf:Description
about="http:/www.saba.com/people/sally_brown" bagID="ID001">
        <ewp:competency>EJB.Advanced</ewp:competency>
      </rdf:Description>
      <rdf:Description aboutEach="#ID001">
        <ewp:attained>1999-02-25</ewp:attained>
        <ewp:provider
rdf:resource="http://www.sabanet/AllAboutJava/"/>
        <ewp:details>
          <rdf:Bag>
            <rdf:li>CBT</rdf:li>
            <rdf:li>evaluation</rdf:li>
          </rdf:Bag>
        </ewp:details>
      </rdf:Description>
    </rdf:RDF>
```

The following exemplary query ("Query 1") associated with the above source RDF document selects all managers in a department:

```
<?xml version="1.0"?>
<!DOCTYPE rdfquery SYSTEM "rql.dtd">
<rdfquery>
  <select>
    <condition
xmlns:vCard="http://imc.org/vCard/3.0#">
      <operation>equals</operation>
      <property>vCard:ROLE</property>
      <value >Manager</value>
    </condition>
  </select>
</rdfquery>
```

The following exemplary query ("Query 2")selects all developers in a department, or everyone in a development organization:

```
<?xml version="1.0"?>
<!DOCTYPE rdfquery SYSTEM "rql.dtd">
<rdfquery>
  <select>
    <condition
xmlns:vcard="http://imc.org/vCard/3.0#">
      <operation>equals</operation>
      <property>vCard:ORG/vCard:ORGNAME</property>
      <value>Development</value>
    </condition>
  </select>
</rdfquery>
```

The following exemplary query ("Query 3") selects the name and division of everyone who is not located at a headquarter location:

```
<?xml version="1.0"?>
<!DOCTYPE rdfquery SYSTEM "rql.dtd">
<rdfquery>
  <select properties="vCard:FNAME vCard:ORG"
xmlns:vCard="http://imc.org/vCard/3.0#"
xmlns:hr="http://www.saba.com/hr#">
    <condition>
      <operation>notEquals</operation>
      <property>hr:Location</property>
      <value>HQ</value>
    </condition>
  </select>
</rdfquery>
```

The following exemplary query ("Query 4") returns slightly different results, in that it also returns all resources that do not have an hr:Location property:

```
<rdfquery>
  <select properties="vCard:FNAME vCard:ORG"
xmlns:vCard="http://imc.org/vCard/3.0#"
xmlns:hr="http://www.saba.com/hr#">
    <condition>
      <not>
        <condition>
          <operation>equals</operation>
          <property>hr:Location</property>
          <value>HQ</value>
        <condition>
      </not>
    </condition>
  </select>
</rdfquery>
```

The following exemplary query ("Query 5") finds an employee named "Sally Brown":

```
<?xml version="1.0"?>
<!DOCTYPE rdfquery SYSTEM "rql.dtd">
<rdfquery>
  <select xmlns:vCard="http://imc.org/vCard/3.0#">
    <condition>
      <and applies="within">
        <condition>
          <operation>equals</operation>
          <property>vCard:N/vCard:Family</property>
          <value>Brown</value>
        <condition>
        <condition>
          <operation>equals</operation>
          <property>vCard:N/vCard:Given</property>
          <value>Sally</value>
        </condition>
      </and>
      <condition>
    </select>
</rdfquery>
```

The following exemplary query ("Query 6") selects everyone with a competency of "Advanced" in EJB:

```
<?xml version="1.0"?>
<!DOCTYPE rdfquery SYSTEM "rql.dtd">
<rdfquery>
  <select>
    <condition xmlns:ewp="http://www.saba.com/ewp#">
```

-continued

```
            <operation>contains</operation>
            <property>ewp:Competency</property>
            <value>EJB.Advanced</value>
        </condition>
    </select>
</rdfquery>
```

The following exemplary query ("Query 7") selects everyone who will train in San Francisco:

```
<?xml version="1.0"?>
<!DOCTYPE rdfquery SYSTEM "rql.dtd">
<rdfquery>
    <select>
        <condition xmlns:ems="http://www.saba.com/ems#">
            <operation>contains</operation>
            <property>ems:Training_Locations</property>
            <value>San Francisco, CA</value>
        </condition>
    </select>
</rdfquery>
```

The following exemplary query ("Query 8") selects everyone will train in some location in California and return to that location:

```
<?xml version="1.0"?>
<!DOCTYPE rdfquery SYSTEM "rql.dtd">
<rdfquery>
    <select properties="ems:Training_Locations"
xmlns:ems="http://www.saba.com/ems#">
        <condition>
            <operation>like</operation>
            <property>ems:Training_Locations</property>
            <value>CA</value>
        </condition>
    </select>
</rdfquery>
```

The following exemplary query ("Query 9") selects everyone whose first choice of training location is anywhere in California:

```
<?xml version="1.0"?>
<!DOCTYPE rdfquery SYSTEM "rql.dtd">
<rdfquery>
    <select properties="ems:Training_Locations"
xmlns:ems="http://www.saba.com/ems#">
        <condition>
            <operation>index(1)</operation>
            <operation>like</operation>
            <property>ems:Training_Locations</property>
            <value>CA</value>
        </condition>
    </select>
</rdfquery>
```

The following exemplary query ("Query 10") finds the manager of an employee named "Woodstock":

```
<?xml version="1.0"?>
<!DOCTYPE rdfquery SYSTEM "rql.dtd">
<rdfquery>
```

-continued

```
    <select>
        <condition xmlns:hr="http://www.saba.com/hr#">
            <operation>contains</operation>
            <property>hr:Reports</property>
            <value>http://www.saba.com/people/Woodstock</value>
        </condition>
    </select>
</rdfquery>
```

The following exemplary query ("Query 11") finds all who have more than two direct reports:

```
<?xml version="1.0"?>
<!DOCTYPE rdfquery SYSTEM "rql.dtd">
<rdfquery>
    <select>
        <condition xmlns:hr="http://www.saba.com/hr#">
            <operation>count</operation>
            <operation>greaterThan</operation>
            <property>hr:Reports</property>
            <value>2</value>
        </condition>
    </select>
</rdfquery>
```

The following exemplary query ("Query 12") finds all who have an advanced competency rating in EJB, with the competency ratings obtained from evaluations.

```
<?xml version="1.0"?>
<!DOCTYPE rdfquery SYSTEM "rql.dtd">
<rdfquery>
    <select xmlns:ewp="http://www.saba.com/ewp#">
        <condition>
            <operation>equals</operation>
            <property>ewp:competency</property>
            <value>EJB.Advanced</value>
            <condition>
                <operation>contains</operation>
                <property>ewp:details</property>
                <value>evaluation</value>
            </condition>
        </condition>
    </select>
</rdfquery>
```

The following exemplary query ("Query 13") finds everyone hired in the past month:

```
<?xml version="1.0"?>
<!DOCTYPE rdfquery SYSTEM "http://dlipkin/rql.dtd">
<rdfquery>
    <select xmlns:hr="http://www.saba.com/hr#"
xmlns:dt="urn:w3-org:xmldatatypes">
        <condition>
            <operation>greaterThan</operation>
            <property>hr:StartDate</property>
            <value dt:type="dateTime">sysdate-31</value>
        </condition>
    </select>
</rdfquery>
```

Information Distributor Implementation

The following is an exemplary implementation embodiment of Info Distributor in the platform of the invention. The implementation has two components:

1. DatabaseMR—a Java class that implements a Metadata Repository (MR) on top of a relational database. This class provides utility methods to be invoked by Import Agents, Match Agents, and Delivery Agents.

2. RQL parser—a Java class that implements the RQL query language. It parses an RQL document and executes the query using the DatabaseMR.

In an embodiment, DatabaseMR implements the MR interface, that is, it provides the ability to import an RDF document, return the value of an RDF property, and perform a metadata match.

DatabaseMR uses a database schema containing the following tables:

MR_sources—contains URI references to each imported document

| Column | Datatype | Description |
| --- | --- | --- |
| id | number | Primary key |
| source_URI | varchar2(1024) | URI of imported document |

MR_triples_base-stores the actual data of all RDF triples from imported RDF documents.

| Column | Datatype | Description |
| --- | --- | --- |
| uri_ref | number | Foreign key to MR_sources table |
| rdf_property | varchar2(1024) | Property values |
| rdf_resource | varchar2(1024) | Resource values |
| rdf_object | varchar2(1024) | Object values |

In addition, there is a view called MR_triples defined as

CREATE VIEW MR_triples AS (SELECT rdf_property, rdf_resource, rdf_object FROM MR_triples_base)

This view allows other data sources to also be manipulated by the MR, as described below.

As an example, the following RDF document:

```
<?xml version="1.0"?>
<rdf:RDF xmlns:rdf="http://www.w3.org/1999/02/22-rdf-syntax-ns#"
     xmlns:dc="http://purl.org/dc/elements/1.1/"
xmlns:schedule="http://www.saba.com/RDF/schedule/1.0#">
    <rdf:Description resource="http://dlipkin/class1">
        <dc:title>HTML Fundamentals</dc:title>
        <schedule:startDate>1998-12-07</schedule:startDate>
    </rdf:Description>
</rdf:RDF>
``` appears as the following data:

| rdf_resource | rdf_property | rdf_object |
| --- | --- | --- |
| http://dlipkin/class1 | http://purl.org/dc/elements/1.1/title | HTML Fundamentals |
| http://dlipkin/class1 | http://www.saba.com/RDF/schedule/1.0#startDate | 1998-12-07 |

The methods of DatabaseMR are implemented as follows:

importRDF( )

The importRDF( ) method imports RDF data. It uses W3C's open-source RDF parser, SiRPAC (http://www.w3.org/RDF/Implementations/SiRPAC/) to generate triples from an RDF document.

This algorithm followed by this method is:

1. See if this document has already been imported. If so, delete all triples resulting from the previous import.

2. Insert the key for this document into MR_sources.

3. Invoke SiRPAC to parse the document and generate triples, using Java code similar to the following:

```
private void generateTriples(Reader r, String key) throws ImportException
{
    r = (Reader) new RDFReader (r);
    InputSource source = new InputSource (r);
    source.setSystemId (key);
```

RDFConsumer consumer=(RDFConsumer) new DatabaseMRConsumer(this);

```
    mSirpac.setRDFSource (source);
    mSirpac.setStreamMode (mUSE_STREAMING_PARSER);
    mSirpac.register (consumer);
    mSirpac.fetchRDF( );
}
``` where DatabaseMRConsumer is a callback class invoked by SiRPAC that simply invokes the insertTriple( ) method of DatabaseMR:

```
private class DatabaseMRConsumer implements RDFConsumer {
    private DatabaseMR mMR;
    public DatabaseMRConsumer (DatabaseMR theMR)
    {
        mMR = theMR;
    }
    public void start (DataSource ds) { }
    public void end (DataSource ds) { }
    public void assert (DataSource ds, Resource predicate, Resource subject, RDFnode object) {
        mMR.insertTriple (predicate.toString ( ),
subject.toString( ), object.toString ( ));
    }
};
```

4. Insert each triple into the MR_triples_base table using a prepared statement of the form:

INSERT INTO MR_triples_base(id, uri_ref, rdf_property, rdf_resource, rdf_object) VALUES (MR_sequence.nextval, ?, ?, ?, ?)

5. Commit the transaction.

match( )

The match( ) method takes a MatchDescriptor specifying a Match Agent and Delivery Agent and performs a match. It uses the following algorithm:

1. Extract the RDF query and target RDF document from the MatchDescriptor.

2. Parse the query using RQLParser.

3. Execute the query by invoking the getresources( ) method on the root Operator returned by RQLParser. Pass in the target RDF document as an argument, and obtain a result Vector of matching resource Strings.

4. Construct a MatchResultSet of the query results.

5. Dispatch the query results to the Delivery Agent.

getProperty( )

The getProperty( ) method returns the value for a specific property stored in the MR. It does this by invoking a SQL statement of the form:

```
SELECT rdf_object FROM MR_triples WHERE rdf_resource = ?
AND rdf_property = ?
```

Database Schema

The database schema used has two main advantages:

1. Simplicity. All RDF data is stored in a single table and all SQL is written to read and write to this table.

2. Support for non-RDF data. It is simple to cast non-RDF data into this format so that existing or legacy data can be queried by the DatabaseMR using RQL.

So, for example, for the following example data stored in an "invoices" table:

| id | last_updated | customer |
|----|--------------|----------|
| 1  | Jan. 10, 1999 | Ford |
| 2  | Feb. 25, 1999 | Cisco |

The view used by the MR can be augmented as followed to incorporate this data:

```
create view invoice_date_triples as
  select 'last_updated' "rdf_property",
    ('invoice#' || id) "rdf_resource",
    to_char (last_updated, 'YYYY-MM-DD' ) "rdf_object"
    from test_invoices;
create view invoice_customer_triples as
  select 'customer' "rdf_property",
    ('invoice#' || id) "rdf_resource",
    customer "rdf_object"
    from test_invoices;
drop view MR_triples;
create view MR_triples as
  (select rdf_property, rdf_resource, rdf_object from invoice_date_triples)
  union
  (select rdf_property, rdf_resource, rdf_object from invoice_customer_triples)
  union
  (select rdf_property, rdf_resource, rdf_object from MR_triples_base);
```

This will result in the following additional triples being available from the MR:

| rdf_resource | rdf_property | rdf_object |
|--------------|--------------|------------|
| invoice#1 | last_updated | Jan. 10, 1999 |
| invoice#1 | customer | Ford |
| invoice#2 | last_updated | Feb. 25, 1999 |
| invoice#2 | customer | Cisco |

The disadvantage to this schema is that it is not normalized and stores a tremendous amount of duplicate data. Many values for rdf_resource and rdf_property will be duplicated, since the same resource will have a number of properties, and property names will come from a well-known set.

RQLParser

RQLParser parses an RQL document and builds an execution plan for the query. The plan consists of a tree of Java classes called "Operators," where each Operator is responsible for returning a Vector of matching resources.

The Operator interface is defined as follows:

```
public interface Operator
{
/**
 * An operator knows how to return a Vector of matching
resource values
 * (typically URIs).
 * @param conn JDBC connection to the MR
 * @param targetRDF Target RDF file.
 * @return Vector of matching resources
 * @exception SQLException Thrown on a database error
 */
  public Vector getResources (Connection conn, String
targetRDF) throws SQLException, ParseException;
} /* Operator */
```

A variety of Operators are provided, each of which is responsible for handling different RDF constructs or RQL operations. Some of the available Operators are:

AndOperator—implements the "and" boolean operator. It contains an array of child Operators. It calls getResources( ) on each one, then constructs a result Vector of the resource that are present in each and every child.

OrOperator—implements the "or" boolean operator. It contains an array of child Operators. It calls getResources( ) on each one, then constructs a result Vector of the resource that are present in any child.

SimpleOperator—an abstract class that contains a property string, a value string, and a child Operator. It is the superclass for both SingleOperator and ContainerOperator.

SingleOperator—a SimpleOperator that handles basic expressions, ie equals or notEquals. It executes a SQL query of the form:

```
SELECT DISTINCT rdf_resource FROM (SELECT * FROM MR_triples
WHERE rdf_property = ?) WHERE rdf_object [operation] ?
```

The value for [operation] is provided by the concrete subclass. Available subclasses include:
EqualsOperator
NotEqualsOperator
GreaterThanOperator
LessThanOperator
LikeOperator The value used to match the rdf_object can either be provided as hard-coded text in the RQL document, or it can be defined as a variable containing a propertyName. In this case, a metadata match is performed, using the target RDF document as the source for the property value.

ContainerOperator—a SimpleOperator that operates on an RDF container (a Bag, Seq, or Alt). It contains a child operator that it executes to return a set of generated resources representing the RDF container. It then executes a SQL query of the form:

```
SELECT rdf_resource FROM MR_triples WHERE rdf_property = ?
AND rdf_object = ?
``` where each rdf_object is set to one of the child resources.

Additionally, there is an OperatorRegistry class where each Operator is registered with the RQL operation it supports.

RQLParser uses the following algorithm and methods for generating the execution plan:

1. parse( ):
Parse the RQL document using a standard XML parser to obtain the resulting DOM tree.
Navigate to the main condition node and call parseCondition( ) on it.

2. parseCondition( ):
If the condition is a boolean, call parseBoolean( ).
Otherwise, call parseOperation( ).

3. parseBoolean( ):
Obtaining each child node and recusively calling parseCondition( ) on each one.
Create the appropriate Operator for the boolean (AndOperator, OrOperator, NotOperator) with the children obtained by calling parseCondition( ).

4. parseOperation( ):
Obtain the operation, property, and value nodes.
Extract the text values of these nodes, and call createoperator( ) with these values.

5. createOperator( ):
a. Use the OperatorRegistry to obtain the Java class of the Operator responsible for this operation.
b. Use Java reflection to create a new instance of this Operator class, passing in the appropriate parameters.

Agents

Agents are implemented as clients of the DatabaseMR class.

For example, a simple ImportAgent will pass its text RDF argument to the importRDF( ) method:

```
public class SimpleImportAgent implements ImportAgent
{
  private MR mMR = null;
  public SimpleImportAgent (MR theMR)
  {
    mMR = theMR;
```

```
}
public void importRDF (String rdf) throws ImportException
{
  Reader r = (Reader) new StringReader(rdf);
  /* this import has a unique key so it can never be overridden by
     subsequent imports */
  String key = "generated" + System.currentTimeMillis( );
  mMR.importRDF(r, key);
  } /* importRDF */
} /* SimpleImportAgent */
```

A simple MatchAgent will take an RQL document and a DeliveryAgent as parameters, and invoke the match( ) method:

```
public class SimpleMatchAgent implements MatchAgent
{
  private MR mMR = null;
  private DeliveryAgent mDA = null;
  private MatchDescriptor mMD = null;
  public SimpleMatchAgent (MR theMR, String rql,
  DeliveryAgent theDA)
  {
    mMR = theMR;
    mDA = theDA;
    mMD = new MatchDescriptor(rql, " ", (MatchHandler)
  theDA);
  }
  public void match( ) throws MatchException
  {
    mNR.match(mMD);
  } /* match */
} /* SimpleMatchAgent */
```

A simple DeliveryAgent prints the RDF document containing the matching resources to System.out:

```
public class SimpleDeliveryAgent implements MatchHandler
{
  public void deliver(MatchResultSet mrs) throws
  DeliveryException
  {
    String xml = mrs.toXML( );
    System.out.print (xml);
  }
} /* SimpleDeliveryAgent */
```

Best Mode

Figure 17:
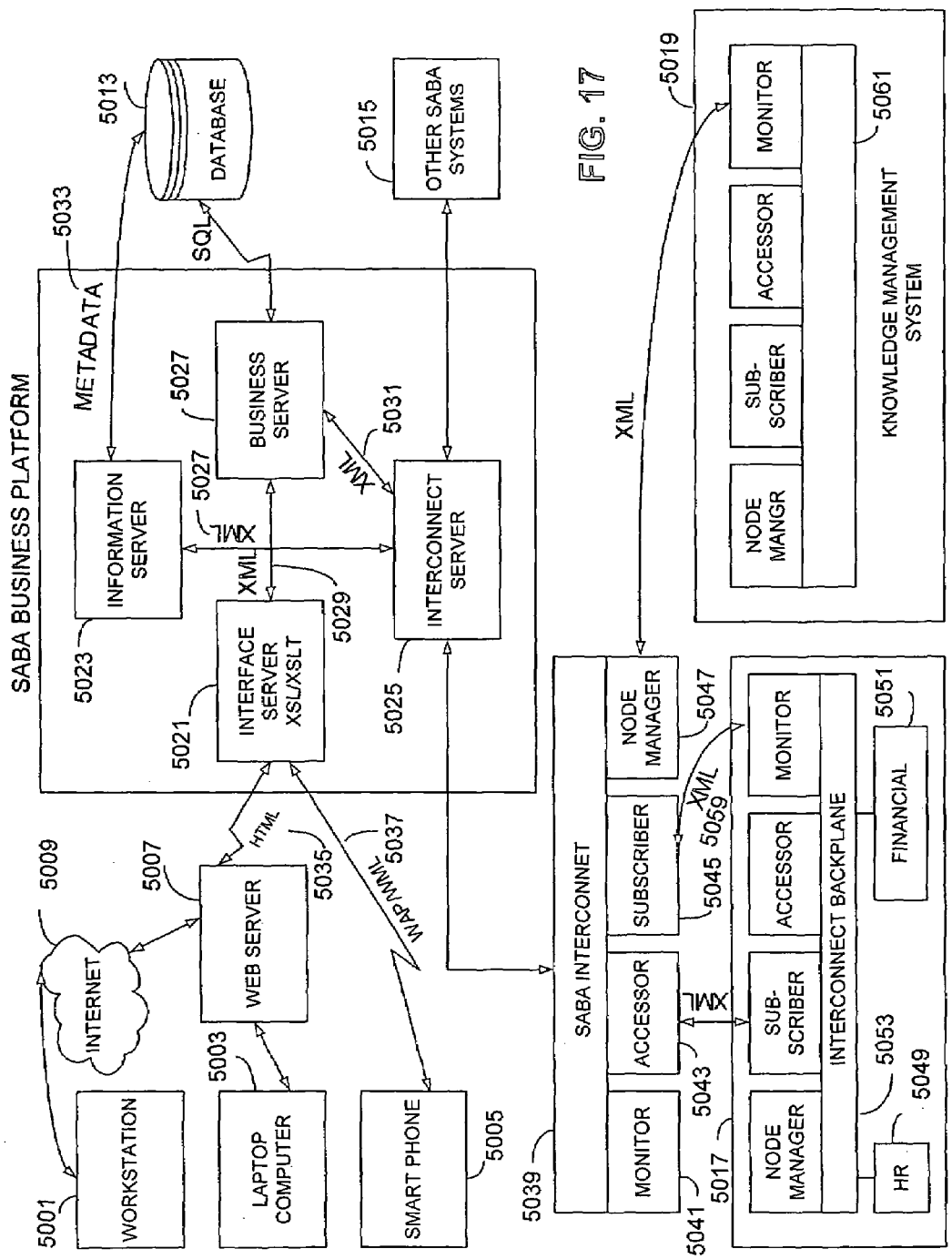
FIG. 17 illustrates a preferred embodiment of the Business Applications Management System Platform.

As indicated earlier in FIG. 3, the architecture of a preferred embodiment of the present invention adopts a three-tier model. Referring now to FIG. 17, the various types of computer hardware and computer software used in a preferred embodiment at the present time are depicted in greater detail. In FIG. 17, a tier 1 user workstation 1701 and a tier 1 dedicated user personal computer (PC) 1703 are connected electronically to a tier 2 web server 1707 via the Internet 1709. FIG. 17 also shows a tier 1 user smart phone 1705 directly connected to a tier 2 application server 1711, such as the SABA Business Platform. And the tier 2 applications server 1711 may be connected to a tier 3 database management system 1713, additional external SABA systems 1715, external third party systems 1717 and/or third party knowledge management systems 1719.

The user workstation 1701 can be a Sun® Ultra5™ workstation and the user PC 1703 can be any general purpose PC. Note that the list of tier 1 devices presented in this preferred embodiment are not conclusive. Other tier 1 user devices could be WebTV or other Personal Assistant Devices (PDAs). A Sun E250™ dual processor server can be used as a development/test system running the Sun® Solaris® operating environment, Oracle® 8I. A single processor Sun E250™ server can be used for the SABA Business Platform, as a Sun E4500™ dual processor, an IBM NetFinity 7000™ quad processor with a Microsoft® NT™ server and a Hitachi Shared Disk array. The workstation 1701 and the PC 1703 can interface to the tier 2 SABA Business Platform through the Internet 1709 using a standard Internet browser such as Internet Explorer™. The tier 3 database can be located on an Oracle 8I® server, a SQL server, or Informix. The Sun E250™ dual processor server can interface with the external third party systems 1717 via third party system specific adapter plugs. The Sun E250™ dual processor server also interfaces with external SABA systems 1715 via SABA exchange. Finally, the Sun E250™ dual processor server can also interface with the tier 3 database management system 1713 located on the Oracle 8I® server.

Referring again to FIG. 17, the tier 2 applications server 1711 is expanded to illustrate the SABA Business Platform (Platform) of the present invention. In FIG. 17, the Platform contains an Interface Server 1721, an Information Server 1723, an Interconnect Server 1725, and a Business Server 1727. In a preferred embodiment, all of these Servers 1721, 1723, 1725, and 1727 may physically reside on the same hardware platform (such as a UNIX box or a Microsoft™ NT™ platform), or each server may reside on a separate hardware box, or any combination of servers and hardware boxes. Each of the servers has included a JAVA Virtual Machine™ and the related runtime support.

In a preferred embodiment, the business server 1727 embodies the containers which incorporate all of the business logic, common business objects, SABA core objects, and a database driven framework for generating notifications and for triggering periodic events based on context sensitive attachments. The business server 1727 communicates with each of the other servers within the Platform using the XML protocol (1727, 1729, and 1731). The Business Server 1727 also communicates with the database management system 1713. In communicating with the interface server 1721, the business server 1727 first generates a XML message 1729 and transmits it to the interface server 1721. The interface server 1721 then performs style sheet transformations on the XML using XSL or XSLT to translate the XML message into the particular Applications Programming Interface (API) language required to communicate with a particular user. For example, if a particular user is accessing the Platform via a workstation 1701 or a PC 1703, the Interface Server 1721 can convert the XML 1729 into HTML 1735 and communicate with the user through a web server 1707 via the Internet 1709. The Interface Server 1721 can also convert the XML into other protocols such as WAP/WML 1737 to communicate with Personal Data Assistants (PDAs) such as cell phones 1705, Palm Pilots™, or other such wireless devices. Since the interface that is generated between the Platform and the various user interfaces is dictated by the set of style sheets generated in the Interface Server 1721, the same core business logic can be leveraged to communicate across a number of different user interfaces.

The Interconnect server 1725 uses XML to communicate with both the Information server 1723 and the Business server 1727 and is responsible for all connectivity external to the Platform. Externally, the Interface Server 1721 may communicate with third party systems such as SAP™ accounting or personnel packages, Oracle™ financial or human resources, other SABA Platforms 1715, and generally any external system to which a portion of the Interconnect facilities may be connected. The Interconnect server 1725 comprises SABA interconnect 1739 which is essentially a backplane into which cards or interconnect services can be plugged. Examples of these cards or interconnect services can be an event monitor 1741, exchange registry, node manager 1747, connectors, accessor 1743, or subscribers 1745. Each of these cards or interconnect services leverage the services provided by the SABA interconnect backplane 1739 for communicating between the cards themselves and for providing more sophisticated services to third party systems 1717.

A preferred embodiment of the Platform may interconnect with a third party system 1717 having, for example, an Oracle human resources (HR) database 1749 and an Oracle financial database 1751. The third party system 1717 has a third party interconnect backplane 1753 with similar cards or interconnect services. The third party interconnect backplane 1753 connects to the third party databases 1749 and 1751 via system specific adapters 1755. These system specific adapters 1755 differentiate between different types of databases such Oracle, SAP, or PeopleSoft and feed into the standardized Platform framework so information can be exchanged. An example of information that can be exchanged includes HR information. When a new employee is added to or terminated from the third party HR system database 1749, the monitor 1757 located on the third party interconnect backplane 1753 notifies the subscriber 1745 located on the SABA interconnect backplane 1739 via XML 1759. The accessor 1743 on the SABA interconnect backplane 1739 can then access the new employee data via XML. The Interconnect server 1725 then performs style sheet transformations to convert the XML into the Platform's native format and transmits that data to the Business server 1727 which then updates the database management system 1713. This data connection can be set to be automatic or with modifications.

In a preferred embodiment, the Interconnect server 1725 also embodies a workflow and notification scheme. For example, if a group of students signed up for a class through the Platform and later the class time changes, the Platform can detect this change and initiate a workflow to obtain all the names of the students from the database management system 1713 and send an email to them notifying them of the change. Thus, the interconnect server 1725 can provide real-time, in-order, reliable updating of data, financial transactions, or management of human capital between the Platform and third party systems 1717.

The Interconnect server 1725 can also be used to synchronize the Platform with other external SABA systems 1715. For example, the Platform can publish a catalog and based on permissions that are set, the catalog can be subscribed to by some other external SABA systems 1715. Whenever changes are made to the catalog, the external SABA systems 1715 can monitor that change and obtain an update immediately. The Interconnect server 1725 can also connect to SABA private learning networks which are connected to SABA public learning networks via SABA Exchange. For example, a third party such as Ford Automotive may have a SABA system allowing them to exchange catalog or class course information via the interconnect server 1725.

The Information Server 1723, communicates with the Interconnect server 1725 and the Business Server 1727 via XML. The Information Server 1723 also communicates directly with the database management system 1713 for query and storage of metadata 1733. The Information server 1723 focuses on queries and distributed queries and keeping track of information about other pieces within the Platform. The Information Server 1723 can also leverage the Interconnect server 1725 to connect to a third party knowledge management system 1719 that generates information via the SABA Interconnect backplane 1739. For example, a third party may have a third party Interconnect backplane 1761 connected to a Knowledge Management System 1719 which monitors and exchanges data with the Platform via XML. The Information Server 1723 contains Import, Match and Delivery agents to resolve and generate information requests; Match templates to match metadata; and template-based services that respond to information requests and are capable of rendering their results in XML; and Finders—metadata driven, template-based query builders that generate optimized SQL queries in the native SQL language of the particular database involved.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for performing the various features of the rules engine and flow management. It will be apparent to those skilled in the art that modifications and variations of the preferred embodiment are possible, such as different computer systems may be used, different communications media such as wireless communications, as well as different types of software may be used to perform equivalent functions, all of which fall within the true spirit and scope of the invention as measured by the following claims.

We claim:

1. A computer implemented method for automated processing of applications by a business applications server comprising the acts of:
   receiving a method call relating to a business object at the business application server;
   performing core services, in response to the method call, to permit performance of operations on the business object, the core services including at least an auditing service, an internationalization service, and a security service;
   applying metadata to define properties and behavior of the business object; and
   utilizing a persistence framework to affect a state of the business object.

2. The computer implemented method of claim 1 wherein the method call is based on an Enterprise JavaBean (EJB) entity beans model.

3. The computer implemented method of claim 1 wherein the method call is based on an Enterprise JavaBean (EJB) session beans model.

4. The computer implemented method of claim 1 wherein the method call is based on an XML-based model.

5. The computer implemented method of claim 1 wherein the persistence framework is configured to save or restore the state of the business object.

6. The computer implemented method of claim 1 wherein the security service controls user access to perform operations on the business object.

7. The computer implemented method of claim 1 wherein the core services include event monitoring and notification services.

8. The computer implemented method of claim 1 wherein the core services include mechanisms for enabling and disabling business rules that affect workflow and behavior of the business object.

9. The computer implemented method of claim 1 wherein the metadata define class properties and behavior for each class of business object and wherein the metadata are stored as distinct, editable information.

10. The computer implemented method of claim 9 wherein the class properties and behavior for each class of business object which can be dynamically modified comprise labels used to display object information, type of data validation to be performed and amount of custom information associated with a given object.

11. The computer implemented method of claim 1 wherein a code path defined by the persistence framework comprises code to create new objects, restore and update existing objects, delete objects and find objects.

12. The computer implemented method of claim 1 wherein a code path defined by the persistence framework comprises a set of Java code and database stored procedures to construct and verify object data.

13. The computer implemented method of claim 12 wherein the code path defined by the persistence framework farther comprises SQL commands to save and restore information using a relational database.

14. The computer implemented method of claim 1 wherein the auditing service tracks changes to the business object.

15. The computer implemented method of claim 1 wherein the internationalization service manages culture specific data associated with the business object.

16. A computer implemented method for automated processing of applications by a business applications server comprising the acts of:
   receiving a method call relating to a business object from a first server;
   performing core services, in response to the method call, to permit performance of operations on the business object by the business applications server;
   using metadata to define properties and behavior of the business object; and
   utilizing a persistence framework to affect a state of the business object, wherein operations on the business object is prevented based on the performed core services.

17. The computer implemented method of claim 16 wherein the persistence framework is part of the metadata.

18. The computer implemented method of claim 16 wherein the core services include at least an auditing service, an internationalization service, and a security service.

19. The computer implemented method of claim 18 wherein the auditing service tracks changes to the business object.

20. The computer implemented method of claim 18 wherein the internationalization service manages culture specific data associated with the business object.

21. The computer implemented method of claim 18 wherein the security service controls user access to perform operations on the business object.

22. An apparatus for implementing a business application comprising:
   a business application server adapted to receive a method call relating to a business object from a first server;
   a first processor mechanism in the business applications server configured to perform core services, in response to the method call, to permit performances of operations on the business object, the core services including at least an auditing service, an internationalization service, and a security service;
   a second processor mechanism in the business applications server configured to apply metadata to define properties and behavior of the business object; and
   a third processor mechanism in the business applications server configured to process the business object using a code path defined by a persistence framework.

23. The apparatus of claim 22 wherein the method call is based on an Enterprise JavaBean (EJB) entity beans model.

24. The apparatus of claim 22 wherein method call is based in an Enterprise JavaBean (EJB) session beans model.

25. The apparatus of claim 22 wherein the method call is based on an XML-based model.

26. The apparatus of claim 22 wherein the persistence framework is configured for saving and restoring state of the business object.

27. The apparatus of claim 22 wherein the security service controls user access to perform operations on the business object.

28. The apparatus of claim 22 wherein the core services include event monitoring and notification services.

29. The apparatus of claim 22 wherein the core services include mechanisms for enabling and disabling business rules that affect workflow and behavior of the business object.

30. The apparatus of claim 22 wherein the metadata define class properties and behavior for each class of business object and wherein the metadata are stored as distinct, editable information.

31. The apparatus of claim 30 wherein the class properties and behavior for each class of business object which can be dynamically modified comprise labels used to display object information, type of data validation to be performed and amount of custom information associated with a given object.

32. The apparatus of claim 22 wherein the code path defined by the persistence framework comprises code to create new objects, restore and update existing objects, delete objects and find objects.

33. The apparatus of claim 22 wherein the code path defined by the persistence framework comprises a set of Java code and database stored procedures to construct and verify object data.

34. The apparatus of claim 22 wherein the code path defined by the persistence framework further comprises SQL commands to save and restore information using a relational database.

35. A computer program product stored on a computed readable medium, comprising:
   a first computer readable program mechanism for receiving a method call relating to a business object from a first server;
   a second computer readable program mechanism for performing core sservices, in response to the method call, to permit performance of operations on the business object by a business applications server, wherein the core services include at least an auditing srvice, an internationalization service, and a security service;
   a third computer readable code mechanism for applying metadata to define properties and behavior of the business object; and
   a fourth computer readable code mechanism for affecting a state of the business object using a code path defined by a persistence framework.

36. The computer program product of claim 35 wherein the method call is based on an Enterprise JavaBean (EJB) entity beans model.

37. The computer program product of claim 35 wherein the method call is based on an Enterprise JavaBean (EJB) session beans model.

38. The computer program product of claim 35 wherein the method call is based on an XML-based model.

39. The computer program product of claim 35 wherein the persistence framework is configured for saving and restoring state of the business object.

40. The computer program product of claim 35 wherein the core services security service controls user access to perform operations on the business object.

41. The computer program product of claim 35 wherein the core services include event monitoring and notification services.

42. The computer program product of claim 35 wherein the core services include mechanisms for enabling and disabling business rules that affect workflow and behavior of the business object.

43. The computer program product of claim 35 wherein the metadata define class properties and behavior for each class of business object and wherein the metadata are stored as distinct, editable information.

44. The computer program product of claim 43 wherein the class properties and behavior for each class of business object which can be dynamically modified comprise labels used to display object information, type of data validation to be performed and amount of custom information associated with a given object.

45. The computer program product of claim 35 wherein the code path defined by the persistence framework comprises code to create new objects, restore and update existing objects, delete objects and find objects.

46. The computer program product of claim 35 wherein the code path defined by the persistence framework comprises a set of Java code and database stored procedures to construct and verify object data.

47. The computer program product of claim 46 wherein the code path defined by the persistence framework further comprises SQL commands to save and restore information using a relational database.

* * * * *